(12) United States Patent
Broadbent et al.

(10) Patent No.: US 12,441,976 B2
(45) Date of Patent: Oct. 14, 2025

(54) PROCESS FOR REDUCING THE ACTIVITY OF MICROBIAL CONTAMINATION IN A YEAST MEDIUM

(71) Applicant: Lallemand Hungary Liquidity Management LLC, Budapest (HU)

(72) Inventors: Jeffery R. Broadbent, Amalga, UT (US); James L. Steele, Lebanon, NH (US); Brooks Henningsen, Salisbury, NH (US); Ekkarat Phrommao, Lebanon, NH (US); Fernanda Cristina Firmino, Atlanta, GA (US)

(73) Assignee: DANSTAR FERMENT AG, Zug (CH)

( * ) Notice: Subject to any disclaimer, the term of this patent is extended or adjusted under 35 U.S.C. 154(b) by 165 days.

(21) Appl. No.: 17/372,372

(22) Filed: Jul. 9, 2021

(65) Prior Publication Data

US 2022/0010265 A1     Jan. 13, 2022

Related U.S. Application Data

(60) Provisional application No. 63/050,593, filed on Jul. 10, 2020.

(51) Int. Cl.
| | |
|---|---|
| C12N 1/16 | (2006.01) |
| C12R 1/225 | (2006.01) |
| C12R 1/865 | (2006.01) |

(52) U.S. Cl.
CPC ............ *C12N 1/16* (2013.01); *C12N 2500/30* (2013.01); *C12N 2500/72* (2013.01); *C12N 2500/74* (2013.01); *C12R 2001/225* (2021.05); *C12R 2001/865* (2021.05)

(58) Field of Classification Search
CPC .. C12N 1/16; C12N 2500/30; C12N 2500/72; C12N 2500/74; C12N 9/0006; C12N 9/0008; C12N 9/88; C12N 2001/245; C12N 1/20; C12N 9/93; C12N 1/18; C12R 2001/225; C12R 2001/865; C12R 2001/245; Y02E 50/10; C12P 7/06
See application file for complete search history.

(56) References Cited

U.S. PATENT DOCUMENTS

2015/0232863 A1*   8/2015   Argyros et al. ........ C12N 15/81

FOREIGN PATENT DOCUMENTS

| WO | 2014/081803 A1 | 5/2014 |
|---|---|---|
| WO | 2016/044723 A1 | 3/2016 |
| WO | 2019/058260 A1 | 3/2019 |
| WO | 2020/100072 A1 | 5/2020 |

OTHER PUBLICATIONS

Zhang et al., "Nisin incorporation enhances the inactivation of lactic acid bacteria during the acid wash step of bioethanol production from sugarcane juice," *Letters in Applied Microbiology* 69:50-56, Apr. 11, 2019.

Gabrielsen et al., "Circular Bacteriocins: Biosynthesis and Mode of Action," *Applied and Environmental Microbiology* 80(22):6854-6862, 2014.

Henningsen et al., "Increasing Anaerobic Acetate Consumption and Ethanol Yields in *Saccharomyces cerevisiae* with NADPH-Specific Alcohol Dehydrogenase," *Applied and Environmental Microbiology* 81(23):8108-8117, 2015.

Iijima et al., "horC confers beer-spoilage ability on hop-sensitive *Lactobacillus brevis* ABBC45$^{CC}$" *Journal of Applied Microbiology* 100:1282-1288, 2006.

Pontes Ellodório et al., "Advances in yeast alcoholic fermentations for the production of bioethanol, beer and wine," *Advances in Applied Microbiology* 109:61-119, 2019.

Sakamoto et al., "Hop Resistance in the Beer Spoilage Bacterium *Lactobacillus brevis* Is Mediated by the ATP-Binding Cassette Multidrug Transporter HorA," *Journal of Bacteriology* 183(18):5371-5375, 2001.

Van Belkum et al., "Structure and genetics of circular bacteriocins," *Trends in Microbiology* 19(8):411-418, 2011.

\* cited by examiner

*Primary Examiner* — Satyendra K Singh
(74) *Attorney, Agent, or Firm* — Seed Intellectual Property Law Group LLP

(57) ABSTRACT

The present disclosure provides an antimicrobial composition as well as a process using same to limit microbial activity in a yeast medium. The antimicrobial composition includes at least one weak acid, optionally in combination with an acid stable bacteriocin and/or an antibiotic. The antimicrobial composition can be used for propagating yeasts and for making a fermentation product. The present disclosure also provides yeasts and lactic acid bacteria that can be used with the antimicrobial composition.

26 Claims, 2 Drawing Sheets
Specification includes a Sequence Listing.

PROCESS FOR REDUCING THE ACTIVITY OF MICROBIAL CONTAMINATION IN A YEAST MEDIUM

CROSS-REFERENCE TO RELATED APPLICATIONS AND DOCUMENTS

This application claims priority from U.S. provisional patent application 63/050,593 filed on Jul. 10, 2021. The content of the priority application is herewith incorporated in its entirety.

STATEMENT REGARDING SEQUENCE LISTING

The Sequence Listing associated with this application is provided in text format in lieu of a paper copy, and is hereby incorporated by reference into the specification. The name of the text file containing the Sequence Listing is 580127_433_SEQUENCE_LISTING.txt. The text file is 88.8 KB, was created on Jul. 9, 2021, and is being submitted electronically via EFS-Web.

TECHNOLOGICAL FIELD

The present disclosure concerns a process in which, prior to propagation and fermentation, an antimicrobial composition is used to reduce the activity associated with microbial contamination that may be present in a yeast medium.

BACKGROUND

Microbial contamination in the US bioethanol industry is pervasive and can inhibit yeast performance and reduce ethanol yield. Estimates (based upon 2016 industry values) place the yearly cost of this yield loss to be more than $200 million USD. To minimize these losses, the industry has become heavily reliant on antibiotics. However, the widespread use of antibiotics in bioethanol production has been found to promote the emergence of antibiotic-resistant strains that undermine the effectiveness of this control measure. Additionally, antibiotic residues can find their way into animal feed via dried distiller grains. The presence of antibiotics and/or antibiotic-resistant bacteria in animal feed has raised concerns among regulators and consumers, so there is growing interest in the US bioethanol industry for the reduction (and is some embodiments, the elimination) of antibiotics to control microbial contamination in their fermentation process.

It would be highly desirable to provide an improved process for making a yeast medium (that can be used during propagation and/or fermentation) having limited activity associated with microbial contamination. In some embodiments, it would be desirable to provide a process which could limit or even avoid the use of antibiotics.

BRIEF SUMMARY

The present disclosure provides an antimicrobial composition comprising one or more weak acid, to be used in combination with a strong acid, to reduce the activity of contaminating microbial cells in a yeast medium.

According to a first aspect, the present disclosure provides a process for making a medium for a yeast. The process comprises (i) adjusting the pH of a raw medium with a strong acid to provide an acidified medium; and (ii) maintaining the acidified medium at the adjusted pH for a period of time. Still, the process comprises adding an antimicrobial composition to the raw medium prior to or during step (i), and/or acidified medium prior to or during step (ii). The antimicrobial composition comprises at least one weak acid, optionally in combination with an acid stable bacteriocin and/or an antibiotic. In the process, step (i) comprises adjusting the pH of the raw medium below or equal to the pKa of the at least one weak acid of the antimicrobial composition. In the process, step (ii) comprises maintaining the acidified medium so as to decrease the contaminating microbial activity in the acidified medium, when compared to a corresponding control medium not previously treated with the antimicrobial composition. In an embodiment, the at least one weak acid comprises or is a carboxylic acid. In a further embodiment, the carboxylic acid is acetic acid, lactic acid and/or formic acid. In still another embodiment, the at least one weak acid comprises or is a vinylogous acid. In a yet a further embodiment, the vinylogous acid is a hop acid. In another embodiment, the strong acid is sulfuric acid. In still another embodiment, the acid stable bacteriocin comprises or is a lantibiotic and/or a Class IIc (cyclic) bacteriocin. In still another embodiment, the antimicrobial composition comprises nisin. In yet another embodiment, the process further comprises, prior to step (i), applying a heat treatment to the raw medium. In some embodiment, the period of time is at least 30 minutes. In yet another embodiment, the process further comprises, after step (ii) adjusting the pH of the acidified medium with a base to provide a neutralized medium. In an embodiment, the process further comprises adding a yeast to the raw medium prior to or during step (i), the acidified medium prior to or during step (ii) and/or the neutralized medium. In still a further embodiment, the process further comprises adding a recombinant lactic acid bacteria to the neutralized medium, wherein the recombinant LAB host cell includes at least one genetic modification for converting, at least in part, the medium into a fermentation product. In an embodiment, the process further comprises adding an antibiotic to the neutralized medium. In another embodiment, the process further comprises adding a second bacteriocin to the raw medium prior to or during step (i), the acidified medium prior to or during step (ii) and/or to the neutralized medium, wherein when the second bacteriocin is added to the raw medium prior to or during step (i) and/or acidified medium prior to or during step (ii), the second bacteriocin is acid stable.

According to a second aspect, the present disclosure provides a medium obtainable or obtained by the process described herein.

According to a third aspect, the present disclosure provides a medium for a yeast comprising an antimicrobial composition comprising at least one weak acid, optionally in combination with an acid stable bacteriocin and/or an antibiotic. In an embodiment, the at least one weak acid comprises or is a carboxylic acid. In still another embodiment, the carboxylic acid is acetic acid, lactic acid and/or formic acid. In an embodiment, the at least one weak acid comprise or is a vinylogous acid. In an embodiment, the vinylogous acid comprises hop acid.

According to a fourth aspect, the present the present disclosure provides a process for propagating a yeast in a medium. The process comprises providing the medium obtained by the process described herein or the medium described herein, optionally adding the yeast to the medium to obtain an inoculated medium, and culturing the inoculated medium under conditions so as to favor the propagation of the yeast and obtain a propagated medium comprising a propagated yeast population. In an embodiment, the yeast is a recombinant yeast host cell. In yet another embodiment, the recombinant yeast host cell comprises at least one first genetic modification for providing or increasing the catabolism of the at least one weak acid; and/or at least one second genetic modification for converting, at least in part, a biomass into a fermentation product. In another embodiment, the at least one first genetic modification comprises the introduction of one or more of a first heterologous nucleic acid molecule encoding one or more first heterologous polypeptide for catabolizing the at least one weak acid. In an embodiment, the at least one acid comprises acetic acid and the one or more first heterologous polypeptide for catabolizing the at least one weak acid comprises a polypeptide having acetylating acetaldehyde dehydrogenase (AADH) activity. In still another embodiment, the at least one weak acid comprises formic acid and the one or more first heterologous polypeptide for catabolizing the at least one weak acid comprises a polypeptide having formate dehydrogenase (FDH) activity. In yet another embodiment, the at least one weak acid comprises lactic acid and the one or more first heterologous polypeptide for catabolizing the at least one weak acid comprises a polypeptide having NAD-independent lactate dehydrogenase activity. In another embodiment, the at least one second genetic modification comprises the introduction of one or more second genetic heterologous nucleic acid molecules encoding one or more second heterologous polypeptide for converting, at least in part, the biomass into the fermentation product. In still another embodiment, the yeast or the recombinant yeast host cell is from the genus *Saccharomyces* sp. and in a further embodiment, from the species *Saccharomyces cerevisiae*. In an embodiment, the process further comprises adding a recombinant lactic acid bacteria (LAB) host cell to the medium or the inoculated medium, wherein the recombinant LAB host cell includes at least one third genetic modification for converting, at least in part, the medium into a fermentation product. In an embodiment, the at least one third genetic modification comprises the introduction of one or more third genetic heterologous nucleic acid molecules encoding one or more third heterologous polypeptide for converting, at least in part, the medium into the fermentation product. In embodiments in which the fermentation product is ethanol the at least one third heterologous polypeptide for converting, at least in part, the medium into the fermentation product comprises a polypeptide having pyruvate decarboxylase activity and a polypeptide having alcohol dehydrogenase activity. In another embodiment, the recombinant LAB host cell has a decreased lactate dehydrogenase activity when compared to a corresponding native LAB cell. In some embodiments, the recombinant LAB host cell has at least one inactivated native gene coding for a lactate dehydrogenase which can be, for example, Idh1, Idh2, Idh3 or Idh4. In an embodiment, the recombinant LAB host cell further comprises at least one fourth genetic modification for providing or increasing the catabolism of the at least one weak acid, at least one fifth genetic modification for providing or increasing resistance against the at least one weak acid, at least one sixth genetic modification for providing or increasing immunity against the bacteriocin, at least one seventh genetic modification for expressing the bacteriocin; and/or at least one eighth genetic modification for providing or increasing immunity resistance against the antibiotic, wherein the bacteriocin is the acid stable bacteriocin, the second bacteriocin and/or the third bacteriocin. In an embodiment, the at least one fourth genetic modification comprises the introduction of one or more of a fourth heterologous nucleic acid molecule encoding one or more fourth heterologous polypeptide for catabolizing the at least one weak acid. In a further embodiment, the at least one weak acid comprises acetic acid and the one or more fourth heterologous polypeptide for catabolizing the at least one weak acid comprises one or more polypeptide having acetylating acetaldehyde dehydrogenase (AADH) activity and alcohol dehydrogenase (ADH) activity. In yet a further embodiment, the at least one weak acid comprises formic acid and the one or more fourth heterologous polypeptide for catabolizing the at least one weak acid comprises a polypeptide having formate dehydrogenase (FDH) activity. In still another embodiment, the at least one weak acid comprises lactic acid and the one or more fourth heterologous polypeptide for catabolizing the at least one weak acid comprises a polypeptide having a NAD-independent lactate dehydrogenase activity. In still another embodiment, the at least one fifth genetic modification comprises the introduction of one or more of a fifth heterologous nucleic acid molecule encoding one or more fifth heterologous polypeptide for providing or increasing resistance against the at least one weak acid. In still another embodiment, the at least one acid comprises hop acid and the one or more fifth heterologous polypeptide for providing or increasing resistance against the at least one weak acid comprises a polypeptide having an adenosine triphosphate (ATP)-dependent efflux activity. In still another embodiment, the at least one sixth genetic modification comprises the introduction of one or more of a sixth heterologous nucleic acid molecule encoding one or more sixth heterologous polypeptide for providing or increasing immunity against the bacteriocin, wherein the bacteriocin is the acid stable bacteriocin, the second bacteriocin and/or the third bacteriocin. In another embodiment, the at least one seventh genetic modification comprises the introduction of one or more of a seventh heterologous nucleic acid molecule encoding one or more seventh heterologous polypeptide for expressing the bacteriocin, wherein the bacteriocin is the acid stable bacteriocin, the second bacteriocin and/or the third bacteriocin. In still another embodiment, the at least one eighth genetic modification comprises the introduction of one or more of an eighth heterologous nucleic acid molecule encoding one or more eighth heterologous for providing or increasing immunity against the antibiotic. In still a further embodiment, the recombinant LAB host cell exhibits adaptive immunity against the at least one weak acid and/or the antibiotic. In another embodiment, the recombinant LAB host cell is from the genus *Lactobacillus* sp., and in a further embodiment, from the species *Lactobacillus paracasei*.

According to a fifth aspect, the present disclosure provides a medium comprising a propagated yeast population obtainable or obtained by the process described herein.

According to a sixth aspect, the present disclosure provides a medium comprising an antimicrobial composition and a propagated yeast population, wherein the antimicrobial comprises at least one weak acid, optionally in combination with an acid stable bacteriocin and/or an antibiotic. In an embodiment, the at least one weak acid comprises or is a carboxylic acid. In an embodiment, the carboxylic acid is acetic acid, lactic acid and/or formic acid. In another embodiment, the at least one weak acid comprise or is a vinylogous acid. In another embodiment, the vinylogous acid comprises hop acid.

According to a seventh aspect, the present disclosure provides a process for making a fermentation product from a fermentation medium. The process can comprise incubating the medium described herein or obtained by the process described herein optionally with a yeast under condition so as to allow the conversion of at least in part the biomass of the fermentation medium into the fermentation product. The process can comprise incubating the propagated medium described herein or obtained by the process described herein under condition so as to allow the conversion of at least in part the biomass of the fermentation medium into the fermentation product. The process can comprise contacting the propagated yeast population obtained by the process described herein with the fermentation medium under condition so as to allow the conversion of at least in part the biomass of the fermentation medium into the fermentation product. In an embodiment, the yeast is a recombinant yeast host cell as described herein. In an embodiment, the process further comprises adding a recombinant lactic acid bacteria (LAB) as described herein in the medium. In another embodiment, the fermentation product is ethanol.

According to an eight aspect, the present disclosure comprises an antimicrobial composition comprising at least one weak acid. In an embodiment, the at least one weak acid comprises or is a carboxylic acid. In still another embodiment, the carboxylic acid comprises acetic acid, lactic acid and/or formic acid. In still a further embodiment, the at least one weak acid comprises or is a vinylogous acid. In another embodiment, the vinylogous acid comprises a hop acid. In still another embodiment, the antimicrobial composition comprises at least two weak acids. In still a further embodiment, the antimicrobial composition further comprises an acid stable bacteriocin. In still another embodiment, the acid stable bacteriocin comprises or is a lantibiotic and/or a Class IIc bacteriocin. In yet a further embodiment, the antimicrobial composition comprises nisin. In some embodiments, the antimicrobial composition further comprises an antibiotic.

According to a ninth aspect, the present disclosure provides a medium comprising the antimicrobial composition described herein. In some embodiments, the medium can also comprise a yeast and/or a recombinant lactic acid bacteria host cell. In some further embodiments, the biomass can comprise or be derived from corn.

According to a tenth aspect, the present disclosure provides a process for making a medium for a yeast. The process comprises: (i) adjusting the pH of a raw medium with a strong acid to provide an acidified medium; and (ii) maintaining the acidified medium at the adjusted pH for a period of time. The process comprises adding an antimicrobial composition to the raw medium prior to or during step (i), and/or acidified medium prior to or during step (ii). The antimicrobial composition comprises at least one weak acid, optionally in combination with an acid stable bacteriocin and/or an antibiotic. Step (i) comprises adjusting the pH of the raw medium below or equal the pKa of the at least one weak acid of the antimicrobial composition. Step (ii) comprises maintaining the acidified medium so as to decrease the contaminating microbial activity in the acidified medium, when compared to a corresponding control medium not previously treated with the antimicrobial composition. The medium comprises a biomass. In an embodiment, the at least one weak acid comprises or is a carboxylic acid and/or comprises or is a vinylogous acid. In another embodiment, the carboxylic acid is acetic acid, lactic acid and/or formic acid. In a further embodiment, the vinylogous acid is a hop acid. In still yet another embodiment, the strong acid is sulfuric acid. In an embodiment, the acid stable bacteriocin comprises or is a lantibiotic and/or a Class IIc bacteriocin. In yet another embodiment, the antimicrobial composition comprises nisin. In another embodiment, the process further comprises, prior to step (i), applying a heat treatment to the raw medium. In still another embodiment, the period of time is at least 15 minutes. In another embodiment, the process further comprises, after step (ii), (iii) adjusting the pH of the acidified medium with a base to provide a neutralized medium. In yet another embodiment, the process further comprises adding a yeast to the: raw medium prior to or during step (i); acidified medium prior to or during step (ii); and/or neutralized medium. In still another embodiment, the process further comprises adding a recombinant lactic acid bacteria and/or an antibiotic to the neutralized medium. In still another embodiment, the process further comprises adding a second bacteriocin to the: raw medium prior to or during step (i); acidified medium prior to or during step (ii); and/or neutralized medium. In embodiments in which the second bacteriocin is added to the raw medium prior to or during step (i) and/or acidified medium prior to or during step (ii), the second bacteriocin is acid stable.

According to an eleventh aspect, the present disclosure provides a process for propagating a yeast in a medium. The process comprises (i) providing the medium obtainable or obtained by the process described herein; (ii) when the medium does not include the yeast, adding the yeast to the medium to obtain an inoculated medium; and (iii) culturing the medium of (i) or the inoculated medium of (ii) under conditions so as to favor the propagation of the yeast and obtain a propagated medium comprising a propagated yeast population. In an embodiment, the biomass comprises or is derived from corn. In another embodiment, the yeast is a recombinant yeast host cell. In still another embodiment, the recombinant yeast host cell comprises: at least one first genetic modification for providing or increasing the catabolism of the at least one weak acid; and/or at least one second genetic modification for converting, at least in part, a biomass into a fermentation product. In an embodiment, the at least one first genetic modification comprises the introduction of one or more of a first heterologous nucleic acid molecule encoding one or more first heterologous polypeptide for catabolizing the at least one weak acid. In embodiments in which the at least one weak acid comprises acetic acid, the one or more first heterologous polypeptide for catabolizing the at least one weak acid comprises a polypeptide having acetylating acetaldehyde dehydrogenase (AADH) activity. In embodiments in which the at least one weak acid comprises formic acid, the one or more first heterologous polypeptide for catabolizing the at least one weak acid comprises a polypeptide having formate dehydrogenase (FDH) activity. In embodiments in which the at least one weak acid comprises lactic acid, the one or more first heterologous polypeptide for catabolizing the at least one weak acid comprises a polypeptide having NAD-independent lactate dehydrogenase activity. In still a further embodiment, the yeast or the recombinant yeast host cell is from the genus Saccharomyces sp. and/or from the species Saccharomyces cerevisiae. In yet another embodiment, the recombinant LAB host cell includes at least one third genetic modification for converting, at least in part, the medium into a fermentation product. In a further embodiment, the at least one third genetic modification comprises the introduction of one or more third genetic heterologous nucleic acid molecules encoding one or more third heterologous polypeptide for converting, at least in part, the medium into the fermentation product. In yet another embodiment, the fermentation product is ethanol and the at least one third heterologous polypeptide for converting, at least in part, the medium into the fermentation product comprises a polypeptide having pyruvate decarboxylase activity; and/or a polypeptide having alcohol dehydrogenase activity; and/or the recombinant LAB host cell has a decreased lactate dehydrogenase activity when compared to a corresponding native LAB cell. In still another embodiment, the recombinant LAB host cell further comprises: at least one fourth genetic modification for providing or increasing the catabolism of the at least one weak acid; at least one fifth genetic modification for providing or increasing resistance against the at least one weak acid; at least one sixth genetic modification for providing or increasing immunity against the acid stable bacteriocin, and/or the second bacteriocin; at least one seventh genetic modification for expressing the acid stable bacteriocin, and/or the second bacteriocin; and/or at least one eighth genetic modification for providing or increasing immunity resistance against the antibiotic. In yet another embodiment, the at least one fourth genetic modification comprises the introduction of one or more of a fourth heterologous nucleic acid molecule encoding one or more fourth heterologous polypeptide for catabolizing the at least one weak acid; the at least one fifth genetic modification comprises the introduction of one or more of a fifth heterologous nucleic acid molecule encoding one or more fifth heterologous polypeptide for providing or increasing resistance against the at least one weak acid; the at least one sixth genetic modification comprises the introduction of one or more of a sixth heterologous nucleic acid molecule encoding one or more sixth heterologous polypeptide for providing or increasing immunity against the acid-stable bacteriocin, and/or the second bacteriocin; the at least one seventh genetic modification comprises the introduction of one or more of a seventh heterologous nucleic acid molecule encoding one or more seventh heterologous polypeptide for expressing the acid stable bacteriocin, and/or the second bacteriocin; and/or the at least one eighth genetic modification comprises the introduction of one or more of an eighth heterologous nucleic acid molecule encoding one or more eighth heterologous for providing or increasing immunity against the antibiotic. In embodiments in which the at least one weak acid comprises acetic acid, the one or more fourth heterologous polypeptide for catabolizing the at least one weak acid comprises one or more polypeptide having acetylating acetaldehyde dehydrogenase (AADH) activity and alcohol dehydrogenase (ADH) activity. In embodiments in which the at least one weak acid comprises formic acid, the one or more fourth heterologous polypeptide for catabolizing the at least one weak acid comprises a polypeptide having formate dehydrogenase (FDH) activity. In embodiments in which the at least one weak acid comprises lactic acid, the one or more fourth heterologous polypeptide for catabolizing the at least one weak acid comprises a polypeptide having a NAD-independent lactate dehydrogenase activity. In embodiments in which the at least one weak acid comprises hop acid, the one or more fifth heterologous polypeptide for providing or increasing resistance against the at least one weak acid comprises a polypeptide having an adenosine triphosphate (ATP)-dependent efflux activity. In another embodiment, the recombinant LAB host cell exhibits adaptive immunity against the at least one weak acid and/or the antibiotic. In still another embodiment, the recombinant LAB host cell is from the genus *Lactobacillus* sp. and/or from the species *Lactobacillus paracasei*.

According to a twelfth aspect, the present disclosure provides a process for making a fermentation product from a fermentation medium. The process comprises (i) providing the medium obtainable or obtained by the process described herein or the propagated medium described herein as the fermentation medium; (ii) when the fermentation medium does not include the yeast, adding the yeast to the fermentation medium; and (iii) culturing the fermentation medium under conditions so as to allow the conversion of at least in part the biomass into the fermentation product. In an embodiment, the biomass comprises or is derived from corn. In another embodiment, the yeast is a recombinant yeast host cell. In still another embodiment, the recombinant yeast host cell comprises: at least one first genetic modification for providing or increasing the catabolism of the at least one weak acid; and/or at least one second genetic modification for converting, at least in part, a biomass into a fermentation product. In an embodiment, the at least one first genetic modification comprises the introduction of one or more of a first heterologous nucleic acid molecule encoding one or more first heterologous polypeptide for catabolizing the at least one weak acid. In embodiments in which the at least one weak acid comprises acetic acid, the one or more first heterologous polypeptide for catabolizing the at least one weak acid comprises a polypeptide having acetylating acetaldehyde dehydrogenase (AADH) activity. In embodiments in which the at least one weak acid comprises formic acid, the one or more first heterologous polypeptide for catabolizing the at least one weak acid comprises a polypeptide having formate dehydrogenase (FDH) activity. In embodiments in which the at least one weak acid comprises lactic acid, the one or more first heterologous polypeptide for catabolizing the at least one weak acid comprises a polypeptide having NAD-independent lactate dehydrogenase activity. In still a further embodiment, the yeast or the recombinant yeast host cell is from the genus *Saccharomyces* sp. and/or from the species *Saccharomyces cerevisiae*. In yet another embodiment, the recombinant LAB host cell includes at least one third genetic modification for converting, at least in part, the medium into a fermentation product. In a further embodiment, the at least one third genetic modification comprises the introduction of one or more third genetic heterologous nucleic acid molecules encoding one or more third heterologous polypeptide for converting, at least in part, the medium into the fermentation product. In yet another embodiment, the fermentation product is ethanol and the at least one third heterologous polypeptide for converting, at least in part, the medium into the fermentation product comprises a polypeptide having pyruvate decarboxylase activity; and/or a polypeptide having alcohol dehydrogenase activity; and/or the recombinant LAB host cell has a decreased lactate dehydrogenase activity when compared to a corresponding native LAB cell. In still another embodiment, the recombinant LAB host cell further comprises: at least one fourth genetic modification for providing or increasing the catabolism of the at least one weak acid; at least one fifth genetic modification for providing or increasing resistance against the at least one weak acid; at least one sixth genetic modification for providing or increasing immunity against the acid stable bacteriocin, and/or the second bacteriocin; at least one seventh genetic modification for expressing the acid stable bacteriocin, the second bacteriocin and/or the third bacteriocin; and/or at least one eighth genetic modification for providing or increasing immunity resistance against the antibiotic. In yet another embodiment, the at least one fourth genetic modification comprises the introduction of one or more of a fourth heterologous nucleic acid molecule encoding one or more fourth heterologous polypeptide for catabolizing the at least one weak acid; the at least one fifth genetic modification comprises the introduction of one or more of a fifth heterologous nucleic acid molecule encoding one or more fifth heterologous polypeptide for providing or increasing resistance against the at least one weak acid; the at least one sixth genetic modification comprises the introduction of one or more of a sixth heterologous nucleic acid molecule encoding one or more sixth heterologous polypeptide for providing or increasing immunity against the acid-stable bacteriocin, and/or the second bacteriocin; the at least one seventh genetic modification comprises the introduction of one or more of a seventh heterologous nucleic acid molecule encoding one or more seventh heterologous polypeptide for expressing the acid stable bacteriocin, the second bacteriocin and/or the third bacteriocin; and/or the at least one eighth genetic modification comprises the introduction of one or more of an eighth heterologous nucleic acid molecule encoding one or more eighth heterologous for providing or increasing immunity against the antibiotic. In embodiments in which the at least one weak acid comprises acetic acid, the one or more fourth heterologous polypeptide for catabolizing the at least one weak acid comprises one or more polypeptide having acetylating acetaldehyde dehydrogenase (AADH) activity and alcohol dehydrogenase (ADH) activity. In embodiments in which the at least one weak acid comprises formic acid, the one or more fourth heterologous polypeptide for catabolizing the at least one weak acid comprises a polypeptide having formate dehydrogenase (FDH) activity. In embodiments in which the at least one weak acid comprises lactic acid, the one or more fourth heterologous polypeptide for catabolizing the at least one weak acid comprises a polypeptide having a NAD-independent lactate dehydrogenase activity. In embodiments in which the at least one weak acid comprises hop acid, the one or more fifth heterologous polypeptide for providing or increasing resistance against the at least one weak acid comprises a polypeptide having an adenosine triphosphate (ATP)-dependent efflux activity. In another embodiment, the recombinant LAB host cell exhibits adaptive immunity against the at least one weak acid and/or the antibiotic. In still another embodiment, the recombinant LAB host cell is from the genus *Lactobacillus* sp. and/or from the species *Lactobacillus paracasei*.

BRIEF DESCRIPTION OF THE DRAWINGS

Having thus generally described the nature of the invention, reference will now be made to the accompanying drawings, showing by way of illustration, a preferred embodiment thereof, and in which.

DETAILED DESCRIPTION

Figure 1:
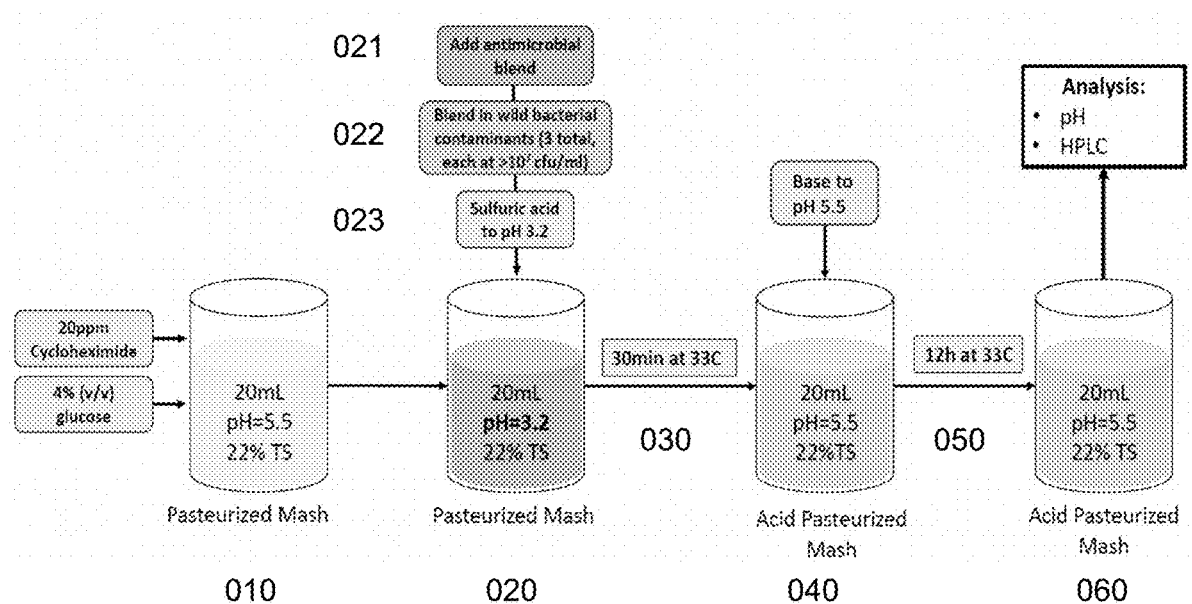
FIG. 1 illustrates a laboratory model used in the Examples to characterize the microbial activity of various components.
Figure 2:
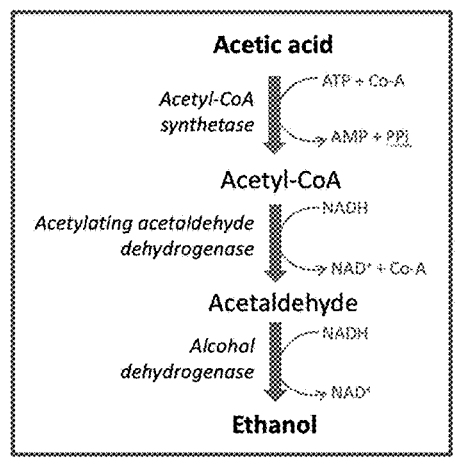
FIG. 2 illustrates the metabolic pathway for conversion of acetic acid to ethanol. Enzyme names are italicized.

Fermentation products, like ethanol, can be obtained using batch/batch-fed fermentation as well as continuous fermentation. Continuous fermentations typically include an acid treatment step that is performed on concentrated yeast at the end of a fermentation cycle. Traditionally, this treatment involves addition of water-diluted sulphuric acid (pH 1.8-2.5) to the biomass and holding the cells at low pH for 1 to 3 hours. The purpose of the acid treatment is to reduce the number of contaminating bacteria in the cell concentrate before the fermenting yeast are recycled into a new round of fermentation. The acid treatment does reduce the total number of contaminating cells. As indicated in the present disclosure, it is contemplated to use an acidic treatment in combination with an antimicrobial composition to further reduce the number and/or the activity of contaminating microbial cells, not only during continuous fermentations but also during batch and fed-batch fermentations.

The present disclosure concerns a process for reducing the activity associated with microbial contamination in a yeast medium prior to propagation and/or fermentation. The process can be used prior to propagation, prior to a batch/batch-fed fermentation, prior to a continuous fermentation or between two cycles of a continuous fermentation. In some embodiments, the process can reduce or alleviate the need to use antibiotics to control microbial contamination during the propagation and/or the fermentation process. The process comprises acidifying, with a strong acid, the yeast medium and incubating the acidified medium for a certain period of time. The antimicrobial composition is added to the yeast medium prior to, during and/or after the acidification step. The antimicrobial composition comprises at least one weak acid (also referred to as a proton ionophore). The process comprises adjusting the pH of the medium below the pKa of at least one weak acid of the antimicrobial composition. Without wishing to be bound to theory, the antimicrobial property of the weak acid(s) of the antimicrobial composition stems from the fact that, in its undissociated state, it is soluble in the cell membrane and so can move from outside the contaminating cell into the cytoplasm by simple diffusion. The near-neutral intracellular pH favored by contamination microbes results in immediate acid dissociation and release of protons and anions inside the contaminating cell. If the rate of intracellular proton release exceeds cytoplasmic buffering capacity or the capability of proton efflux systems, internal pH begins to fall and cellular functions are eventually inhibited. The inhibitory properties of the proton ionophore(s)/weak acids are not due exclusively to cytoplasmic acidification from proton release and subsequent inhibition of acid sensitive enzymes; the accumulation of acid anions within the cell may also inhibit cellular function by several mechanisms that disrupt metabolism, including increased cytoplasmic turgor and altered cytoplasmic buffering capacity.

Because the antimicrobial composition can reduce the viability of fermenting microbial cells (like bacteria and yeasts), the present disclosure also provides fermenting microorganisms which can detoxify and/or are resistant to the component(s) of the antimicrobial composition.

The process of the present disclosure can be used to reduce the population, the metabolic activity and/or viability of contaminating microbial cells. In some embodiments, the process can be used to reduce the population, the metabolic activity and/or viability of contaminating microbial (e.g., bacterial) cells. In some embodiments, the processes of the present disclosure can be used to enhance the fermentation yield (for example for increasing total ethanol production).

The process of the present disclosure includes processes for making a medium for a yeast. As used in the context of the present disclosure, the expression "medium for a yeast" (or yeast medium) refers to a medium suitable for the propagation of the yeast and/or for fermentation by the yeast. Therefore, the term "medium" encompasses both a "fermentation medium" and a "propagation medium" as well as media for the combined propagation and fermentation of the yeast. The media of the present disclosure also comprise a biomass. Yeasts are facultative anaerobes, are capable of respiratory reproduction under aerobic conditions and fermentative reproduction under anaerobic conditions. In many commercial applications, yeast are propagated under aerobic conditions to maximize the conversion of a substrate to a yeast biomass. The propagated yeast biomass can be used in a subsequent fermentation under anaerobic conditions to produce a desired metabolite (from the same or a different substrate than the propagation medium). In some embodiments, there is no clear distinction between the propagation phase and the fermentation phase as the yeasts added to a medium is intended to propagate and ferment. In an embodiment, the biomass that is included in the medium comprises or is derived from corn.

The propagation process can be a continuous method, a batch method or a fed-batch method. The propagation medium (e.g., the medium that can be used to propagate the yeasts and optionally the lactic acid bacteria) can comprise a carbon source (such as, for example, molasses, sucrose, glucose, dextrose syrup, ethanol, corn, glycerol, corn steep liquor and/or a lignocellulosic biomass), a nitrogen source (such as, for example, ammonia or another inorganic source of nitrogen) and a phosphorous source (such as, for example, phosphoric acid or another inorganic source of phosphorous). The propagation medium can further comprises additional micronutrients such as vitamins and/or minerals to support the propagation of the yeast. In an embodiment, the propagation medium comprises or is derived from corn (in some embodiments, it can be derived from saccharified corn mash). In another embodiment, the propagation medium comprises or is derived from molasses. In another embodiment, the propagation medium comprises or is derived from sugar cane.

The fermentation medium can be the same as the propagation medium or it can be different. When the fermentation medium is different from the propagation medium, the propagated yeasts can be dissociated from one or more components of the propagation medium prior to their introduction in the fermentation medium. The process can also include modifying the propagation medium obtained after the propagation step to provide a yeast composition comprising the propagated yeast population (intended to be included in the fermentation medium). In an embodiment for providing a yeast composition, at least one component of the mixture obtained after propagation is removed from the culture medium to provide the yeast composition. This component can be, without limitation, water, amino acids, peptides and proteins, nucleic acid residues and nucleic acid molecules, cellular debris, fermentation products, etc. In an embodiment, the formulating step comprises substantially isolating the propagated yeasts from the components of the propagation medium. As used in the context of the present disclosure, the expression "substantially isolating" refers to the removal of the majority of the components of the propagation medium from the propagated yeasts. In some embodiments, "substantially isolating" refers to concentrating the propagated yeasts to at least 5, 10, 15, 20, 25, 30, 35, 45% or more when compared to the concentration of the propagated yeasts prior to the isolation. In order to provide the yeast composition, the propagated yeasts can be centrifuged (and the resulting cellular pellet comprising the propagated yeasts can optionally be washed), filtered and/or dried (optionally using a vacuum-drying technique). The isolated yeasts can then be formulated in a yeast composition. The yeast composition can be provided in an active or a semi-active form. The yeast composition can be provided in a liquid, semi-solid or dry form. In an embodiment, the yeast composition can be provided in the form of a cream yeast. The yeast composition can also include, in some embodiment, propagated recombinant lactic acid bacteria host cells.

The fermentation process can be a continuous method, a batch method or a fed-batch method. The fermentation medium (e.g., the medium that can be fermented by the yeasts and optionally the lactic acid bacteria) can comprise a carbon source (such as, for example, molasses, sucrose, glucose, dextrose syrup, ethanol, corn, glycerol, corn steep liquor and/or a lignocellulosic biomass), a nitrogen source (such as, for example, ammonia or another inorganic source of nitrogen) and a phosphorous source (such as, for example, phosphoric acid or another inorganic source of phosphorous). The fermentation medium can further comprises additional micronutrients such as vitamins and/or minerals to support fermentation. The propagated propagation medium or the propagated yeast and optionally lactic acid bacteria population can be added to the fermentation medium.

In an embodiment, the fermentation medium can include fermentable materials which contain C6 sugar as for example fructose, glucose, galactose, sucrose, maltose or starch, as well as their degradation products. As an example, the fermentable material can comprise be a fruit (apple, grape, pears, plums, cherries, peaches), a plant (sugar cane, agava, cassava, ginger), a sugar material (honey, molasse), a starchy material (rice, rye, corn, Sorghum, millet, barley, wheat, potatoes) or a derived product (grape must, apple mash, malted grain, crushed fruit, fruit puree, fruit juice, fruit must, plant mash, gelatinized and saccharified starch from different plant origins as rice, corn, sorghum, wheat, barley).

In another embodiment, the fermentation medium can comprise a starchy material. In the context of the present disclosure, a "starchy material" refers to a material that contains starch that could be converted into alcohol by a yeast during alcoholic fermentation. Starchy material could be for example, gelatinized and saccharified starch from cereals, grains (wheat, barley, rice, buckwheat) or grain derived-products (malted grain or a wort) or vegetable (potatoes, beets). In yet another embodiment, the fermentation medium can be or comprise, but is not limited to, malt, barley, wheat, rye, oats, corn, buckwheat, millet, rice, or sorghum. In a specific embodiment, the fermentation medium comprises, as the majority (e.g., major source) of carbohydrates, maltose and maltotriose. In such embodiments, other carbohydrates, such as glucose or fructose can be present, but in a lesser amount than maltose and maltotriose.

In additional embodiments, the fermentation medium can include starch, sugar and/or lignocellulosic materials. Starch materials can include, but are not limited to, mashes such as corn, wheat, rye, barley, rice, or milo. Sugar materials can include, but are not limited to, sugar beets, artichoke tubers, sweet sorghum, molasses or cane. The terms "lignocellulosic material", "lignocellulosic substrate" and "cellulosic biomass" mean any type of biomass comprising cellulose, hemicellulose, lignin, or combinations thereof, such as but not limited to woody biomass, forage grasses, herbaceous energy crops, non-woody-plant biomass, agricultural wastes and/or agricultural residues, forestry residues and/or forestry wastes, paper-production sludge and/or waste paper sludge, waste-water-treatment sludge, municipal solid waste, corn fiber from wet and dry mill corn ethanol plants and sugar-processing residues. The terms "hemicellulosics", "hemicellulosic portions" and "hemicellulosic fractions" mean the non-lignin, non-cellulose elements of lignocellulosic material, such as but not limited to hemicellulose (i.e., comprising xyloglucan, xylan, glucuronoxylan, arabinoxylan, mannan, glucomannan and galactoglucomannan), pectins (e.g., homogalacturonans, rhamnogalacturonan I and II, and xylogalacturonan) and proteoglycans (e.g., arabinogalactan-polypeptide, extensin, and pro line-rich polypeptides).

In a non-limiting example, the lignocellulosic material can include, but is not limited to, woody biomass, such as recycled wood pulp fiber, sawdust, hardwood, softwood, and combinations thereof; grasses, such as switch grass, cord grass, rye grass, reed canary grass, miscanthus, or a combination thereof; sugar-processing residues, such as but not limited to sugar cane bagasse; agricultural wastes, such as but not limited to rice straw, rice hulls, barley straw, corn cobs, cereal straw, wheat straw, canola straw, oat straw, oat hulls, and corn fiber; stover, such as but not limited to soybean stover, corn stover; succulents, such as but not limited to, agave; and forestry wastes, such as but not limited to, recycled wood pulp fiber, sawdust, hardwood (e.g., poplar, oak, maple, birch, willow), softwood, or any combination thereof. Lignocellulosic material may comprise one species of fiber; alternatively, lignocellulosic material may comprise a mixture of fibers that originate from different lignocellulosic materials. Other lignocellulosic materials are agricultural wastes, such as cereal straws, including wheat straw, barley straw, canola straw and oat straw; corn fiber; stovers, such as corn stover and soybean stover; grasses, such as switch grass, reed canary grass, cord grass, and miscanthus; or combinations thereof.

It will be appreciated that suitable lignocellulosic material may be any feedstock that contains soluble and/or insoluble cellulose, where the insoluble cellulose may be in a crystalline or non-crystalline form. In various embodiments, the lignocellulosic biomass comprises, for example, wood, corn, corn stover, sawdust, bark, molasses, sugarcane, leaves, agricultural and forestry residues, grasses such as switchgrass, ruminant digestion products, municipal wastes, paper mill effluent, newspaper, cardboard or combinations thereof.

Paper sludge is also a viable feedstock for lactate or acetate production. Paper sludge is solid residue arising from pulping and paper-making, and is typically removed from process wastewater in a primary clarifier. The cost of disposing of wet sludge is a significant incentive to convert the material for other uses, such as conversion to ethanol. Processes provided by the present invention are widely applicable. Moreover, the saccharification and/or fermentation products may be used to produce ethanol or higher value added chemicals, such as organic acids, aromatics, esters, acetone and polymer intermediates.

In an embodiment, the fermentation medium comprises or is derived from corn (in some embodiments, it can be derived from saccharified corn mash). In another embodiment, the fermentation medium comprises or is derived from sugar cane.

The present disclosure provides that the process can include the use of a lactic acid bacteria (LAB) and a yeast. The lactic acid bacteria is not considered to be a contaminating microbial cell since it is purposefully added to the medium to convert the medium into a fermentation product. As such, the LAB will be considered to be a fermenting microbial (bacterial) cell. The yeast is not considered to be a contaminating microbial cell since it is purposefully added to convert the medium into a fermentation product. In the latter case, the yeast will be considered to be a fermenting microbial (yeast) cell. In the context of the present disclosure, the expression "contaminating microbial cell" refers to a microbe (such as, for example, a yeast or a bacteria) which has not been purposefully added to the medium and its presence decreases the propagation and/or the fermentation yield (when compared to a medium lacking any contaminating microbial cell).

In some embodiments, the yeasts that can be used in the process can be recombinant. The LAB that can be used in the process is a recombinant LAB host cell. The present disclosure provides recombinant yeast/LAB (microbial) host cells that can be used in combination with the antimicrobial composition. The recombinant microbial host cell are obtained by introducing at least one genetic modification in a corresponding ancestral or native microbial host cell. In the context of the present disclosure, when recombinant microbial host cells are qualified as being "genetically engineered" or "recombinant", it is understood to mean that they have been manipulated to either add at least one or more heterologous or exogenous nucleic acid residue and/or remove at least one endogenous (or native) nucleic acid residue. In some embodiments, the one or more nucleic acid residues that are added can be derived from a heterologous cell or the recombinant microbial host cell itself. In the latter scenario, the nucleic acid residue(s) can be added at a genomic location which is different than the native genomic location. Alternatively, the nucleic acid residue(s) can be added at the same genomic location (to provide additional copies). For example, one or more additional copy of a native gene at its native genomic location is also considered to be a heterologous nucleic acid molecule. The genetic manipulations did not occur in nature and are the results of in vitro manipulations of the native microbial host cell.

The genetic modifications of the present disclosure can be aimed at expressing a heterologous polypeptide. In some embodiments, the genetic modification comprises introducing one or more heterologous nucleic acid molecule encoding one or more heterologous polypeptide in the recombinant microbial host cell. When expressed in a recombinant microbial host cell, the polypeptides described herein are encoded on one or more heterologous nucleic acid molecule. The term "heterologous" when used in reference to a nucleic acid molecule (such as a promoter or a coding sequence) refers to a nucleic acid molecule that is not natively found in the recombinant microbial host cell. "Heterologous" also includes a native coding region, or portion thereof, that is removed from the source organism and subsequently reintroduced into the source organism in a form that is different from the corresponding native state. This form can be, for example, the introduction of at least one copy of a native at a location which is different from its native location and/or introduction of at least one additional copy of a native gene at its native location. With respect to nucleic acid molecules, the term "heterologous" also refers to corresponding degenerate sequences capable of encoding a polypeptide having the same amino acid sequence. The term "heterologous" when used in reference to a polypeptide refers to a polypeptide which is expressed from the heterologous nucleic acid molecule. As such, polypeptide can be considered "heterologous" even though it can also be natively expressed by the recombinant microbial host cell.

The heterologous nucleic acid molecule is purposively introduced into the recombinant microbial host cell. The term "heterologous" as used herein also refers to an element (nucleic acid or polypeptide) that is derived from a source other than the endogenous source. Thus, for example, a heterologous element could be derived from a different strain of host cell, or from an organism of a different taxonomic group (e.g., different kingdom, phylum, class, order, family genus, or species, or any subgroup within one of these classifications).

When a heterologous nucleic acid molecule is present in the recombinant microbial host cell, it can be integrated in the host cell's chromosome. The term "integrated" as used herein refers to genetic elements that are placed, through molecular biology techniques, into the chromosome of a host cell. For example, genetic elements can be placed into the chromosomes of the recombinant microbial host cell as opposed to in a vector such as a plasmid or an artificial chromosome carried by the recombinant microbial host cell. Methods for integrating genetic elements into the chromosome of a host cell are well known in the art and include homologous recombination. The heterologous nucleic acid molecule can be present in one or more copies in the recombinant microbial host cell's genome. Alternatively, the heterologous nucleic acid molecule can be independently replicating from the recombinant microbial host cell's chromosome. In such embodiment, the nucleic acid molecule can be stable and self-replicating.

In some embodiments, the heterologous nucleic acid molecule which can be introduced into the recombinant microbial host cells are codon-optimized with respect to the intended recipient recombinant microbial host cell. As used herein the term "codon-optimized coding region" means a nucleic acid coding region that has been adapted for expression in the cells of a given organism by replacing at least one, or more than one, codons with one or more codons that are more frequently used in the genes of that organism. In general, highly expressed genes in an organism are biased towards codons that are recognized by the most abundant tRNA species in that organism. One measure of this bias is the "codon adaptation index" or "CAI," which measures the extent to which the codons used to encode each amino acid in a particular gene are those which occur most frequently in a reference set of highly expressed genes from an organism. The CAI of codon optimized heterologous nucleic acid molecule described herein corresponds to between about 0.8 and 1.0, between about 0.8 and 0.9, or about 1.0.

In some embodiments, the heterologous nucleic acid molecule(s) which can be introduced into the recombinant microbial cells are codon-optimized with respect to the intended recipient recombinant microbial cell so as to limit or prevent homologous recombination with the corresponding native gene.

The heterologous nucleic acid molecules of the present disclosure comprise a coding region for the one or more polypeptides (including enzymes) to be expressed by the recombinant microbial host cell. A DNA or RNA "coding region" is a DNA or RNA molecule which is transcribed and/or translated into a polypeptide in a cell in vitro or in vivo when placed under the control of appropriate regulatory sequences. "Suitable regulatory regions" refer to nucleic acid regions located upstream (5' non-coding sequences), within, or downstream (3' non-coding sequences) of a coding region, and which influence the transcription, RNA processing or stability, or translation of the associated coding region. Regulatory regions may include promoters, translation leader sequences, RNA processing sites, effector binding sites and stem-loop structures. The boundaries of the coding region are determined by a start codon at the 5' (amino) terminus and a translation stop codon at the 3' (carboxyl) terminus. A coding region can include, but is not limited to, prokaryotic regions, cDNA from mRNA, genomic DNA molecules, synthetic DNA molecules, or RNA molecules. If the coding region is intended for expression in a eukaryotic cell, a polyadenylation signal and transcription termination sequence will usually be located 3' to the coding region. In an embodiment, the coding region can be referred to as an open reading frame. "Open reading frame" is abbreviated ORF and means a length of nucleic acid, either DNA, cDNA or RNA, that comprises a translation start signal or initiation codon, such as an ATG or AUG, and a termination codon and can be potentially translated into a polypeptide sequence.

The heterologous nucleic acid molecules described herein can comprise a non-coding region, for example a transcriptional and/or translational control regions. "Transcriptional and translational control regions" are DNA regulatory regions, such as promoters, enhancers, terminators, and the like, that provide for the expression of a coding region in a host cell. In eukaryotic cells, polyadenylation signals are considered control regions.

The heterologous nucleic acid molecule can be introduced and optionally maintained in the recombinant microbial host cell using a vector. A "vector," e.g., a "plasmid", "cosmid" or "artificial chromosome" (such as, for example, a bacterial or a yeast artificial chromosome) refers to an extra chromosomal element and is usually in the form of a circular double-stranded DNA molecule. Such vectors may be autonomously replicating sequences, genome integrating sequences, phage or nucleotide sequences, linear, circular, or supercoiled, of a single- or double-stranded DNA or RNA, derived from any source, in which a number of nucleotide sequences have been joined or recombined into a unique construction which is capable of introducing a promoter fragment and DNA sequence for a selected gene product along with appropriate 3' untranslated sequence into a recombinant microbial host cell.

"Promoter" refers to a DNA fragment capable of controlling the expression of a coding sequence or functional RNA. The term "expression," as used herein, refers to the transcription and stable accumulation of sense (mRNA) from the heterologous nucleic acid molecule described herein. Expression may also refer to translation of mRNA into a polypeptide. Promoters may be derived in their entirety from a native gene, or be composed of different elements derived from different promoters found in nature, or even comprise synthetic DNA segments. It is understood by those skilled in the art that different promoters may direct the expression at different stages of propagation or fermentation or in response to different environmental or physiological conditions (oxygen content, glucose content, etc.). Promoters which cause a gene to be expressed in most cells at most times at a substantial similar level are commonly referred to as "constitutive promoters". It is further recognized that since in most cases the exact boundaries of regulatory sequences have not been completely defined, DNA fragments of different lengths may have identical promoter activity. A promoter is generally bounded at its 3' terminus by the transcription initiation site and extends upstream (5' direction) to include the minimum number of bases or elements necessary to initiate transcription at levels detectable above background. Within the promoter will be found a transcription initiation site (conveniently defined for example, by mapping with nuclease S1), as well as polypeptide binding domains (consensus sequences) responsible for the binding of the polymerase.

The promoter of the present disclosure has the ability to control (e.g., limit, allow or favor) the expression of the nucleic acid molecule to which it is operatively linked to. In the context of the present disclosure, the expressions "operatively linked" or "operatively associated" refers to fact that the promoter is physically associated to the nucleotide acid molecule coding for the one or more polypeptide in a manner that allows, under certain conditions, for expression of the one or more polypeptide from the nucleic acid molecule. In an embodiment, the promoter can be located upstream (5') of the nucleic acid sequence coding for the one or more enzyme. In still another embodiment, the promoter can be located downstream (3') of the nucleic acid sequence coding for the one or more enzyme. In the context of the present disclosure, one or more than one promoter can be included in the heterologous nucleic acid molecule. When more than one promoter is included in the heterologous nucleic acid molecule, each of the promoter is operatively linked to the nucleic acid sequence coding for the one or more polypeptide. The promoters can be located, in view of the nucleic acid molecule coding for the one or more polypeptide, upstream, downstream as well as both upstream and downstream.

A fragment of a promoter can be used to allow the expression of each heterologous polypeptides in the recombinant microbial host cell. In the context of the present disclosure, the expression "functional fragment of a promoter" when used in combination to a promoter refers to a shorter nucleic acid sequence than the native promoter which retain the ability to control the expression of the nucleic acid sequence encoding the heterologous polypeptide. Usually, functional fragments are either 5' and/or 3' truncation of one or more nucleic acid residue from the native promoter nucleic acid sequence.

The promoter can be heterologous to the nucleic acid molecule encoding the one or more polypeptides. The promoter can be heterologous or derived from a strain being from the same genus or species as the recombinant microbial host cell. In an embodiment, the promoter is derived from the same genus or species of the recombinant microbial host cell and the heterologous polypeptide is derived from different genus that the recombinant microbial host cell. In an embodiment, the promoter used in the heterologous nucleic acid molecule is the same promoter that controls the expression of the encoded polypeptide in its native context.

In an embodiment, the present disclosure concerns the expression of one or more polypeptide, a variant thereof or a fragment thereof in a recombinant microbial host cell. A variant comprises at least one amino acid difference when compared to the amino acid sequence of the native polypeptide and exhibits a biological activity substantially similar to the native polypeptide. The polypeptide "variants" have at least 50%, 55%, 60%, 65%, 70%, 75%, 80%, 85%, 90%, 95%, 96%, 97%, 98% or 99% identity to the polypeptides described herein. The heterologous "variants" can have at least 50%, 55%, 60%, 65%, 70%, 75%, 80%, 85%, 90%, 95%, 96%, 97%, 98% or 99% of the biological activity associated with the native polypeptides. The term "percent identity", as known in the art, is a relationship between two or more polypeptide sequences or two or more polynucleotide sequences, as determined by comparing the sequences. The level of identity can be determined conventionally using known computer programs. Identity can be readily calculated by known methods, including but not limited to those described in: Computational Molecular Biology (Lesk, A. M., ed.) Oxford University Press, NY (1988); Biocomputing: Informatics and Genome Projects (Smith, D. W., ed.) Academic Press, NY (1993); Computer Analysis of Sequence Data, Part I (Griffin, A. M., and Griffin, H. G., eds.) Humana Press, NJ (1994); Sequence Analysis in Molecular Biology (von Heinje, G., ed.) Academic Press (1987); and Sequence Analysis Primer (Gribskov, M. and Devereux, J., eds.) Stockton Press, NY (1991). Preferred methods to determine identity are designed to give the best match between the sequences tested. Methods to determine identity and similarity are codified in publicly available computer programs. Sequence alignments and percent identity calculations may be performed using the Megalign program of the LASERGENE bioinformatics computing suite (DNASTAR Inc., Madison, Wis.). Multiple alignments of the sequences disclosed herein were performed using the Clustal method of alignment (Higgins and Sharp (1989) CABIOS. 5:151-153) with the default parameters (GAP PENALTY=10, GAP LENGTH PEN ALT Y=10). Default parameters for pairwise alignments using the Clustal method were KTUPLB 1, GAP PENALTY=3, WINDOW=5 and DIAGONALS SAVED=5.

The variant polypeptide described herein may be (i) one in which one or more of the amino acid residues are substituted with a conserved or non-conserved amino acid residue (preferably a conserved amino acid residue) and such substituted amino acid residue may or may not be one encoded by the genetic code, or (ii) one in which one or more of the amino acid residues includes a substituent group, or (iii) one in which the mature polypeptide is fused with another compound, such as a compound to increase the half-life of the polypeptide (for example, polyethylene glycol), or (iv) one in which the additional amino acids are fused to the mature polypeptide for purification of the polypeptide.

A "variant" of the polypeptide can be a conservative variant or an allelic variant. As used herein, a conservative variant refers to alterations in the amino acid sequence that do not adversely affect the biological functions of the polypeptide. A substitution, insertion or deletion is said to adversely affect the polypeptide when the altered sequence prevents or disrupts a biological function associated with the heterologous polypeptide. For example, the overall charge, structure or hydrophobic-hydrophilic properties of the polypeptide can be altered without adversely affecting a biological activity. Accordingly, the amino acid sequence can be altered, for example to render the polypeptide more hydrophobic or hydrophilic, without adversely affecting the biological activities of the polypeptide.

The heterologous polypeptide can be a fragment of the polypeptide or fragment of the variant polypeptide. A polypeptide fragment comprises at least one less amino acid residue when compared to the amino acid sequence of the full-length polypeptide still possess a biological activity substantially similar to the native full-length polypeptide or full-length polypeptide variant. In some embodiments, the fragment can correspond to the polypeptide amino acid sequence in which the native signal sequence has been removed (and optionally replaced by another signal sequence). Polypeptide "fragments" have at least at least 100, 200, 300, 400, 500 or more consecutive amino acids of the native polypeptide or the polypeptide variant. The polypeptide "fragments" can have at least 50%, 55%, 60%, 65%, 70%, 75%, 80%, 85%, 90%, 95%, 96%, 97%, 98% or 99% identity to the polypeptides described herein. The polypeptide "fragments" can have at least 50%, 55%, 60%, 65%, 70%, 75%, 80%, 85%, 90%, 95%, 96%, 97%, 98% or 99% of the biological activity associated with the native polypeptides or the variant polypeptide.

In some additional embodiments, the present disclosure also provides expressing a polypeptide encoded by a gene ortholog of a gene known to encode the polypeptide. A "gene ortholog" is understood to be a gene in a different species that evolved from a common ancestral gene by speciation. In the context of the present disclosure, a gene ortholog encodes polypeptide exhibiting a biological activity substantially similar to the native polypeptide.

In some further embodiments, the present disclosure also provides expressing a polypeptide encoded by a gene paralog of a gene known to encode the polypeptide. A "gene paralog" is understood to be a gene related by duplication within the genome. In the context of the present disclosure, a gene paralog encodes a polypeptide that could exhibit additional biological functions when compared to the native polypeptide.

Additional genetic modifications can also be included in the recombinant microbial host cell for reducing or inhibiting the expression of a specific targeted gene (which is endogenous to the host cell). In such instances, the genetic modifications can be made in one or all copies of the targeted gene(s), gene orthologs and/or gene paralogs. When the genetic modification is aimed at increasing the expression of a specific targeted gene, the genetic modification can be made in one or multiple genetic locations.

Antimicrobial Composition

The present disclosure concerns an antimicrobial composition as well as processes using same for reducing microbial contamination in a medium for a yeast. The antimicrobial composition of the present disclosure comprises at least one weak acid (also referred to as a proton ionophore). The antimicrobial composition of the present disclosure is used in combination with a strong acid to increase the concentration of the undissociated form of the ionophores. As it is known in the art, a "weak" acid refers to an acid that partially dissociates into its ions in an aqueous solution or water. This is in contrast to a "strong" acid which refers to an acid that totally dissociates into its ions in an aqueous solution or water. The antimicrobial composition of the present disclosure includes one or more weak acid and excludes a strong acid. It is however intended that in the process of the present disclosure, the antimicrobial composition be used in combination with a strong acid. The antimicrobial composition can be included in a medium intended for the propagation and/or the fermentation of a yeast (including a recombinant yeast host cell).

The antimicrobial composition comprises at least one weak acid. In an embodiment, the antimicrobial comprises no more than one weak acid. In some embodiments, the antimicrobial composition comprises at least two weak acids. In an embodiment, the antimicrobial composition comprises no more than two weak acids. In additional embodiments, the antimicrobial composition comprises at least three weak acids. In an embodiment, the antimicrobial composition comprises no more than three weak acids. In further embodiments, the antimicrobial composition comprises at least four weak acids. In an embodiment, the antimicrobial composition comprises no more than four weak acids. In yet another embodiment, the antimicrobial composition comprises at least five weak acids (or more). In an embodiment, the antimicrobial composition comprises no more than five weak acids.

The antimicrobial composition is provided in a purified form to the medium. The antimicrobial composition can be provided as a liquid form to the medium. The antimicrobial composition can be provided in a concentrated form to the medium. The antimicrobial composition can be provided to the medium prior to, during and/or after the acidification step with the strong acid. In some embodiments, the antimicrobial composition is provided to the medium prior to the acidification step with the strong acid.

The antimicrobial composition can comprise an organic acid as the one or more weak acid. The weak acid can be, for example, a carboxylic acid, a vinylogous acid or a combination of both. In an embodiment, the total weak acid(s) of the antimicrobial composition can be added to the medium at a concentration equal to or higher than 0.05, 0.06, 0.07, 0.08, 0.09, 0.10, 0.11, 0.12, 0.13, 0.14, 0.15, 0.16, 0.17, 0.18 or 0.19% w/v. In another embodiment, the total weak acid(s) of the antimicrobial composition can be added to the medium at a concentration equal to or lower than 0.20, 0.19, 0.18, 0.17, 0.16, 0.15, 0.14, 0.13, 0.12, 0.11, 0.10, 0.09, 0.08, 0.07, 0.06, 0.05, 0.04 or 0.03% w/v. In still another embodiment, the total weak acid(s) of the antimicrobial composition can be added to the medium at a concentration equal to or higher than 0.05, 0.06, 0.07, 0.08, 0.09, 0.10, 0.11, 0.12, 0.13, 0.14, 0.15, 0.16, 0.17, 0.18 or 0.19% w/v and equal to or lower than 0.20, 0.19, 0.18, 0.17, 0.16, 0.15, 0.14, 0.13, 0.12, 0.11, 0.10, 0.09, 0.08, 0.07, 0.06, 0.05, 0.04 or 0.03% w/v. In still another embodiment, the total weak acid(s) of the antimicrobial composition can be added to the medium at a concentration between 0.05 and 0.20% w/v. In an embodiment, the total weak acid(s) of the antimicrobial composition can be added to the medium at a concentration equal to or higher than 0.05, 0.06, 0.07, 0.08 or 0.09% w/v. In another embodiment, the total weak acid(s) of the antimicrobial composition can be added to the medium at a concentration equal to or lower than 0.10, 0.09, 0.08, 0.07 or 0.06% w/v. In still another embodiment, the total weak acid(s) of the antimicrobial composition can be added to the medium at a concentration equal to or higher than 0.05, 0.06, 0.07, 0.08 or 0.09% w/v and equal to or lower than 0.10, 0.09, 0.08, 0.07 or 0.06% w/v. In still another embodiment, the total weak acid(s) of the antimicrobial composition can be added to the medium at a concentration between 0.05 and 0.10% w/v.

In some embodiments, the antimicrobial composition can comprise a carboxylic acid (e.g., a subtype of organic acid) as one or more weak acid. Known carboxylic acids that can be used in the antimicrobial composition of the present disclosure include, but are not limited to, carbonic acid, formic acid, methanoic acid, acetic acid, lactic acid, propionic acid, butyric acid, valeric acid, caproic acid, enanthic acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid as well as any combinations thereof. In an embodiment, the antimicrobial composition comprises acetic acid as the carboxylic acid, alone or in combination with another carboxylic acid, such as, for example, formic acid. In another embodiment, the antimicrobial composition comprises formic acid as the carboxylic acid, alone or in combination with another carboxylic acid, such as, for example acetic acid. In an embodiment, the antimicrobial composition comprises lactic acid (a pure enantiomer or a racemic mixture) as the carboxylic acid, alone or in combination with another carboxylic acid. In still another embodiment, the antimicrobial composition comprises acetic acid and formic acid as the carboxylic acids.

In an embodiment, the total carboxylic acid(s) of the antimicrobial composition can be added to the medium at a concentration equal to or higher than 0.05, 0.06, 0.07, 0.08, 0.09, 0.10, 0.11, 0.12, 0.13, 0.14, 0.15, 0.16, 0.17, 0.18 or 0.19% w/v. In another embodiment, the total carboxylic acid(s) of the antimicrobial composition can be added to the medium at a concentration equal to or lower than 0.20, 0.19, 0.18, 0.17, 0.16, 0.15, 0.14, 0.13, 0.12, 0.11, 0.10, 0.09, 0.08, 0.07, 0.06, 0.05, 0.04 or 0.03% w/v. In still another embodiment, the total carboxylic acid(s) of the antimicrobial composition can be added to the medium at a concentration equal to or higher than 0.05, 0.06, 0.07, 0.08, 0.09, 0.10, 0.11, 0.12, 0.13, 0.14, 0.15, 0.16, 0.17, 0.18 or 0.19% w/v and equal to or lower than 0.20, 0.19, 0.18, 0.17, 0.16, 0.15, 0.14, 0.13, 0.12, 0.11, 0.10, 0.09, 0.08, 0.07, 0.06, 0.05, 0.04 or 0.03% w/v. In still another embodiment, the total carboxylic acid(s) of the antimicrobial composition can be added to the medium at a concentration between 0.05 and 0.20% w/v. In an embodiment, the total carboxylic acid(s) of the antimicrobial composition can be added to the medium at a concentration equal to or higher than 0.05, 0.06, 0.07, 0.08 or 0.09% w/v. In another embodiment, the total carboxylic acid(s) of the antimicrobial composition can be added to the medium at a concentration equal to or lower than 0.10, 0.09, 0.08, 0.07 or 0.06% w/v. In still another embodiment, the total carboxylic acid(s) of the antimicrobial composition can be added to the medium at a concentration equal to or higher than 0.05, 0.06, 0.07, 0.08 or 0.09% w/v and equal to or lower than 0.10, 0.09, 0.08, 0.07 or 0.06% w/v. In still another embodiment, the total carboxylic acid(s) of the antimicrobial composition can be added to the medium at a concentration between 0.05 and 0.10% w/v.

The antimicrobial composition can comprise a vinylogous acid (e.g., a subtype of the organic acid). In some embodiments, the vinylogous acid can be a hop acid or a combination of hop acids. Hop acids, also referred to as alpha acids ($\alpha$ acids), are a class of compounds found in the resin of the flowers of the hop plant. Hop acids may be isomerized into iso-$\alpha$-acids by the application of heat in solution (for example by adding hops to the boiling wort). Common hop acids include, but are not limited to humulone, adhumulone, cohumulone, posthumulone, and prehumulone. The most common iso-$\alpha$-acids are cis- and trans-isohumulone. The antimicrobial composition can include a single hop acid or a combination of hop acids, which may be isomerized or not. The antimicrobial composition can include a combination of hop acids, alone or in combination with one or more additional weak acid (such as, for example, another carboxylic acid for example). In a specific embodiment, the antimicrobial composition comprises a combination of hop acids, acetic acid and formic acid.

In an embodiment, the total vinylogous acid(s) of the antimicrobial composition can be added to the medium at a concentration equal to or higher than 5, 10, 15, 20, 25, 30, 35, 40, 45, 50, 55, 60, 65, 70, 75, 80, 85, 90 or 95 ppm. In another embodiment, the total vinylogous acid(s) of the antimicrobial composition can be added to the medium at a concentration equal to or lower than 100, 95, 90, 85, 80, 75, 70, 65, 60, 55, 50, 45, 40, 35, 30, 25, 20, 15 or 10 ppm. In still another embodiment, the total vinylogous acid(s) of the antimicrobial composition can be added to the medium at a concentration equal to or higher than 5, 10, 15, 20, 25, 30, 35, 40, 45, 50, 55, 60, 65, 70, 75, 80, 85, 90 or 95 ppm and equal to or lower than 100, 95, 90, 85, 80, 75, 70, 65, 60, 55, 50, 45, 40, 35, 30, 25, 20, 15 or 10 ppm. In still another embodiment, the total vinylogous acid(s) of the antimicrobial composition can be added to the medium at a concentration between 5 and 100 ppm. In an embodiment, the total vinylogous acid(s) of the antimicrobial composition can be added to the medium at a concentration equal to or higher than 10, 15, 20 or 25 ppm. In another embodiment, the total vinylogous acid(s) of the antimicrobial composition can be added to the medium at a concentration equal to or lower than 30, 25, 20 or 15 ppm. In still another embodiment, the total vinylogous acid(s) of the antimicrobial composition can be added to the medium at a concentration equal to or higher than 10, 15, 20 or 25 ppm and equal to or lower than 30, 25, 20 or 15 ppm. In still another embodiment, the total vinylogous acid(s) of the antimicrobial composition can be added to the medium at a concentration between 10 and 30 ppm.

In some embodiments, the antimicrobial composition comprises at least one carboxylic acid and at least one vinylogous acid. In such embodiment, the ratio between the total carboxylic acid and the total vinylogous acid in the antimicrobial composition and the medium can be between 0.01 to 99.99%.

Optionally the antimicrobial composition can include a bacteriocin or be used in combination with a bacteriocin (which could be added independently to the medium). The term bacteriocin can refer to the acid stable bacteriocin, the second or the third bacteriocin which can independently added to the medium. In one embodiment, the antimicrobial composition comprises one or more bacteriocin. Alternatively or in combination, the antimicrobial composition is used in combination with one or more bacteriocin (e.g., the second and optionally a third bacteriocin) that is present in the medium. In such embodiment, the bacteriocin(s) present in the medium can be added from a purified/exogenous source or can be provided from the metabolic activity of a recombinant LAB host cell. When present in the antimicrobial composition, the bacteriocin can exhibit stability in acidic conditions (e.g., be acid stable), especially if it intended to be placed in contact with the strong acid. In an embodiment, the acid stable bacteriocin exhibits at least 50% of its antimicrobial activity in an acidic pH (at pH 3.2 for example) when compared to the bacteriocin's optimal pH (which may be a neutral pH). In an embodiment, the acid stable bacteriocin exhibits at least 50% of its antimicrobial activity at the pH of the acidified medium when compared to the bacteriocin's optimal pH (which may be a neutral pH).

In an embodiment, the bacteriocin is a lantibiotic, a class II (including class IIa (such as, for example, pediocin), IIb (such as, for example, brochocin for example) or IIc), class III or a class IV (such as, for example, gassericin) bacteriocin. Known bacteriocins include, but are not limited to, acidocin, actagardine, agrocin, alveicin, aureocin, aureocin A53, aureocin A70, bisin, carnocin, carnocyclin, caseicin, cerein, circularin A, colicin, curvaticin, divercin, duramycin, enterocin, enterolysin, epidermin/gallidermin, erwiniocin, gardimycin, gassericin A, glycinecin, halocin, haloduracin, klebicin, lactocin S, lactococcin, lacticin, leucoccin, lysostaphin, macedocin, mersacidin, mesentericin, microbisporicin, microcin S, mutacin, nisin A, nisin Z, paenibacillin, planosporicin, pediocin, pentocin, plantaricin, pneumocyclicin, pyocin, reutericin 6, sakaci, salivaricin, sublancin, subtilin, sulfolobicin, tasmancin, thuricin 17, trifolitoxin, variacin, vibriocin, warnericin and warnerin. In a specific embodiment, the acid stable bacteriocin comprises or is a lantibiotic or a class IIc bacteriocin.

In an embodiment, the antimicrobial composition comprises a lantibiotic such as nisin or a variant thereof. In embodiments in which the lantibiotic is nisin, the polypeptide having nisin activity can be from *Lactococcus* sp., such as, for example, *Lactococcus lactis*. Nisin can be nisin A, Z, J or Q. Nisin can be, without limitation a polypeptide having the amino acid sequence of any one of 21 to 24, variants thereof (exhibiting nisin antibacterial activity) and fragments thereof (exhibiting nisin antibacterial activity).

In an embodiment, the antimicrobial composition comprises or be used in combination with a class IIc bacteriocin. Class IIc bacteriocin are also referred to as cyclic bacteriocins (Gabrielsen et al., 2004). Class IIc or cyclic bacteriocins include, but are not limited to gasserin A, acidocin B and plantaricyclin A. In an embodiment, the class IIc bacteriocin is gasserin A (having, for example, the amino acid sequence of SEQ ID NO: 29 or 30), a variant thereof (having gasserin A antibacterial activity) or a fragment thereof (having gasserin A antibacterial activity).

The amino acid sequences provided herein for the different bacteriocins do not include such post-translational modifications, but it is understood that a bacteriocin (produced natively or in a recombinant fashion) does not exactly match the amino acid sequence of the different SEQ ID NOs, but the exported bacteriocin can be derived from such amino acid sequences (by post-translational modification).

In an embodiment, the total bacteriocin(s) of the antimicrobial composition can be added to the medium at a concentration equal to or higher than 5, 10, 15, 20, 25, 30, 35, 40, 45, 50, 55, 60, 65, 70, 75, 80, 85, 90, 95, 100, 105, 110, 115, 120, 125, 130, 135, 140 or 145 ppm. In another embodiment, the total bacteriocin(s) of the antimicrobial composition can be added to the medium at a concentration equal to or lower than 150, 145, 140, 135, 130, 125, 120, 115, 110, 105, 100, 95, 90, 85, 80, 75, 70, 65, 60, 55, 50, 45, 40, 35, 30, 25, 20, 15 or 10 ppm. In still another embodiment, the total bacteriocin(s) of the antimicrobial composition can be added to the medium at a concentration equal to or higher than 5, 10, 15, 20, 25, 30, 35, 40, 45, 50, 55, 60, 65, 70, 75, 80, 85, 90, 95, 100, 105, 110, 115, 120, 125, 130, 135, 140 or 145 ppm and equal to or lower than 150, 145, 140, 135, 130, 125, 120, 115, 110, 105, 100, 95, 90, 85, 80, 75, 70, 65, 60, 55, 50, 45, 40, 35, 30, 25, 20, 15 or 10 ppm. In still another embodiment, the total bacteriocin(s) of the antimicrobial composition can be added to the medium at a concentration between 5 and 150 ppm. In an embodiment, the total bacteriocin(s) of the antimicrobial composition can be added to the medium at a concentration equal to or higher than 50, 55, 60, 65, 70, 75, 80, 85, 90 or 95 ppm. In another embodiment, the total bacteriocin(s) of the antimicrobial composition can be added to the medium at a concentration equal to or lower than 100, 95, 90, 85, 80, 75, 70, 65, 60 or 55 ppm. In still another embodiment, the total bacteriocin(s) of the antimicrobial composition can be added to the medium at a concentration equal to or higher than 50, 55, 60, 65, 70, 75, 80, 85, 90 or 95 ppm and equal to or lower than 100, 95, 90, 85, 80, 75, 70, 65, 60 or 55 ppm. In still another embodiment, the total bacteriocin(s) of the antimicrobial composition can be added to the medium at a concentration between 50 and 100 ppm.

Optionally the antimicrobial composition can include an antibiotic or be used in combination with an antibiotic. In one embodiment, the antimicrobial composition comprises one or more antibiotic. Alternatively or in combination, the antimicrobial composition is used in combination with one or more antibiotic that is present in the medium. In such embodiment, the antibiotic(s) present in the medium can be added from a purified/exogenous source. The antibiotic should preferably exhibit stability in acidic conditions. In an embodiment, the antibiotic comprises or is penicillin. In some embodiments, penicillin can be provided to the medium at a concentration between 0.5 and 5 ppm, and, in some additional embodiments, between 1 and 3 ppm. In another embodiment, the antibiotic comprises or is virginiamycin. In such embodiment, virginiamycin can be provided to the medium at a concentration between 0.1 and 5 ppm, and, in some additional embodiments, between 0.1 and 1 ppm. In yet another embodiment, the antibiotic comprises or is a mixture of penicillin and virginiamycin. In such embodiment, the mixture of penicillin and virginiamycin can be provided to the medium at a concentration between 0.1 and 5 ppm, and, in some additional embodiments, between 0.1 and 1 ppm. In still another embodiment, the antibiotic comprises or is streptomycin. In such embodiment, streptomycin can be provided to the medium at a concentration between 0.1 and 2.5 ppm, and, in some additional embodiments, between 0.1 and 1 ppm. In yet another embodiment, the antibiotic comprises or is monensin. In such embodiment, monensin can be provided to the medium at a concentration between 1 and 6 ppm and, in some additional embodiments, between 3 to 5 ppm.

Process Using the Antimicrobial Composition as Well as Associated Medium Obtained In the processes of the present disclosure, the pH of a raw medium (which can be used for propagation, fermentation or both) is adjusted with a strong acid to provide an acidified medium. In the context of the present disclosure, a "raw" medium refers to a medium which has not been submitted to the processes described herein to limit its microbial contamination/activity. It is understood that the raw medium is suspected of comprising contaminating microbial cells, including, but not limited to, contaminating bacterial cells. In some embodiments, the process comprises determining the presence, and optionally the amount and/or the identity of the contaminating microbial cells prior to the acidification step with the strong acid. The pH of the raw medium is adjusted with a strong acid at a pH equal to or below the pKa of the one or more weak acids of the antimicrobial composition to provide the acidified medium. When the antimicrobial composition comprises more than one weak acid each having a different pKa value, the pH of the raw medium can be adjusted at a value to equal to or below the pKa of the weakest acid of the antimicrobial composition to provide the acidified medium. In some specific embodiments, the pH of the raw medium is adjusted with the strong acid to a pH of 3.2 or below. In some specific embodiments, the pH of the raw medium is adjusted with the strong acid to a pH of 2.5 or below. The amount or concentration of the antimicrobial composition that is being added to the raw or the acidified medium can be adjusted in function of the extent of the microbial contamination and/or the solid content of the medium. The total number of contaminating microbial cells in the acidified medium when compared to the raw medium or to a corresponding control medium which has not been treated with the antimicrobial composition can be reduced by at least 5, 10, 15, 20, 25, 30, 35, 40, 45, 50, 55, 60, 65, 70, 75, 80, 85, 90, 95% or more. The viability of the contaminating microbial cells in the acidified medium when compared to the raw medium or to a corresponding control medium which has not been treated with the antimicrobial composition can be reduced by at least 5, 10, 15, 20, 25, 30, 35, 40, 45, 50, 55, 60, 65, 70, 75, 80, 85, 90, 95% or more. The metabolic activity of the contaminating microbial cells in the acidified medium when compared to the raw medium or to a corresponding control medium which has not been treated with the antimicrobial composition can be reduced by at least 5, 10, 15, 20, 25, 30, 35, 40, 45, 50, 55, 60, 65, 70, 75, 80, 85, 90, 95% or more.

In the present disclosure, a process for making a medium for a yeast (e.g., a medium that is suitable for the propagation of the yeast and/or to be fermented by the yeast) is provided. In such process, the pH of a raw medium is adjusted with a strong acid to provide an acidified medium. In some embodiments, the process can include providing a raw medium to be acidified. In additional embodiments, the process can include determining the presence, number, metabolic activity or identity of the contaminating microbial cells suspected to be present in the raw medium. In a further embodiment, the process can include determining the presence, number, metabolic activity or identity of the contaminating microbial cells suspected to be present in the acidified medium. The strong acids that can be used in the process of the present disclosure, include, without limitation, hydrochloric acid, nitric acid, sulfuric acid, hydrobromic acid, hydroiodic acid, perchloric acid, chloric acid as well as any combinations thereof. In an embodiment, the strong acid is sulfuric acid.

In the processes of the present disclosure, the strong acid is added to the raw medium until the pH of the acidified medium reaches or is below the pKa of the at least one weak acid of the antimicrobial composition. If the antimicrobial composition comprises more than one weak acid with different pKa, the strong acid is added to the raw medium until the pH of the acidified medium reaches or is below the pKa of the weakest acid of the antimicrobial composition. In an embodiment, the pH of the acidified medium is adjusted to 5.0, 4.9, 4.8, 4.7, 4.6, 4.5, 4.4, 4.3, 4.2, 4.1, 4.0, 3.9, 3.8, 3.7, 3.6, 3.5, 3.4, 3.3, 3.2, 3.1, 3.0 or below. In some embodiments, the strong acid is added to the raw medium until a pH of 3.2 or lower is achieved. In an embodiment in which the antimicrobial composition comprises a hop acid as its weakest acid, the pH of the acidified medium is adjusted to 3.1 or below. In an embodiment in which the antimicrobial composition comprises acetic acid as its weakest acid, the pH of the acidified medium is adjusted to 4.8 or below. In an embodiment in which the antimicrobial composition comprises formic acid as its weakest acid, the pH of the acidified medium is adjusted to 3.8 or below. In an embodiment in which the antimicrobial composition comprises acetic acid, formic acid and a hop acid, the pH of the acidified medium is adjusted below 3.2. As indicated herein, the raw medium or the acidified medium may include a yeast or a recombinant yeast host cell. In some embodiments, it will be understood that the pH of the acidified medium should correspond to a pH which does not substantially alter the viability or the metabolic activity of the yeast or the recombinant yeast host cell.

In the processes of the present disclosure, the antimicrobial composition can be added to the raw medium, prior to the addition of the strong acid. Alternatively or in combination, the antimicrobial composition can be added to the raw medium at the same time the strong acid is being added. Alternatively or in combination, the antimicrobial composition can be added to the acidified medium after the strong acid is being added.

In the processes described herein, the acidified medium (which comprises the antimicrobial composition) is maintained at the adjusted pH for a period of time and a temperature so as to decrease the contaminating microbial activity (viability and/or metabolic activity) of the acidified medium when compared to the raw medium. The acidified medium can be maintained at the adjusted pH for 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180 minutes or more. In some embodiments, the acidified medium is maintained at the adjusted pH for 15 minutes or more. In some additional embodiments, the acidified medium is maintained at the acidified pH between 14 and 16 minutes, 13 and 17 minutes, 12 and 18 minutes, 11 and 19 minutes or 10 and 20 minutes. In some embodiments, the acidified medium is maintained at the adjusted pH for 20 minutes or more. In some additional embodiments, the acidified medium is maintained at the acidified pH between 19 and 21 minutes, 18 and 22 minutes, 17 and 23 minutes, 16 and 24 minutes or 15 and 25 minutes. In some embodiments, the acidified medium is maintained at the adjusted pH for 25 minutes or more. In some additional embodiments, the acidified medium is maintained at the acidified pH between 24 and 26 minutes, 23 and 27 minutes, 22 and 28 minutes, 21 and 29 minutes or 20 and 30 minutes. In some embodiments, the acidified medium is maintained at the adjusted pH for 30 minutes or more. In some embodiments, the acidified medium is maintained at the adjusted pH for 30 minutes or less. In some additional embodiments, the acidified medium is maintained at the acidified pH between 29 and 31 minutes, 28 and 32 minutes, 27 and 33 minutes, 26 and 34 minutes or 25 and 35 minutes. In some embodiments, the acidified medium is maintained at the adjusted pH for 60 minutes or more. In some embodiments, the acidified medium is maintained at the adjusted pH for 60 minutes or less. In some additional embodiments, the acidified medium is maintained at the acidified pH between 59 and 61 minutes, 58 and 62 minutes, 57 and 63 minutes, 56 and 64 minutes or 55 and 55 minutes. In some embodiments, the acidified medium is maintained at the adjusted pH for 120 minutes or more. In some embodiments, the acidified medium is maintained at the adjusted pH for 120 minutes or less. In some additional embodiments, the acidified medium is maintained at the acidified pH between 119 and 121 minutes, 118 and 122 minutes, 117 and 123 minutes, 116 and 124 minutes or 115 and 125 minutes. In some embodiments, the acidified medium is maintained at the adjusted pH for 180 minutes or more. In some embodiments, the acidified medium is maintained at the adjusted pH for 180 minutes or less. In some additional embodiments, the acidified medium is maintained at the acidified pH between 179 and 181 minutes, 178 and 182 minutes, 177 and 183 minutes, 176 and 184 minutes or 175 and 185 minutes. In additional embodiments, the process can include determining the presence, number, metabolic activity or identity of the contaminating microbial cells present in the acidified medium after the maintaining step.

In some embodiments, it may be necessary to readjust the pH of the acidified medium after the maintaining step to provide a neutralized medium allowing the propagation or the fermentation of the yeast. In such embodiment, the pH of the acidified medium can be adjusted to at least 4.4, 4.5, 4.6, 4.7, 4.8, 4.9, 5.0, 5.1, 5.2, 5.3, 5.4, 5.5. 5.6 or more. In an embodiment, the pH of the neutralized medium is 4.4 or higher. In another embodiment, the pH of the neutralized medium is between 4.4 and 5.6. In additional embodiments, the process can include determining the presence, number, metabolic activity or identity of the contaminating microbial cells suspected to be present in the neutralized medium.

Since the medium obtained by the processes described herein is intended to be used to propagate or be fermented by a yeast, the process can include adding a yeast (which can be a wild-type yeast, a recombinant yeast host cell or a combination of both) during the process. In an embodiment, the yeast or the recombinant yeast host cell can be added to the raw medium prior to the strong acid. Alternatively or in combination, the yeast or the recombinant yeast host cell can be added to the acidified medium after the strong acid has been added. Alternatively or in combination, the yeast or the recombinant yeast host cell can be present in the acidified medium before the strong acid is added. Alternatively or in combination, the yeast or the recombinant yeast host cell can be added to the raw medium at the same time the strong acid has been added. Alternatively or in combination, the yeast or the recombinant yeast host cell can be added to the neutralized medium. In some embodiments, the yeast or the recombinant yeast host cell can be added to the medium prior to, at the same time or after the antimicrobial composition has been added (to the raw or the acidified medium). In some embodiments, the process comprises determining the presence, and optionally the amount and/or the identity of the contaminating microbial cells in the yeast or a recombinant yeast host cell population that is being added to the medium. In some embodiments, the process comprises determining the presence, and optionally the amount and/or the identity of the contaminating microbial cells in a medium which has been supplemented with a yeast or a recombinant yeast host cell.

In some embodiments, the medium obtained by the processes described herein can be used in combination with a recombinant LAB host cell, the process can include adding the recombinant LAB host cell to the medium during the process. Since the viability of the recombinant LAB host cells may be decreased by the presence of a strong acid, the recombinant LAB host cells be added to the neutralized medium. In some embodiments, the recombinant LAB host cell can be added to the medium prior to, at the same time or after the yeast has been added. In some embodiments, the process comprises determining the presence, and optionally the amount and/or the identity of the contaminating microbial cells in the recombinant LAB host cell population that is being added to the neutralized medium. In some embodiments, the process comprises determining the presence, and optionally the amount and/or the identity of the contaminating microbial cells in a medium that has been supplemented with the recombinant LAB host cell.

In some embodiments, it may be useful to supplement the medium with a bacteriocin. As indicated herein, the bacteriocin that is being added can be stable in acidic conditions especially if it being used to supplement the raw or the acidified medium. As used in the context of the present disclosure, an acid-stable bacteriocin retains at least 50% of its antimicrobial activity at an acidic pH, such as, for example, 3.2 when compared to its optimal pH (which may be a neutral pH). In an embodiment, the bacteriocin can be added to the raw medium prior to the strong acid. Alternatively or in combination, the bacteriocin can be added to the acidified medium after the strong acid has been added. Alternatively or in combination, the bacteriocin can be added to the raw medium at the same time the strong acid has been added. Alternatively or in combination, the bacteriocin can be added to the neutralized medium. In such embodiment, it is not necessary that the bacteriocin be stable in acidic conditions as, during fermentation, no substantially pH reduction is expected to occur. In some embodiments, the bacteriocin can be added to the medium prior to, at the same time or after the antimicrobial composition has been added (to the raw or the acidified medium). In some embodiments, the bacteriocin can be added to the medium prior to, at the same time or after the yeast has been added (to the raw, the acidified or the neutralized medium). In some further embodiments, the bacteriocin can be added to the medium prior to, at the same time or after the recombinant LAB host cell has been added (to the neutralized medium). In some embodiments, the process comprises determining the presence, and optionally the amount and/or the identity of the contaminating microbial cells in a medium which has been supplemented with a bacteriocin.

In some embodiments, the processes described herein can be conducted in the absence of antibiotics. However, in some circumstances, it may be useful to supplement the medium with an antibiotic. In an embodiment, the antibiotic can be added to the raw medium prior to the strong acid. Alternatively or in combination, the antibiotic can be added to the acidified medium after the strong acid has been added. Alternatively or in combination, the antibiotic can be added to the raw medium at the same time the strong acid has been added. Alternatively or in combination, the antibiotic can be added to the neutralized medium. In some embodiments, the antibiotic can be added to the medium prior to, at the same time or after the antimicrobial composition has been added (to the raw or the acidified medium). In some embodiments, the antibiotic can be added to the medium prior to, at the same time or after the yeast has been added (to the raw, the acidified or the neutralized medium). In some further embodiments, the antibiotic can be added to the medium prior to, at the same time or after the recombinant LAB host cell has been added (to the neutralized medium). In some embodiments, the process comprises determining the presence, and optionally the amount and/or the identity of the contaminating microbial cells in a medium which has been supplemented with an antibiotic. In an embodiment, the antibiotic can comprise, for example penicillin, virginiamycin, streptomycin, momensin or a combination thereof.

The medium obtained by the process described herein (prior the propagation or the fermentation) thus comprises the antimicrobial composition (optionally comprising an acid stable bacteriocin and/or an antibiotic) as well as a reduced amount or metabolic activity of contaminating microbial cells when compared to the raw medium. The medium can optionally be supplemented with a yeast or a recombinant yeast host cell, a recombinant LAB host cell, a bacteriocin (which may be stable in acidic conditions) and/or an antibiotic. In an embodiment, the medium does not include an antibiotic.

The medium obtained by the process described herein can be used as a propagation medium in a process for propagating a yeast (which may be, in some embodiments, a recombinant yeast host cell). In some embodiments, the use of the antimicrobial composition can increase the number of propagated yeasts or reduce the time to obtain a specific number of propagated yeasts as it limits the number or metabolic activity of contaminating microbial cells. In such embodiment, the medium is provided and optionally contacted (e.g., inoculated) with a yeast (which may be, in some embodiments, a recombinant yeast host cell) when the provided medium does not include a yeast. As such, the propagation process can include providing a yeast or a recombinant yeast host cell to the propagation medium. In some embodiments, the medium can be contacted with a recombinant LAB host cell. As such, the process can also include providing a recombinant LAB host cell to the propagation medium. The inoculated propagated medium is maintained (e.g., cultured) under conditions so as to favor the propagation of the yeast and obtain a propagated medium comprising a propagated yeast population (which can include, in some embodiments, a recombinant LAB host cell or a propagated recombinant LAB population). The process can include formulating the propagated yeast population into a yeast composition (which may comprise, in some embodiments, the recombinant LAB host cell) that could be used in a downstream fermentation process. In some embodiments, the process comprises determining the presence, and optionally the amount and/or the identity of the contaminating microbial cells during or after to the propagation. In some embodiments, the propagated medium can be directly used in a fermentation process.

The medium obtained by the process described herein (after propagation or prior the fermentation) can comprise the antimicrobial composition (optionally comprising an acid stable bacteriocin and/or an antibiotic) as well as a reduced level or metabolic activity of contaminating microbial cells when compared to a corresponding control medium not previously treated with the antimicrobial composition. The medium (obtained after propagation or prior the fermentation) includes a propagated yeast or a propagated recombinant yeast host cell, and optionally a recombinant LAB host cell, a bacteriocin (which may be stable in acidic conditions) and/or an antibiotic. In an embodiment, the medium (obtained after propagation or prior the fermentation) does not include an antibiotic.

The medium can be used as a fermentation medium in a process for converting, at least in part, a component of the medium into a fermentation product. In some embodiments, the use of the antimicrobial composition does increase the fermentation yield (when compared to a process which does not include the use of the antimicrobial composition) because it limits the activity of the microbial contamination during the propagation and/or the fermentation stages. In an embodiment, the medium is provided and, if necessary, contacted (e.g., inoculated) with a yeast (which may be, in some embodiments, a recombinant yeast host cell), optionally in combination with a recombinant LAB host cell. The yeast can be a propagated yeast obtained by using a propagation medium supplemented with the antimicrobial composition. The fermentation process can include providing a yeast or a recombinant yeast host cell, a propagated medium, a propagated yeast population and/or a yeast composition comprising the yeast or the recombinant yeast host cell to the fermentation medium. The inoculated fermentation medium is maintained (e.g., cultured) under conditions so as to favor the conversion, at least in part, of the biomass into a fermentation product.

The medium obtained by the process described herein (after fermentation) can comprise the antimicrobial composition (optionally comprising an acid stable bacteriocin and/or an antibiotic) as well as a reduced level or metabolic activity of contaminating microbial cells when compared to a corresponding control medium not previously treated with the antimicrobial composition. The medium (obtained after fermentation) can optionally include a yeast or a recombinant yeast host cell, a recombinant LAB host cell, a bacteriocin (which may be stable in acidic conditions) and/or an antibiotic. In an embodiment, the medium (obtained after fermentation) does not include an antibiotic.

The medium can be used as a propagation/fermentation medium in a process for propagating the yeast and converting, at least in part, a component of the medium (e.g., a biomass) into a fermentation product. In some embodiments, the use of the antimicrobial composition can increase the number of propagated yeasts or reduce the time to obtain a specific number of propagated yeasts as it limits the number or metabolic activity of contaminating microbial cells. In some embodiments, the use of the antimicrobial composition does increase the fermentation yield (when compared to a process which does not include the use of the antimicrobial composition) because it limits microbial contamination during the propagation and/or the fermentation stages. In an embodiment, the medium is provided and, if necessary, contacted (e.g., inoculated) with a yeast (which may be, in some embodiments, a recombinant yeast host cell), optionally in combination with a recombinant LAB host cell. The propagation/fermentation process can include providing a yeast or a recombinant yeast host cell, optionally in combination with a recombinant LAB cell to the fermentation medium. The inoculated fermentation medium is maintained (e.g., cultured) under conditions so as to favor the conversion, at least in part, of the biomass into a fermentation product.

The medium obtained by the process described herein (after fermentation) can comprise the antimicrobial composition (optionally comprising an acid stable bacteriocin and/or an antibiotic) as well as a reduced level or metabolic activity of contaminating microbial cells when compared to a corresponding control medium not previously treated with the antimicrobial composition. The medium (obtained after fermentation) can optionally include a yeast or a recombinant yeast host cell, a recombinant LAB host cell, a bacteriocin (which may be stable in acidic conditions) and/or an antibiotic. In an embodiment, the medium (obtained after fermentation) does not include an antibiotic.

Yeast

In the context of the present disclosure, the process refers to the propagation of a yeast in a medium and/or the fermentation of a medium by a yeast. In some embodiments, the yeast can be a non-genetically modified (e.g., native) yeast or a recombinant yeast host cell. Suitable yeasts or recombinant yeast host cells can be, for example, from the genus *Saccharomyces, Kluyveromyces, Arxula, Debaryomyces, Candida, Pichia, Phaffia, Schizosaccharomyces, Hansenula, Kloeckera, Schwanniomyces* or *Yarrowia*. Suitable yeasts and recombinant yeast host cells can include, for example, *S. cerevisiae, S. bulderi, S. barnetti, S. exiguus, S. uvarum, S. diastaticus, K. lactis, K. marxianus* or *K. fragilis*. In some embodiments, the yeasts or the recombinant yeast host cells are selected from the group consisting of *Saccharomyces cerevisiae, Schizosaccharomyces pombe, Candida albicans, Pichia pastoris, Pichia stipitis, Yarrowia lipolytica, Hansenula polymorpha, Phaffia rhodozyma, Candida utilis, Arxula adeninivorans, Debaryomyces hansenii, Debaryomyces polymorphus, Schizosaccharomyces pombe* and *Schwanniomyces occidentalis*. In one particular embodiment, the yeast or the recombinant yeasts host cell is a *Saccharomyces cerevisiae* cell. In some embodiments, the yeasts or the recombinant yeast host cells can be an oleaginous yeast cell. For example, the oleaginous yeasts or oleaginous yeast host cells can be from the genus *Blakeslea, Candida, Cryptococcus, Cunninghamella, Lipomyces, Mortierella, Mucor, Phycomyces, Pythium, Rhodosporidum, Rhodotorula, Trichosporon* or *Yarrowia*. In some alternative embodiments, the yeasts or the recombinant yeast host cells can be oleaginous microalgae host cells (e.g., for example, from the genus *Thraustochytrium* or *Schizochytrium*). In an embodiment, the yeasts or the recombinant yeast host cells are from the genus *Saccharomyces* and, in some additional embodiments, from the species *Saccharomyces cerevisiae*.

Since the yeast and the recombinant yeast host cell can be used for the fermentation of a biomass and the generation of fermentation product, it is contemplated herein that they can have the intrinsic ability to convert a biomass into a fermentation product in the absence of additional genetic modifications. In still another embodiment, the recombinant yeast host cell of the present disclosure can be genetically modified to provide or increase the biological activity of one or more polypeptide involved in the fermentation of the biomass and the generation of the fermentation product and/or to provide or increase the biological activity in one or more polypeptide involved in the catabolism of the weak acid(s) of the antimicrobial composition.

In some embodiments, the recombinant yeast host cell can include at least one first genetic modification for providing or increasing the catabolism of the at least one weak acid. The first genetic modification allows for the expression or the overexpression of a first polypeptide involved in the catabolism of the at least one weak acid. For example, the first genetic modification can be the introduction of a strong or constitutive promoter in a native gene encoding the first polypeptide so as to increase the expression of the first polypeptide. In another example, the first genetic modification can be the introduction of a first heterologous polypeptide encoding the first polypeptide to increase or provide the biological activity associated with the first polypeptide to the recombinant yeast host cell. The first polypeptide may be native or heterologous to the recombinant yeast host cell. The recombinant yeast host cells can include one or a plurality of first genetic modifications. For example, the recombinant yeast host cell can include one or a plurality of copies of the first heterologous nucleic acid molecules. In another example, the recombinant yeast host cell is capable of or can express one or a plurality of first polypeptides. When more than one first polypeptides are intended to be expressed in the recombinant yeast host cell, they can be expressed from the same or different first nucleic acid molecules (each in one or more copy, each could be at the same or different loci).

In an embodiment, the antimicrobial composition comprises acetic acid as a weak acid. In such embodiment, the first genetic modification can comprise the introduction of one or more of a first heterologous nucleic acid molecule encoding one or more first heterologous polypeptide for catabolizing acetic acid. The one or more first heterologous polypeptide for catabolizing the at least one weak acid can comprise a polypeptide having acetyl-CoA-synthase (ACS) activity; a polypeptide having acetylating acetaldehyde dehydrogenase (AADH) activity; and/or a polypeptide having alcohol dehydrogenase (ADH) activity. In an embodiment, the one or more first heterologous polypeptide for catabolizing the at least one weak acid can comprise a polypeptide having acetyl-CoA-synthase (ACS) activity optionally in combination with a polypeptide having acetylating acetaldehyde dehydrogenase (AADH) activity and/or a polypeptide having alcohol dehydrogenase (ADH) activity. In another embodiment, the one or more first heterologous polypeptide for catabolizing the at least one weak acid can comprise a polypeptide having acetylating acetaldehyde dehydrogenase (AADH) activity optionally in combination with a polypeptide having acetyl-CoA-synthase (ACS) activity and/or a polypeptide having alcohol dehydrogenase (ADH) activity. In yet another embodiment, the one or more first heterologous polypeptide for catabolizing the at least one weak acid can comprise a polypeptide having alcohol dehydrogenase (ADH) activity optionally in combination with a polypeptide having acetyl-CoA-synthase (ACS) activity and/or a polypeptide having acetylating acetaldehyde dehydrogenase (AADH) activity. In some embodiment, the polypeptide having alcohol dehydrogenase (ADH) activity also exhibits acetylating acetaldehyde dehydrogenase (AADH) activity (e.g., a bifunctional enzyme).

The polypeptide having acetyl-CoA-synthase (ACS) activity can be obtained, for example, from *Saccharomyces* sp., such as *Saccharomyces cerevisiae*. The polypeptide having acetyl-CoA-synthase (ACS) activity can be the ACS2 polypeptide (YLR153C, SGD:S000004143) a variant thereof, a fragment thereof or a polypeptide encoded by a ortholog thereof or a gene paralog of the acs2 gene. In some embodiments, the polypeptide having acetyl-CoA-synthase (ACS) activity can have the amino acid sequence of SEQ ID NO: 3, be a variant of the amino acid sequence of SEQ ID NO: 3 (having acetyl-CoA-synthase (ACS) activity) or be a fragment of the amino acid sequence of SEQ ID NO: 3 (having acetyl-CoA-synthase (ACS) activity). In still another embodiment, the polypeptide having acetyl-CoA-synthase (ACS) activity can be encoded by a nucleic acid molecule having the nucleic acid sequence of SEQ ID NO: 4, being a variant of the nucleic acid sequence of SEQ ID NO: 4 (encoding a polypeptide having acetyl-CoA-synthase (ACS) activity), be a fragment of the nucleic acid sequence of SEQ ID NO: 4 (encoding a polypeptide having acetyl-CoA-synthase (ACS) activity) or a degenerate sequence encoding the polypeptide having the amino acid sequence of SEQ ID NO: 3 (its variants or its fragments).

The polypeptide having acetylating acetaldehyde dehydrogenase (AADH) activity can be obtained, for example, from *Escherichia* sp., such as *Escherichia coli* (mphF, see GenBank accession number CUU95910) or from *Pseudomonas* sp., such as *Pseudomonas oleovorans* (pheF, see GenBank accession number ANC68225).

The polypeptide having alcohol dehydrogenase (ADH) activity can be obtained, for example, from *Saccharomyces* sp, such as *Saccharomyces cerevisiae* (ADH1, see GenBank accession number CAA99098.1) or from *Zymomonas* sp., such as *Zymomonas mobilis* (ADH, see GenBank accession number AAA27683).

The polypeptide having bifunctional acetylating acetaldehyde dehydrogenase (AADH) and alcohol dehydrogenase (ADH) can be obtained, for example, from *Bifidobacterium* sp., such as *Bifidobacterium adolescentis* (see GenBank accession number WP_011742823 encoded by GenBank accession number NC_008618). In some embodiments, the polypeptide having bifunctional acetylating acetaldehyde dehydrogenase (AADH) and alcohol dehydrogenase (ADH) is ADHE, a variant thereof or a fragment thereof. In some embodiments, the polypeptide having bifunctional acetylating acetaldehyde dehydrogenase (AADH) and alcohol dehydrogenase (ADH) activities can have the amino acid sequence of SEQ ID NO: 1, be a variant of the amino acid sequence of SEQ ID NO: 1 (having bifunctional acetylating acetaldehyde dehydrogenase (AADH) and alcohol dehydrogenase (ADH) activities) or be a fragment of the amino acid sequence of SEQ ID NO: 1 (having bifunctional acetylating acetaldehyde dehydrogenase (AADH) and alcohol dehydrogenase (ADH) activities). In still another embodiment, the polypeptide having bifunctional acetylating acetaldehyde dehydrogenase (AADH) and alcohol dehydrogenase (ADH) activities can be encoded by a nucleic acid molecule having the nucleic acid sequence of SEQ ID NO: 2, being a variant of the nucleic acid sequence of SEQ ID NO: 2 (encoding a polypeptide having bifunctional acetylating acetaldehyde dehydrogenase (AADH) and alcohol dehydrogenase (ADH) activities), be a fragment of the nucleic acid sequence of SEQ ID NO: 2 (encoding a polypeptide having bifunctional acetylating acetaldehyde dehydrogenase (AADH) and alcohol dehydrogenase (ADH) activities) or is a degenerate sequence encoding the polypeptide having the amino acid sequence of SEQ ID NO: 1 (its variants or its fragments).

The polypeptide having bifunctional acetylating acetaldehyde dehydrogenase (AADH) and alcohol dehydrogenase (ADH) can be obtained, for example, from *Entamoeba* sp., such as *Entamoeba histolytica*. In some embodiments, the polypeptide having bifunctional acetylating acetaldehyde dehydrogenase (AADH) and alcohol dehydrogenase (ADH) is EhADH2 (GenBank Accession Number AAA81906.1), a variant thereof or a fragment thereof. In some embodiments, the polypeptide having bifunctional acetylating acetaldehyde dehydrogenase (AADH) and alcohol dehydrogenase (ADH) activities can have the amino acid sequence of SEQ ID NO: 15, be a variant of the amino acid sequence of SEQ ID NO: 15 (having bifunctional acetylating acetaldehyde dehydrogenase (AADH) and alcohol dehydrogenase (ADH) activities) or be a fragment of the amino acid sequence of SEQ ID NO: 15 (having bifunctional acetylating acetaldehyde dehydrogenase (AADH) and alcohol dehydrogenase (ADH) activities). In still another embodiment, the polypeptide having bifunctional acetylating acetaldehyde dehydrogenase (AADH) and alcohol dehydrogenase (ADH) activities can be encoded by a nucleic acid molecule having the nucleic acid sequence of SEQ ID NO: 16, being a variant of the nucleic acid sequence of SEQ ID NO: 16 (encoding a polypeptide having bifunctional acetylating acetaldehyde dehydrogenase (AADH) and alcohol dehydrogenase (ADH) activities), be a fragment of the nucleic acid sequence of SEQ ID NO: 16 (encoding a polypeptide having bifunctional acetylating acetaldehyde dehydrogenase (AADH) and alcohol dehydrogenase (ADH) activities), or be a degenerate sequence encoding the polypeptide having the amino acid sequence of SEQ ID NO: 15 (its variants or its fragments).

Additional embodiments of polypeptide having a bifunctional acetylating acetaldehyde dehydrogenase and alcohol dehydrogenase (ADH) activity have been described in WO 2019/058260 (incorporated herein in its entirety) and can be expressed in the recombinant yeast host cell.

In an embodiment, the antimicrobial composition comprises formic acid as a weak acid. In such embodiment, the first genetic modification can comprise the introduction of one or more of a first heterologous nucleic acid molecule encoding one or more first heterologous polypeptide for catabolizing formic acid. The one or more first heterologous polypeptide for catabolizing the at least one weak acid can comprise a polypeptide having formate dehydrogenase (FDH) activity.

The polypeptide having formate dehydrogenase (FDH) activity can be obtained, for example, from *Saccharomyces* sp., such as *Saccharomyces cerevisiae*. The polypeptide having formate dehydrogenase (FDH) activity can be the FDH1 polypeptide (YOR388C, SGD:S000005915) a variant thereof, a fragment thereof or a polypeptide encoded by a gene ortholog or a gene paralog of the fdh1 gene. In some embodiments, the polypeptide having formate dehydrogenase (FDH) activity can have the amino acid sequence of SEQ ID NO: 17, be a variant of the amino acid sequence of SEQ ID NO: 17 (having formate dehydrogenase (FDH) activity) or be a fragment of the amino acid sequence of SEQ ID NO: 17 (having formate dehydrogenase (FDH) activity). In still another embodiment, the polypeptide having formate dehydrogenase (FDH) activity can be encoded by a nucleic acid molecule having the nucleic acid sequence of SEQ ID NO: 18, being a variant of the nucleic acid sequence of SEQ ID NO: 18 (encoding a polypeptide having formate dehydrogenase (FDH) activity), be a fragment of the nucleic acid sequence of SEQ ID NO: 18 (encoding a polypeptide having formate dehydrogenase (FDH) activity), or be a degenerate sequence encoding the polypeptide having the amino acid sequence of SEQ ID NO: 17 (its variants or its fragments).

The polypeptide having formate dehydrogenase (FDH) activity can be obtained, for example, from *Saccharomyces* sp., such as *Saccharomyces cerevisiae*. The polypeptide having formate dehydrogenase (FDH) activity can be the FDH2 polypeptide (YPL276W, SGDS000006197) a variant thereof, a fragment thereof or a polypeptide encoded by a gene ortholog or a gene paralog of the fdh2 gene. In some embodiments, the polypeptide having formate dehydrogenase (FDH) activity can have the amino acid sequence of SEQ ID NO: 19, be a variant of the amino acid sequence of SEQ ID NO: 19 (having formate dehydrogenase (FDH) activity) or be a fragment of the amino acid sequence of SEQ ID NO: 19 (having formate dehydrogenase (FDH) activity). In still another embodiment, the polypeptide having formate dehydrogenase (FDH) activity can be encoded by a nucleic acid molecule having the nucleic acid sequence of SEQ ID NO: 20, being a variant of the nucleic acid sequence of SEQ ID NO: 20 (encoding a polypeptide having formate dehydrogenase (FDH) activity), be a fragment of the nucleic acid sequence of SEQ ID NO: 20 (encoding a polypeptide having formate dehydrogenase (FDH) activity), or be a degenerate sequence encoding the polypeptide having the amino acid sequence of SEQ ID NO: 19 (its variants or its fragments).

In an embodiment, the antimicrobial composition comprises lactic acid as a weak acid. In such embodiment, the first genetic modification can comprise the introduction of one or more of a first heterologous nucleic acid molecule encoding one or more first heterologous polypeptide for catabolizing lactic acid. The one or more first heterologous polypeptide for catabolizing the at least one weak acid can comprises a polypeptide capable of converting lactate into pyruvate, such as, for example, a NAD-independent lactate dehydrogenase (also referred to as respiratory LDH or iLDH). NAD-independent lactate dehydrogenases include, but are not limited to, $_L$-iLDH and $_D$-iLDH according to the chiral specificity. NAD-independent lactate dehydrogenases can be membrane-associated proteins and use membrane quinones as external electron acceptors. Alternatively, NAD-independent lactate dehydrogenases can use $O_2$ as an electron acceptor and correspond to a lactate oxidase (LOX) or a lactate monoxygenase (LMO). In some embodiments, NAD-independent lactate dehydrogenases can use cytochrome c as an electron acceptor and be referred to as a flavocytochrome b2 (FCB2). In some embodiments, the iLDH is from *Escherichia* sp., for example *Escherichia coli* (see for example GenBank accession number WP_001551845.1).

In some embodiments, the yeast or the recombinant yeast host cell does not include any genetic modifications associated with the metabolism of the weak acids present in the antimicrobial composition. Alternatively, the recombinant yeast host cell can include the one or more first genetic modification associated with the catabolism of at least one weak acid present in the antimicrobial composition. In some embodiments, the recombinant yeast host cell can include the one or more first genetic modification associated with the catabolism of at least two weak acids present in the antimicrobial composition. In some further embodiments, the recombinant yeast host cell can include the one or more first genetic modification associated with the catabolism of all of the weak acids present in the antimicrobial composition. In yet another embodiment, the recombinant yeast host cell can include the one or more first genetic modification associated with the catabolism of the weak acid present in the antimicrobial composition that are not catabolized by the recombinant LAB host cell.

In some embodiments, the recombinant yeast host cell can include at least one second genetic modification for converting, at least in part, a biomass (present in the propagation medium, the fermentation medium or both) into a fermentation product. The second genetic modification allows for the expression or the overexpression of a second polypeptide involved in the conversion of a biomass into a fermentation product. For example, the second genetic modification can be the introduction of a strong or constitutive promoter in a native gene encoding the second polypeptide so as to increase the expression of the second polypeptide. In another example, the second genetic modification can be the introduction of a second heterologous polypeptide encoding the second polypeptide to increase or provide the biological activity associated with the second polypeptide to the recombinant yeast host cell. The second polypeptide may be native or heterologous to the recombinant yeast host cell. The recombinant yeast host cell can include one or a plurality of second genetic modifications. For example, the recombinant yeast host cell can include one or a plurality of copies of the second heterologous nucleic acid molecules. In another example, the recombinant yeast host cell can include one or a plurality of second polypeptides. When more than one second polypeptides are intended to be expressed in the recombinant yeast host cell, they can be expressed from the same or different first nucleic acid molecules (each in one or more copy, each could be at the same or different loci).

The second polypeptide can be an enzyme (or a combination of enzymes) exhibiting hydrolase activity. Hydrolases define a class of enzymes capable of catalyzing the breakage of a chemical bond by using water. Hydrolases are classified as EC 3 in the EC number classification of enzymes. Hydrolases can be further classified into several subclasses, based upon the bonds they act upon: EC 3.1: ester bonds (esterases: nucleases, phosphodiesterases, lipase, phosphatase), EC 3.2: sugars (DNA glycosylases, glycoside hydrolase), EC 3.3: ether bonds, EC 3.4: peptide bonds (Proteases/peptidases), EC 3.5: carbon-nitrogen bonds, other than peptide bonds, EC 3.6 acid anhydrides (acid anhydride hydrolases, including helicases and GTPase), EC 3.7 carbon-carbon bonds, EC 3.8 halide bonds, EC 3.9: phosphorus-nitrogen bonds, EC 3.10: sulphur-nitrogen bonds, EC 3.11: carbon-phosphorus bonds, EC 3.12: sulfur-sulfur bonds and EC 3.13: carbon-sulfur bonds.

The hydrolase can be a phosphatase. As used herein, the expression "phosphatase" refers to a protein having enzymatic activity and capable, in the presence of water, of catalyzing the cleavage of a phosphoric acid monoester into a phosphate ion and an alcohol. An embodiment of a phosphatase is a phytase, a protein having enzymatic activity and capable of catalyzing the hydrolysis of phytic acid (myo-inositol hexakisphosphate) into inorganic phosphorus. There are four distinct classes of phytase: histidine acid phosphatases (HAPS), β-propeller phytases, purple acid phosphatases and protein tyrosine phosphatase-like phytases (PTP-like phytases). Phytic acid has six phosphate groups that may be released by phytases at different rates and in different order. Phytases hydrolyze phosphates from phytic acid in a stepwise manner, yielding products that again become substrates for further hydrolysis. Phytases have been grouped based on the first phosphate position of phytic acid that is hydrolyzed: are 3-phytase (EC 3.1.3.8), 4-phytase (EC 3.1.3.26) and 5-phytase (EC 3.1.3.72). In an embodiment, the phytase is derived from a bacterial species, such as, for example, a Citrobacter sp. or an Escherichia sp. In a specific embodiment, the heterologous phytase is derived from a Citrobacter sp., such as for example Citrobacter braakii. In another embodiment, the heterologous phytase is derived from an Escherichia sp., such as, for example, Escherichia coli. The degradation of phosphate moiety and/or the presence of cleaved phosphate moiety (directly or indirectly from the generation of the inhibitory product), prior to fermentation, can be detrimental to the stability of the yeast as well as its performance of the recombinant yeast host cell during the fermentation. In such embodiments, the substrate/yeast cellular component can comprise a phosphate moiety.

The hydrolase can be an amylolytic enzyme. The expression "amylolytic enzyme" refers to a class of enzymes capable of hydrolyzing starch or hydrolyzed starch. Amylolytic enzymes include, but are not limited to alpha-amylases (EC 3.2.1.1, sometimes referred to fungal alpha-amylase, see below), maltogenic amylase (EC 3.2.1.133), glucoamylase (EC 3.2.1.3), glucan 1,4-alpha-maltotetraohydrolase (EC 3.2.1.60), pullulanase (EC 3.2.1.41), iso-amylase (EC 3.2.1.68) and amylomaltase (EC 2.4.1.25). In an embodiment, the one or more amylolytic enzymes can be an alpha-amylase from Aspergillus oryzae, a maltogenic alpha-amylase from Geobacillus stearothermophilus, a glucoamylase from Saccharomycopsis fibuligera, a glucan 1,4-alpha-maltotetraohydrolase from Pseudomonas saccharophila, a pullulanase from Bacillus naganoensis, a pullulanase from Bacillus acidopullulyticus, an iso-amylase from Pseudomonas amyloderamosa, and/or amylomaltase from Thermus thermophilus.

The hydrolase can be a cellulase or an hemi-cellulase. As used herein, the expression "cellulase/hemi-cellulase" refers to a class of enzymes capable of hydrolyzing, respectively, cellulose or hemi-cellulose. Cellulases/hemi-cellulases include, but are not limited to a cellulase (E.C. 3.2.1.4) and an endoB(1,4)D-xylanase (E.C. 3.2.1.8). In an embodiment, the one or more cellulase/hemi-cellulase can be a cellulase from Penicillium funiculosum and/or an endoB(1,4)D-xylanase from Rasamsonia emersonii.

The hydrolase can be a lipase. As used herein, the expression "lipase" refers to a class of enzymes capable of hydrolyzing lipids. In an embodiment, the one or more lipase can be a triacylglycerol lipase from Thermomyces lanuginosis, a phospholipase A2 from Sus scrofa, a phospholipase A2 from Streptomyces vialaceoruber and/or a phospholipase A2 from Aspergillus oryzea.

The hydrolase can be a protease from EC 3.4. Proteases are able to cleave polypeptides (e.g., its substrate) to generate smaller amino acid chains or amino acid residues (e.g., its products).

The hydrolase can be a glycogen phosphorylase and/or a glycogen debranching enzyme. In yeasts, glycogen is degraded by Gph1p and Gdb1p enzymes, which are phosphorylase and debranching enzymes respectively. GPH1 progressively releases glucose-1-phosphate from linear alpha (1,4)-glucosidic bonds in glycogen but is not able to break alpha (1,4)-glucosidic bonds that are close to alpha (1,6)-branch linkages. The branches are resolved by GDP1, which eliminates branch points in a two-step process.

The hydrolase can be a glucanase from EC 3.2. Glucanases are able to cleave glucan, a glucose polymer, into shorter saccharide chains or even monosaccharides. Glucanase can cleave α bonds or β bonds which may be present in a glucan. In an embodiment, the glucanase is a β glucanase. The degradation of glucans and/or the presence of cleaved glucan moieties (directly or indirectly from the generation of the inhibitory product), prior to fermentation, can be detrimental to the stability of the yeast as well as its performance of the recombinant yeast host cell during the fermentation. In such embodiments, the substrate/yeast cellular component can be glucan (such as β glucan) or a glucan (or β glucan)-containing biological molecule.

The hydrolase can be a glycosidic hydrolase from EC 3.2. Glycosidic hydrolases are able to cleave carbohydrate chains (e.g., its substrate) to generate smaller carbohydrates chains or discrete carbohydrate molecules (e.g., its products). In some embodiment, the glycosidic hydrolase is capable of converting an unfermentable carbohydrate source (for example a disaccharide, a trisaccharide or a polysaccharide) into a fermentable carbohydrate source (for example a monosaccharide).

Lactic Acid Bacteria

In some embodiments of the processes of the present disclosure, a lactic acid bacteria (LAB) can be used. The LAB is a recombinant LAB host cell that has been genetically engineered to convert, at least in part, the medium into a fermentation product. LAB are a group of Gram-positive bacteria, non-respiring non-spore-forming, cocci or rods, which produce lactic acid as the major end product of the fermentation of carbohydrates. Bacterial genus of LAB that can also be used to provide the recombinant LAB host cell include, but are not limited to, *Lactobacillus, Leuconostoc, Pediococcus, Lactococcus, Streptococcus, Aerococcus, Carnobacterium, Enterococcus, Oenococcus, Sporolactobacillus, Tetragenococcus, Vagococcus*, and *Weissella*. Bacterial species of LAB include, but are not limited to, *Lactococcus lactis, Lactococcus garviae, Lactococcus raffinolactis, Lactococcus plantarum, Oenococcus oeni, Pediococcus pentosaceus, Pediococcus acidilactici, Carnococcus allantoicus, Carnobacterium gallinarum, Vagococcus fessus, Streptococcus thermophilus, Enterococcus phoeniculicola, Enterococcus plantarum, Enterococcus raffinosus, Enterococcus avium, Enterococcus pallens Enterococcus hermanniensis, Enterococcus faecalis*, and *Enterococcus faecium*. In an embodiment, the LAB is a *Lactobacillus* sp. and, include, without limitation the following genera *Lactobacillus delbrueckii* group, *Paralactobacillus, Holzapfelia, Amylolactobacillus, Bombilactobacillus, Companilactobacillus, Lapidilactobacillus, Agrilactobacillus, Schleiferilactobacillus, Loigolactobacilus, Lacticaseibacillus, Latilactobacillus, Dellaglioa, Liquorilactobacillus, Ligilactobacillus, Lactiplantibacillus, Furfurilactobacillus, Paucilactobacillus, Limosilactobacillus, Fructilactobacillus, Acetilactobacillus, Apilactobacillus, Levilactobacillus, Secundilactobacillus* and *Lentilactobacillus*. In an embodiment, the recombinant LAB host cell is a *Lactobacillus* and, in some additional embodiment, the *Lactobacillus* species is *L. acetotolerans, L. acidifarinae, L. acidipiscis, L. acidophilus, L. agilis, L. algidus, L. alimentarius, L. amylolyticus, L. amylophilus, L. amylotrophicus, L. amylovorus, L. animalis, L. antri, L. apodemi, L. aviarius, L. bifermentans, L. brevis, L. buchneri, L. camelliae, L. casei, L. catenaformis, L. ceti, L. coleohominis, L. collinoides, L. composti, L. concavus, L. coryniformis, L. crispatus, L. crustorum, L. curvatus, L. delbrueckii* (including *L. delbrueckii* subsp. *bulgaricus, L. delbrueckii* subsp. *delbrueckii, L. delbrueckii* subsp. *lactis), L. dextrinicus, L. dioliverans, L. equi, L. equigenerosi, L. farraginis, L. farciminis, L. fermentum, L. fomicalis, L. fructivorans, L. frumenti, L. fuchuensis, L. gallinarum, L. gasseri, L. gastricus, L. ghanensis, L. graminis, L. ammesii, L. hamsteri, L. harbinensis, L. hayakitensis, L. helveticus, L. hilgardii, L. omohiochii, L. iners, L. ingluviei, L. intestinalis, L. jensenii, L. johnsonii, L. kalixensis, L. efiranofaciens, L. kefiri, L. kimchii, L. kitasatonis, L. kunkeei, L. leichmannii, L. lindneri, L. alefermentans, L. mali, L. manihotivorans, L. mindensis, L. mucosae, L. murinus, L. nagelii, L. namurensis, L. nantensis, L. oligofermentans, L. oris, L. panis, L. pantheris, L. parabrevis, L. parabuchneri, L. paracasei, L. paracollinoides, L. parafarraginis, L. parakefiri, L. arali- mentarius, L. paraplantarum, L. pentosus, L. perolens, L. plantarum, L. pontis, L. protectus, L. psittaci, L. rennini, L. reuteri, L. rhamnosus, L. rimae, L. rogosae, L. rossiae, L. ruminis, L. saerimneri, L. sakei, L. salivarius, L. sanfranciscensis, L. satsumensis, L. secaliphilus, L. sharpeae, L. siliginis, L. spicheri, L. suebicus, L. thailandensis, L. ultunensis, L. vaccinostercus, L. vaginalis, L. versmoldensis, L. vini, L. vitulinus, L. zeae* or *L. zymae*. In a specific embodiment, the recombinant LAB host cell is from the genus *Lactobacillus* sp. and can be, in a further embodiment, from the species *Lactobacillus paracasei* (which has recently been reclassified as *Lacticaseibacillus paracasei*).

The recombinant LAB host cell has been genetically engineered to convert, at least in part, the medium (propagation and/or fermentation medium) into a fermentation product. In an embodiment, the fermentation product is not lactic acid. In still a further embodiment, the fermentation product is an alcohol, such as, for example ethanol. In yet another embodiment, the biomass comprises or is derived from corn. As such, in some embodiments, the recombinant LAB host cell can include at least one third genetic modification for converting, at least in part, the medium into a fermentation product. The third genetic modification allows for the expression or the overexpression of an third polypeptide involved in the conversion of the medium into a fermentation product. For example, the third genetic modification can be the introduction of a strong or constitutive promoter in a native gene encoding the third polypeptide so as to increase the expression of the third polypeptide. In another example, the third genetic modification can be the introduction of an third heterologous polypeptide encoding the third polypeptide to increase or provide the biological activity associated with the third polypeptide to the recombinant LAB host cell. The third polypeptide may be native or heterologous to the recombinant LAB host cell. The recombinant LAB host cells can include one or a plurality of third genetic modifications. For example, the recombinant LAB host cell can include one or a plurality of copies of the third heterologous nucleic acid molecules. In another example, the recombinant LAB host cell can include one or a plurality of third polypeptides. When more than one third polypeptides are intended to be expressed in the recombinant LAB host cell, they can be expressed from the same or different third nucleic acid molecules (each in one or more copy, each could be at the same or different loci).

In an embodiment, when the fermentation product is ethanol, the third genetic modification is for providing or increasing the biological activity of a polypeptide having pyruvate decarboxylase activity and/or a polypeptide having alcohol dehydrogenase activity. When the recombinant LAB host cell has an intrinsic ability of expressing a pyruvate decarboxylase, the third heterologous nucleic acid molecule can encode a heterologous alcohol dehydrogenase. In such embodiment, it is possible that the third heterologous nucleic acid molecule further encodes a heterologous pyruvate decarboxylase or that a further third heterologous nucleic acid molecule is provided and encodes the heterologous pyruvate decarboxylase (to increase the overall pyruvate decarboxylase activity of the recombinant LAB host cell). When the recombinant LAB host cell has an intrinsic ability of expressing an alcohol dehydrogenase, the third heterologous nucleic acid molecule can encode a pyruvate decarboxylase. In such embodiment, it is possible that the third heterologous nucleic acid molecule further encodes a heterologous alcohol dehydrogenase or that a further third heterologous nucleic acid molecule encode the heterologous alcohol dehydrogenase (to increase the overall alcohol dehydrogenase activity of the recombinant LAB host cell). If the recombinant LAB host cell does not have an intrinsic ability of expressing a pyruvate decarboxylase and an alcohol dehydrogenase, the third heterologous nucleic acid molecule can encode an alcohol dehydrogenase and a pyruvate decarboxylase (on the same or on different nucleic acid molecules). The nucleic acid sequences encoding the pyruvate decarboxylase and the alcohol dehydrogenase can be on the same or distinct nucleic acid molecules.

As used herein, the term "pyruvate decarboxylase" refers to an enzyme catalyzing the decarboxylation of pyruvic acid to acetaldehyde and carbon dioxide. In *Zymonas mobilis*, the pyruvate decarboxylase gene is referred to as PDC (Gene ID: 33073732) and could be used in the recombinant LAB host cell of the present disclosure. In some additional embodiments, the pyruvate decarboxylase polypeptide can be from *Lactobacillus florum* (Accession Number WP_009166425.1), *Lactobacillus fructivorans* (Accession Number WP_039145143.1), *Lactobacillus lindneri* (Accession Number WP_065866149.1), *Lactococcus lactis* (Accession Number WP_104141789.1), *Carnobacterium gallinarum* (Accession Number WP_034563038.1), *Enterococcus plantarum* (Accession Number WP_069654378.1), *Clostridium acetobutylicum* (Accession Number NP_149189.1), *Bacillus megaterium* (Accession Number WP_075420723.1) or *Bacillus thuringiensis* (Accession Number WP_052587756.1). In the recombinant LAB host cell of the present disclosure, the pyruvate decarboxylase can have the amino acid of SEQ ID NO: 5, be a variant of SEQ ID NO: 5 (having pyruvate carboxylase activity) or be a fragment of SEQ ID NO: 5 having pyruvate carboxylase activity). In some specific embodiments, the recombinant LAB host cell of the present disclosure can express a heterologous nucleic acid molecule comprising the nucleic acid sequence of SEQ ID NO: 6 or 7, a variant thereof (encoding a polypeptide having pyruvate carboxylase activity), a fragment thereof (encoding a polypeptide having pyruvate carboxylase activity) or a degenerate sequence encoding the polypeptide having the amino acid of SEQ ID NO: 5 (its variants or its fragments).

As used herein, the term "alcohol dehydrogenase" refers to an enzyme of the EC 1.1.1.1 class. In some embodiments, the alcohol dehydrogenase is an iron-containing alcohol dehydrogenase. The alcohol dehydrogenase that can be expressed in the bacterial host cell includes, but is not limited to, ADH4 from *Saccharomyces cerevisiae*, ADHB from *Zymonas mobilis*, FUCO from *Escherichia coli*, ADHE from *Escherichia coli*, ADH1 from *Clostridium acetobutylicum*, ADH1 from *Entamoeba nuttalli*, BDHA from *Clostridium acetobutylicum*, BDHB from *Clostridium acetobutylicum*, 4HBD from *Clostridium kluyveri*, DHAT from *Citrobacter freundii* or DHAT from *Klebsiella pneumoniae*. In an embodiment, the alcohol dehydrogenase can be ADHB from *Zymonas mobilis* (Gene ID: AHJ71151.1), *Lactobacillus reuteri* (Accession Number: KRK51011.1), *Lactobacillus mucosae* (Accession Number WP_048345394.1), *Lactobacillus brevis* (Accession Number WP_003553163.1) or *Streptococcus thermophilus* (Accession Number WP_113870363.1). In the recombinant LAB host cell of the present disclosure, the alcohol dehydrogenase can have the amino acid of SEQ ID NO: 8, be a variant of SEQ ID NO: 8 (having alcohol dehydrogenase activity) or a fragment of SEQ ID NO: 8 (having alcohol dehydrogenase activity). In some specific embodiments, the recombinant LAB host cell of the present disclosure can express a heterologous nucleic acid molecule comprising the nucleic acid sequence of SEQ ID NO: 9 or 10, be a variant of the nucleic acid sequence of SEQ ID NO: 9 or 10 (encoding a polypeptide having alcohol dehydrogenase activity), be a fragment of the nucleic acid sequence of SEQ ID NO: 9 or 10 (encoding a polypeptide having alcohol dehydrogenase activity), or be a degenerate sequence encoding the polypeptide having the amino acid sequence of SEQ ID NO: 8 (its variants or its fragments).

In some embodiments, it may be advantageous to reduce the lactate dehydrogenase activity in the recombinant LAB host cell having the one or more third genetic modification. In such embodiment, the recombinant LAB host cell can be further genetically modified to as to decrease its lactate dehydrogenase activity. In some embodiments, the recombinant LAB host cell can be further genetically modify so as to decrease its NAD-dependent lactate dehydrogenase activity. As used in the context of the present disclosure, the expression "lactate dehydrogenase" refer to an enzyme of the E.C. 1.1.1.27 class which is capable of catalyzing the conversion of pyruvic acid into lactate. The recombinant LAB host cell can thus have one or more gene coding for a protein having lactate dehydrogenase activity which is inactivated (via partial or total deletion of the gene). In bacteria, the ldh1, ldh2, ldh3 and ldh4 genes encode proteins having lactate dehydrogenase activity. Some bacteria may contain as many as six or more such genes (i.e., ldh5, ldh6, etc.) In an embodiment, at least one of the ldh1, ldh2, ldh3 and ldh4 genes, their corresponding orthologs and paralogs is inactivated in the recombinant LAB host cell. In an embodiment, only one of the ldh genes is inactivated in the recombinant LAB host cell. For example, in the recombinant LAB host cell of the present disclosure, only the ldh1 gene can be inactivated. In another embodiment, at least two of the ldh genes are inactivated in the recombinant LAB host cell. In another embodiment, only two of the ldh genes are inactivated in the recombinant LAB host cell. In a further embodiment, at least three of the ldh genes are inactivated in the recombinant LAB host cell. In a further embodiment, only three of the ldh genes are inactivated in the recombinant LAB host cell. In a further embodiment, at least four of the ldh genes are inactivated in the recombinant LAB host cell. In a further embodiment, only four of the ldh genes are inactivated in the recombinant LAB host cell. In a further embodiment, at least five of the ldh genes are inactivated in the recombinant LAB host cell. In a further embodiment, only five of the ldh genes are inactivated in the recombinant LAB host cell. In a further embodiment, at least six of the ldh genes are inactivated in the recombinant LAB host cell. In a further embodiment, only six of the ldh genes are inactivated in the recombinant LAB host cell. In still another embodiment, all of the ldh genes are inactivated in the recombinant LAB host cell.

In some embodiments, it may be advantageous to reduce the mannitol-1-phosphate 5-dehydrogenase activity in the recombinant LAB host cell. In such embodiment, the recombinant LAB host cell can be further genetically engineered to decrease its mannitol-1-phosphate 5-dehydrogenase activity. As used in the context of the present disclosure, the expression "mannitol-1-P 5-dehydrogenase" refer to an enzyme of the E.C. 1.1.1.17 class which is capable of catalyzing the conversion of mannitol into fructose-6-phosphate. The recombinant LAB host cell can thus have one or more gene coding for a protein having mannitol dehydrogenase activity which is inactivated (via partial or total deletion of the gene). In bacteria, the mltd1 and mltd2 genes encode proteins having mannitol-1-P 5-dehydrogenase activity. In an embodiment, at least one of the mltd1 and mltd2 genes, their corresponding orthologs and paralogs is inactivated in the recombinant LAB host cell. In an embodiment, only one of the mltd1 and mltd2 genes is inactivated in the recombinant LAB host cell. In another embodiment, both of the mltd1 and mltd2 genes are inactivated in the recombinant LAB host cell.

In some embodiments, the recombinant LAB host cell can include at least one fourth genetic modification for providing or increasing the catabolism of the at least one weak acid. The fourth genetic modification allows for the expression or the overexpression of a fourth polypeptide involved in the catabolism of the at least one weak acid. For example, the fourth genetic modification can be the introduction of a strong or constitutive promoter in a native gene encoding the fourth polypeptide so as to increase the expression of the fourth polypeptide. In another example, the fourth genetic modification can be the introduction of a fourth heterologous polypeptide encoding the fourth polypeptide to increase or provide the biological activity associated with the fourth polypeptide to the recombinant LAB host cell. The fourth polypeptide may be native or heterologous to the recombinant LAB host cell. The recombinant LAB host cell can include one or a plurality of fourth genetic modifications. For example, the recombinant LAB host cell can include one or a plurality of copies of the fourth heterologous nucleic acid molecules. In another example, the recombinant LAB host cell can include one or a plurality of fourth polypeptides. When more than one fourth polypeptides are intended to be expressed in the recombinant LAB host cell, they can be expressed from the same or different fourth nucleic acid molecules (each in one or more copy, each could be at the same or different loci).

In an embodiment, the antimicrobial composition comprises acetic acid as a weak acid. In such embodiment, the fourth genetic modification can comprise the introduction of one or more of a fourth heterologous nucleic acid molecule encoding one or more fourth heterologous polypeptide for catabolizing acetic acid. The one or more fourth heterologous polypeptide for catabolizing acetic acid can comprise a polypeptide having pyruvate dehydrogenase activity, a polypeptide having phosphotransacetylase activity, a polypeptide having acetylating acetaldehyde dehydrogenase (AADH) activity and/or a polypeptide having alcohol dehydrogenase (ADH) activity. In an embodiment, the one or more fourth heterologous polypeptide for catabolizing acetic acid can comprise a polypeptide having acetylating acetaldehyde dehydrogenase (AADH) activity and alcohol dehydrogenase (ADH) activity. In another embodiment, the one or more fourth heterologous polypeptide for catabolizing acetic acid can comprise a first polypeptide having acetylating acetaldehyde dehydrogenase (AADH) activity and a second polypeptide alcohol dehydrogenase (ADH) activity. In an embodiment, the one or more fourth heterologous polypeptide for catabolizing acetic acid comprises a polypeptide having pyruvate dehydrogenase activity, optionally in combination with a polypeptide having phosphotransacetylase activity, a polypeptide having acetylating acetaldehyde dehydrogenase (AADH) activity and/or a polypeptide having alcohol dehydrogenase (ADH) activity. In another embodiment, the one or more fourth heterologous polypeptide for catabolizing acetic acid comprises a polypeptide having phosphotransacetylase activity, optionally in combination with a polypeptide having pyruvate dehydrogenase activity, a polypeptide having acetylating acetaldehyde dehydrogenase (AADH) activity and/or a polypeptide having alcohol dehydrogenase (ADH) activity. In a further embodiment, the one or more fourth heterologous polypeptide for catabolizing acetic acid comprises a polypeptide having acetylating acetaldehyde dehydrogenase (AADH) activity, optionally in combination with a polypeptide having pyruvate dehydrogenase activity, a polypeptide having phosphotransacetylase activity and/or a polypeptide having alcohol dehydrogenase (ADH) activity. In still a further embodiment, the one or more fourth heterologous polypeptide for catabolizing acetic acid comprises a polypeptide having alcohol dehydrogenase (ADH) activity, optionally in combination with a polypeptide having pyruvate dehydrogenase activity, a polypeptide having phosphotransacetylase activity and/or a polypeptide having acetylating acetaldehyde dehydrogenase (AADH) activity.

In an embodiment, the polypeptide having acetylating acetaldehyde dehydrogenase (AADH) also exhibits alcohol dehydrogenase (ADH) activity (e.g., bifunctional enzyme). The polypeptide having bifunctional acetylating acetaldehyde dehydrogenase (AADH) and alcohol dehydrogenase (ADH) can be obtained, for example, from *Bifidobacterium* sp., such as *Bifidobacterium adolescentis*. In some embodiments, the polypeptide having bifunctional acetylating acetaldehyde dehydrogenase (AADH) and alcohol dehydrogenase (ADH) is ADHE, a variant thereof or a fragment thereof. In some embodiments, the polypeptide having bifunctional acetylating acetaldehyde dehydrogenase (AADH) and alcohol dehydrogenase (ADH) activities can have the amino acid sequence of SEQ ID NO: 1, be a variant of the amino acid sequence of SEQ ID NO: 1 (having bifunctional acetylating acetaldehyde dehydrogenase (AADH) and alcohol dehydrogenase (ADH) activities) or be a fragment of the amino acid sequence of SEQ ID NO: 1 (having bifunctional acetylating acetaldehyde dehydrogenase (AADH) and alcohol dehydrogenase (ADH) activities). In still another embodiment, the polypeptide having bifunctional acetylating acetaldehyde dehydrogenase (AADH) and alcohol dehydrogenase (ADH) activities can be encoded by a nucleic acid molecule having the nucleic acid sequence of SEQ ID NO: 2, being a variant of the nucleic acid sequence of SEQ ID NO: 2 (encoding a polypeptide having bifunctional acetylating acetaldehyde dehydrogenase (AADH) and alcohol dehydrogenase (ADH) activities), be a fragment of the nucleic acid sequence of SEQ ID NO: 2 (encoding a polypeptide having bifunctional acetylating acetaldehyde dehydrogenase (AADH) and alcohol dehydrogenase (ADH) activities), or be a degenerate sequence encoding the polypeptide having the amino acid sequence of SEQ ID NO: 1 (its variants or its fragments).

The polypeptide having bifunctional acetylating acetaldehyde dehydrogenase (AADH) and alcohol dehydrogenase (ADH) can be obtained, for example, from *Entamoeba* sp., such as *Entamoeba histolytica*. In some embodiments, the polypeptide having bifunctional acetylating acetaldehyde dehydrogenase (AADH) and alcohol dehydrogenase (ADH) is EhADH2 (GenBank Accession Number AAA81906.1), a variant thereof or a fragment thereof. In some embodiments, the polypeptide having bifunctional acetylating acetaldehyde dehydrogenase (AADH) and alcohol dehydrogenase (ADH) activities can have the amino acid sequence of SEQ ID NO: 15, be a variant of the amino acid sequence of SEQ ID NO: 15 (having bifunctional acetylating acetaldehyde dehydrogenase (AADH) and alcohol dehydrogenase (ADH) activities) or be a fragment of the amino acid sequence of SEQ ID NO: 15 (having bifunctional acetylating acetaldehyde dehydrogenase (AADH) and alcohol dehydrogenase (ADH) activities). In still another embodiment, the polypeptide having bifunctional acetylating acetaldehyde dehydrogenase (AADH) and alcohol dehydrogenase (ADH) activities can be encoded by a nucleic acid molecule having the nucleic acid sequence of SEQ ID NO: 16, being a variant of the nucleic acid sequence of SEQ ID NO: 16 (encoding a polypeptide having bifunctional acetylating acetaldehyde dehydrogenase (AADH) and alcohol dehydrogenase (ADH) activities), be a fragment of the nucleic acid sequence of SEQ ID NO: 16 (encoding a polypeptide having bifunctional acetylating acetaldehyde dehydrogenase (AADH) and alcohol dehydrogenase (ADH) activities), or be a degenerate sequence encoding the polypeptide having the amino acid sequence of SEQ ID NO: 15 (its variants or its fragments).

The polypeptide having bifunctional acetylating acetaldehyde dehydrogenase (AADH) and alcohol dehydrogenase (ADH) can be obtained, for example, from *Lactobacillus* sp., such as *Lactobacillus paracasei*. In some embodiments, the polypeptide having bifunctional acetylating acetaldehyde dehydrogenase (AADH) and alcohol dehydrogenase (ADH) is an alcohol dehydrogenase/acetaldehyde dehydrogenase (GenBank Accession Number EKQ00826), a variant thereof or a fragment thereof. In some embodiments, the polypeptide having bifunctional acetylating acetaldehyde dehydrogenase (AADH) and alcohol dehydrogenase (ADH) activities can have the amino acid sequence of SEQ ID NO: 34, be a variant of the amino acid sequence of SEQ ID NO: 34 (having bifunctional acetylating acetaldehyde dehydrogenase (AADH) and alcohol dehydrogenase (ADH) activities) or be a fragment of the amino acid sequence of SEQ ID NO: 34 (having bifunctional acetylating acetaldehyde dehydrogenase (AADH) and alcohol dehydrogenase (ADH) activities).

Additional embodiments of polypeptide having a bifunctional acetylating acetaldehyde dehydrogenase and alcohol dehydrogenase (ADH) activity have been described in WO 2019/058260 (incorporated herein in its entirety) and can be expressed in the recombinant LAB host cell.

The polypeptide(s) having pyruvate dehydrogenase activity (PDH) can be obtained, for example, from *Lactobacillus* sp., such as *Lactobacillus paracasei*. In *Lactobacillus paracasei*, a complex of three distinct polypeptides provide pyruvate dehydrogenase activity: a pyruvate dehydrogenase E1 component alpha subunit, a pyruvate dehydrogenase E1 component beta subunit and a dihydrolipoamide acetyltransferase component. In an embodiment, the pyruvate dehydrogenase E1 component alpha subunit refers to the polypeptide associated with GenBank accession number EKP99832, a variant thereof or a fragment thereof. In still another embodiment, the pyruvate dehydrogenase E1 component alpha subunit refers to the polypeptide associated with GenBank accession number EKP99833, a variant thereof or a fragment thereof. In still a further embodiment, the dihydrolipoamide acetyltransferase component refers to the polypeptide associated with GenBank accession number EKP99834, a variant thereof or a fragment thereof.

The polypeptide having phosphotransacetylase (or a phosphate acetyltransferase) activity can be obtained, for example, from *Lactococcus* sp., such as *Lactococcus lactis*. In an embodiment, the phosphotransacetylase corresponds to the polypeptide associated with GenBank accession number WP_023189688, a variant thereof (having phosphotransacetylase activity) or a fragment thereof (having phosphotransacetylase activity).

In an embodiment, the antimicrobial composition comprises formic acid as a weak acid. In such embodiment, the fourth genetic modification can comprise the introduction of one or more of a fourth heterologous nucleic acid molecule encoding one or more fourth heterologous polypeptide for catabolizing formic acid. The one or more fourth heterologous polypeptide for catabolizing the at least one weak acid can comprises a polypeptide having formate dehydrogenase (FDH) activity.

The polypeptide having formate dehydrogenase (FDH) activity can be obtained, for example, from *Mycobacterium* sp., and in some further embodiments, from *Mycobacterium smegmatic* or *Mycobacterium phlei*. In some embodiment, the polypeptide having formate dehydrogenase activity can be a NAD-dependent formate dehydrogenase. In an embodiment, the formate dehydrogenase corresponds to a polypeptide associate with GenBank accession number WP_158166608, a variant thereof (having formate dehydrogenase activity) or a fragment thereof (having formate dehydrogenase activity). In an embodiment, the formate dehydrogenase corresponds to a polypeptide associate with GenBank accession number VEG15038 or have the amino acid sequence of SEQ ID NO: 11, a variant thereof (having formate dehydrogenase activity) or a fragment thereof (having formate dehydrogenase activity). In an embodiment, the formate dehydrogenase corresponds to a polypeptide encoded by a nucleic acid molecule having the nucleic acid sequence of SEQ ID NO: 12, a variant thereof (encoding a polypeptide having formate dehydrogenase activity), a fragment thereof (encoding a polypeptide having formate dehydrogenase activity), or a degenerate sequence encoding the polypeptide having the amino acid sequence of SEQ ID NO: 11 (its variants or its fragments).

In an embodiment, the antimicrobial composition comprises lactic acid as a weak acid. In such embodiment, the fourth genetic modification can comprise the introduction of one or more of a fourth heterologous nucleic acid molecule encoding one or more fourth heterologous polypeptide for catabolizing lactic acid. The one or more first heterologous polypeptide for catabolizing the at least one weak acid can comprises a polypeptide capable of converting lactate into pyruvate, such as, for example, a NAD-independent lactate dehydrogenase (also referred to as respiratory LDH or iLDH). NAD-independent lactate dehydrogenases include, but are not limited to, $_L$-iLDH and $_D$-iLDH according to the chiral specificity. NAD-independent lactate dehydrogenases can be membrane-associated proteins and use membrane quinones as external electron acceptors. Alternatively, NAD-independent lactate dehydrogenases can use $O_2$ as an electron acceptor and correspond to a lactate oxidase (LOX) or a lactate monoxygenase (LMO). In some embodiments, NAD-independent lactate dehydrogenases can use cytochrome c as an electron acceptor and be referred to as a flavocytochrome b2 (FCB2).

In some embodiments, the LAB or the recombinant LAB host cell does not include any genetic modifications associated with the metabolism of weak acids present in the antimicrobial composition. Alternatively, the recombinant LAB host cell can include the one or more fourth genetic modification associated with the catabolism of at least one weak acid present in the antimicrobial composition. In some embodiments, the recombinant LAB host cell can include the one or more fourth genetic modification associated with the catabolism of at least two weak acids present in the antimicrobial composition. In some further embodiments, the recombinant LAB host cell can include the one or more fourth genetic modification associated with the catabolism of all of the weak acids present in the antimicrobial composition. In yet another embodiment, the recombinant LAB host cell can include the one or more fourth genetic modification associated with the catabolism of the weak acid present in the antimicrobial composition that are not catabolized by the yeast or the recombinant yeast host cell.

In some embodiments, the recombinant LAB host cell can include at least one fifth genetic modification for providing or increasing resistance against the at least one weak acid. The fifth genetic modification allows for the expression or the overexpression of a fifth polypeptide involved in the resistance against the at least one weak acid. For example, the fifth genetic modification can be the introduction of a strong or constitutive promoter in a native gene encoding the fifth polypeptide so as to increase the expression of the fifth polypeptide. In another example, the fifth genetic modification can be the introduction of a fifth heterologous polypeptide encoding the fifth polypeptide to increase or provide the biological activity associated with the fifth polypeptide to the recombinant LAB host cell. The fifth polypeptide may be native or heterologous to the recombinant LAB host cell. The recombinant LAB host cells can include one or a plurality of fifth genetic modifications. For example, the recombinant LAB host cell can include one or a plurality of copies of the fifth heterologous nucleic acid molecules. In another example, the recombinant LAB host cell can include one or a plurality of fifth polypeptides. When more than one fifth polypeptides are intended to be expressed in the recombinant LAB host cell, they can be expressed from the same or different fifth nucleic acid molecules (each in one or more copy, each could be at the same or different loci).

In an embodiment, the antimicrobial composition comprises hop acid as a weak acid. In such embodiment, the fifth genetic modification can comprise the introduction of one or more of a fifth heterologous nucleic acid molecule encoding one or more fifth heterologous polypeptide for providing resistance against the hop acid. The one or more fifth heterologous polypeptide for providing resistance against the hop acid can comprises a polypeptide having an adenosine triphosphate (ATP)-dependent efflux activity and/or a polypeptide having a proton motive force (PMF)-dependent efflux activity.

The polypeptide having an adenosine triphosphate (ATP)-dependent efflux activity can be, for example, a HORA polypeptide encoded by a horA gene, a horA gene ortholog or a horA gene paralog. In an embodiment, the polypeptide having an adenosine triphosphate (ATP)-dependent efflux activity can be obtained, for example, from *Lactobacillus* sp., such as, *Lactobacillus brevis*. In a specific embodiment, the polypeptide having an adenosine triphosphate (ATP)-dependent efflux activity corresponds to a polypeptide associated with GenBank accession number AB005752, a variant thereof (having adenosine triphosphate (ATP)-dependent efflux activity) or a fragment thereof (having adenosine triphosphate (ATP)-dependent efflux activity). In another embodiment, the polypeptide having an adenosine triphosphate (ATP)-dependent efflux activity can be obtained, for example, from *Pediococcus* sp., such as, *Pediococcus claussenii*. In a specific embodiment, the polypeptide having an adenosine triphosphate (ATP)-dependent efflux activity corresponds to a polypeptide associated with GenBank accession number AEV96194, a variant thereof (having adenosine triphosphate (ATP)-dependent efflux activity) or a fragment thereof (having adenosine triphosphate (ATP)-dependent efflux activity).

In an embodiment, the recombinant LAB host cell exhibits adaptive immunity against one or more of the weak acids present in the antimicrobial composition. In an embodiment, the recombinant LAB host cell exhibits adaptive immunity against one of the weak acids present in the antimicrobial composition. In another embodiment, the recombinant LAB host cell exhibits adaptive immunity against two of the weak acids present in the antimicrobial composition. In a further embodiment, the recombinant LAB host cell exhibits adaptive immunity against three of the weak acids present in the antimicrobial composition. In yet another embodiment, the recombinant LAB host cell exhibits adaptive immunity against all of the weak acids present in the antimicrobial composition. In an embodiment, the recombinant LAB host cell exhibits adaptive immunity against the hop acid present in the antimicrobial composition. As it is known in the art, adaptive immunity can be achieved by exposing the recombinant LAB host cell to increasing concentration of the weak acid(s) for which resistance is sought and selecting the at least one strain who has adapted to the presence of the weak acid (by exhibiting growth or a specific growth rate for example). This selection can be made over various cycles with increasing concentrations of the weak acid (such as hop acid).

As indicated above, the antimicrobial composition can include or the medium can be supplemented with a bacteriocin. In embodiments in which the antimicrobial composition/medium does include a bacteriocin, the recombinant LAB host cell should be immune to the activity of the bacteriocin present in the medium. Bacteriocin immunity can be native to the recombinant LAB host cell (especially in circumstances in which the bacteriocin of the antimicrobial composition is provided by the biological activity of the recombinant LAB host cell). However, in some embodiments, the recombinant LAB host cell can include at least one sixth genetic modification for providing or increasing immunity against the bacteriocin(s) present in the antimicrobial composition. The sixth genetic modification allows for the expression or the overexpression of a sixth polypeptide involved in the immunity against the bacteriocin(s) of the antimicrobial composition. For example, the sixth genetic modification can be the introduction of a strong or constitutive promoter in a native gene encoding the sixth polypeptide so as to increase the expression of the sixth polypeptide. In another example, the sixth genetic modification can be the introduction of a sixth heterologous polypeptide encoding the sixth polypeptide to increase or provide the biological activity associated with the sixth polypeptide to the recombinant LAB host cell. The sixth polypeptide may be native or heterologous to the recombinant LAB host cell. The recombinant LAB host cells can include one or a plurality of sixth genetic modifications. For example, the recombinant LAB host cell can include one or a plurality of copies of the sixth heterologous nucleic acid molecules. In another example, the recombinant LAB host cell can include one or a plurality of sixth polypeptides. When more than one sixth polypeptides are intended to be expressed in the recombinant LAB host cell, they can be expressed from the same or different sixth nucleic acid molecules (each in one or more copy, each could be at the same or different loci).

In an embodiment, the antimicrobial composition or the medium comprises a lantibiotic, such as nisin or a variant thereof, as a bacteriocin. In such embodiment, the sixth genetic modification can comprise the introduction of one or more of a sixth heterologous nucleic acid molecule encoding one or more sixth heterologous polypeptide for providing immunity against the lantibiotic. In an embodiment, the one or more sixth heterologous polypeptide for providing immunity against nisin can be obtained from *Lactococcus* sp., such as, for example, *Lactococcus lactis*. In an embodiment, the one or more sixth heterologous polypeptide for providing immunity against nisin as the lantibiotic can comprises a NisI polypeptide, optionally in combination with a NisE polypeptide (which is a nisin transporter), a NisF polypeptide (which is a nisin transporter) and/or a NisG polypeptide (which is a nisin permease). In an embodiment, NisI has the amino acid sequence of SEQ ID NO: 25 (as well as functional variants and fragments thereof retaining at least on part their ability to confer immunity against nisin). In an embodiment, NisE has the amino acid sequence of SEQ ID NO: 27 (as well as functional variants and fragments thereof retaining, at least in part, their ability to transport nisin). In an embodiment, NisF has the amino acid sequence of SEQ ID NO: 26 (as well as functional variants and fragments thereof retaining, at least in part, their ability to transport nisin). In an embodiment, NisG has the amino acid sequence of SEQ ID NO: 28 (as well as functional variants and fragments thereof retaining, at least in part, their ability to transport nisin).

In a specific embodiment, the antimicrobial composition or the medium comprises a Gram-positive class II bacteriocin, a variant thereof or a fragment thereof. In such embodiment, the sixth genetic modification can comprise the introduction of one or more of a sixth heterologous nucleic acid molecule encoding one or more sixth heterologous polypeptide for providing immunity against the class II bacteriocin. Gram-positive class II bacteriocins include two subgroups: class IIa and class IIb bacteriocins. In a specific example, the Gram-positive class IIa bacteriocin can be, without limitation, pediocin (also referred to as the PedA polypeptide). In such embodiments, the recombinant LAB host cell can express PedB or be genetically engineered to express PedB (as the one or more sixth heterologous polypeptide). In another specific example, the Gram-positive class IIb bacteriocin can be, without limitation, brochocin. Brochocin is an heterodimer comprising a BrcA polypeptide and a BrcB polypeptide. In such embodiment, the recombinant LAB host cell can express BrcI or be genetically engineered to express BrcI (as the one or more sixth heterologous polypeptide).

In still another example, the antimicrobial composition or the medium can comprise a Gram-positive IIc bacteriocin which can be, without limitation, gasserin A, acidocin B and plantaricyclin A. The one or more sixth heterologous polypeptide for providing immunity against gasserin A can be obtained from *Lactobacillus* sp., such as, for example, *Lactobacillus gasseri*. In an embodiment, the one or more sixth heterologous polypeptide for providing immunity against gasserin A can comprises a GaaI polypeptide, optionally in combination with a GaaT polypeptide (which is a ABC transporter) and/or a GaaE polypeptide (which is a permease). In an embodiment, the GaaI polypeptide has the amino acid sequence of SEQ ID NO: 31, is a variant thereof (exhibiting gasserin A immunity) or is a fragment thereof exhibiting gasserin A immunity). In another embodiment, the GaaT polypeptide has the amino acid sequence of SEQ ID NO: 32 (exhibiting ABC transporter activity), is a variant thereof or is a fragment thereof (exhibiting ABC transporter activity). In still another embodiment, the GaaE polypeptide has the amino acid sequence of SEQ ID NO: 33, is a variant thereof (exhibiting permease activity) or is a fragment thereof (exhibiting permease activity). The one or more sixth heterologous polypeptide for providing immunity against acidocin B can be obtained from *Lactobacillus* sp., such as, for example, *Lactobacillus acidophilus*. In an embodiment, the one or more sixth heterologous polypeptide for providing immunity against acidocin B can comprises a AciI polypeptide. The one or more sixth heterologous polypeptide for providing immunity against plantaricyclin A can be obtained from *Lactobacillus* sp., such as, for example, *Lactobacillus plantarum*. In an embodiment, the one or more sixth heterologous polypeptide for providing immunity against plantaricyclin A can comprises a PlcI polypeptide.

When the medium is supplemented with a bacteriocin, the bacteriocin can be provided in a purified form or can be expressed from the recombinant LAB host cell. In some embodiments, the bacteriocin can be natively expressed from the recombinant LAB host cell. In other embodiments, the recombinant LAB host cell can be genetically engineered to express the bacteriocin. In such embodiments, it is understood that, if the recombinant LAB host cell is genetically engineered to express the bacteriocin, it will also be genetically engineered to exhibit immunity against the recombinant bacteriocin it is capable of expressing. As such, in some embodiments, the recombinant LAB host cell can include at least one seventh genetic modification for expressing one or more bacteriocin. The seventh genetic modification allows for the expression or the overexpression of a seventh polypeptide involved in the expression the at least one bacteriocin of the antimicrobial composition. For example, the seventh genetic modification can be the introduction of a strong or constitutive promoter in a native gene encoding the seventh polypeptide so as to increase the expression of the seventh polypeptide. In another example, the seventh genetic modification can be the introduction of a seventh heterologous polypeptide encoding the seventh polypeptide to increase or provide the biological activity associated with the seventh polypeptide to the recombinant LAB host cell. The seventh polypeptide may be native or heterologous to the recombinant LAB host cell. The recombinant LAB host cells can include one or a plurality of seventh genetic modifications. For example, the recombinant LAB host cell can include one or a plurality of copies of the seventh heterologous nucleic acid molecules. In another example, the recombinant LAB host cell can include one or a plurality of seventh polypeptides. When more than one seventh polypeptides are intended to be expressed in the recombinant LAB host cell, they can be expressed from the same or different seventh nucleic acid molecules (each in one or more copy, each could be at the same or different loci).

In an embodiment, the antimicrobial composition comprises or the medium is supplemented with a lantibiotic, such as nisin or a variant thereof, as a bacteriocin. In such embodiment, the LAB can natively express such lantibiotic. Alternatively, the recombinant LAB host cell can include seventh genetic modification can comprise the introduction of one or more of a seventh heterologous nucleic acid molecule encoding one or more seventh heterologous polypeptide for expressing the lantibiotic. In embodiments in which the lantibiotic is nisin, the polypeptide can be from *Lactococcus* sp., such as, for example, *Lactococcus lactis*. Nisin can be nisin A, Z, J or Q. Nisin can be, without limitation a polypeptide having the amino acid sequence of any one of 21 to 24, variants thereof (exhibiting nisin antibacterial activity) and fragments thereof (exhibiting nisin antibacterial activity).

In an embodiment, the antimicrobial composition comprises or the medium is supplemented with a class IIa bacteriocin. In a specific example, the Gram-positive class IIa bacteriocin can be, without limitation, pediocin (also referred to as the PedA polypeptide). As such, the one or more seventh polypeptide can include the PedA polypeptide and be optionally expressed from one or more seventh heterologous nucleic acid molecule.

In an embodiment, the antimicrobial composition comprises or the medium is supplemented with a class IIb bacteriocin. In a specific example, the Gram-positive class IIb bacteriocin can be, without limitation, brochocin is an heterodimer comprising a BrcA polypeptide and a BrcB polypeptide. As such, the one or more seventh polypeptide can include the BrcA and the BrcB polypeptides and be optionally expressed from one or more seventh heterologous nucleic acid molecule.

In an embodiment, the antimicrobial composition comprises or the medium is supplemented with a class IIc bacteriocin, such as gasserin A or a variant thereof, as a bacteriocin. In such embodiment, the recombinant LAB host cell can natively express such class IIc bacteriocin. Alternatively, the recombinant LAB host cell can include a seventh genetic modification can comprise the introduction of one or more of a seventh heterologous nucleic acid molecule encoding one or more seventh heterologous polypeptide for expressing the class IIc bacteriocin and its associated immunity gene. When the class IIc bacteriocin comprises or is gasserin A, the seventh heterologous nucleic acid molecule can encode gasserin A (e.g., having the amino acid sequence of SEQ ID NO: 29 or 30, a variant thereof or a fragment thereof). When the class IIc bacteriocin comprises or is acidocin B, the seventh heterologous nucleic acid molecule can encode acidocin B. When the class IIc bacteriocin comprises or is plantaricyclin A, the seventh heterologous nucleic acid molecule can encode plataricyclin A.

The amino acid sequences provided herein for the different bacteriocins do not include such post-translational modifications, but it is understood that a recombinant LAB host cell expressing a bacteriocin from a seventh nucleic acid molecule can produce a polypeptide which does not exactly match the amino acid sequence of the different SEQ ID NOs, but the exported bacteriocin can be derived from such amino acid sequences (by post-translational modification).

In some embodiments, the antimicrobial composition or the medium can include one or more antibiotic. If the LAB's growth or viability is sensitive to the activity of the antibiotic present in the antimicrobial composition or the medium, the recombinant LAB host cell can include an eighth genetic modification for providing or increasing immunity resistance against the antibiotic. For example, the eighth genetic modification can comprise the introduction of one or more of an eighth heterologous nucleic acid molecule encoding one or more eighth heterologous polypeptide for providing resistance against the one or more antibiotic present in the medium or the antimicrobial composition. The one or more eighth heterologous polypeptide for providing resistance against the at least one antibiotic, such as, for example, penicillin, virginiamycin, streptomycin and/or momensin. Alternatively or in combination, the recombinant LAB host cell can be submitted an adaptive evolution process to provide resistance against the one or more antibiotic. During adaptive evolution, the recombinant LAB host cell is placed in increasing concentration of one or more antibiotic and the cells that adapt to grow or grow more rapidly are selected. The adaptive evolution process can be use with one or more antibiotic such as, for example, penicillin, virginiamycin, streptomycin and/or momensin. As such, the recombinant LAB host cell can be adapted to become resistant to at least one penicillin, virginiamycin, streptomycin and/or momensin.

In an embodiment, the recombinant LAB host cell exhibits adaptive immunity against the antibiotic(s) present in the antimicrobial composition or the medium. In an embodiment, the recombinant LAB host cell exhibits adaptive immunity against one of the antibiotic present in the antimicrobial composition or the medium. In another embodiment, the recombinant LAB host cell exhibits adaptive immunity against two of the antibiotics present in the antimicrobial composition or the medium. In a further embodiment, the recombinant LAB host cell exhibits adaptive immunity against three of the antibiotics present in the antimicrobial composition or the medium. In yet another embodiment, the recombinant LAB host cell exhibits adaptive immunity against all of the antibiotics present in the antimicrobial composition or the medium. As it is known in the art, adaptive immunity can be achieved by exposing the recombinant LAB host cell to increasing concentration of the antibiotic(s) for which resistance is sought and selecting the at least one strain who has adapted to the presence of the antibiotic (by exhibiting growth or a specific growth rate for example). This selection can be made over various cycles with increasing concentrations of the antibiotic.

EXAMPLE I

Characterization of Antimicrobial Activity of Various Components

A laboratory model has been developed to characterize the microbial activity of various components (in isolation and in combination). The laboratory model is shown in FIG. 1. Briefly, cycloheximide and glucose are added to a pasteurized corn mash (step 010). At step 020, the pasteurized mash was supplemented with an antimicrobial composition and submitted to an acidic treatment. More specifically, at substep 021, an antimicrobial composition was added to the pasteurized mash. Then, at substep 022, contaminating wild-type microbial cells (obtained from a commercial plant) were added. Afterwards, at substep 023, the mash was submitted to an acidic treatment with sulfuric acid. The mash was held in such acidic conditions for 30 minutes at 33° C. (step 030). A base was then added to the acidic mash to increase the pH of the mixture (to a level suitable for the growth and metabolic activity of yeasts, step 040). The neutralized mash obtained after step 040 was maintained at 12 hours at 33° C. (step 050). Step 050 was used to allow, if any, the bacterial growth to measure the antimicrobial efficiency of the different treatments. At step 060, the pH and the presence of different metabolites (using HPLC) were determined.

To better understand the effectiveness of different antimicrobial components, experiments were performed using different combinations of acids plus the broad-spectrum bacteriocin nisin as well as ethanol. As is shown in Table 1, formate alone provided greater inhibition than acetate or D/L lactate only, while formate or acetate yielded roughly equivalent inhibition when incorporated into the mash.

TABLE 1

Relative effectiveness of different organic acids in the laboratory scale model. Percent of standard or % Std represents the change in pH of the treatment relative to the control divided the change in pH observed with the standard treatment (shown in row 1) relative to the control, multiplied by 100.

| Treatment | pH 3.2 | Formate 0.1% w/v | Acetate 0.1% w/v | DL-Lactate 0.1% w/v | Nisin Z 100 ppm | Hops 10 ppm | EtOH 3.0% w/v | % Std |
|---|---|---|---|---|---|---|---|---|
| 1 | Yes | Yes | No | No | Yes | Yes | Yes | 100 |
| 2 | Yes | Yes | No | No | No | No | No | 14 |
| 3 | Yes | No | Yes | No | No | No | No | 8 |
| 4 | Yes | No | No | Yes | No | No | No | 2 |
| 5 | Yes | Yes | No | No | Yes | Yes | Yes | 100 |
| 6 | Yes | No | Yes | No | Yes | Yes | Yes | 97 |
| 7 | Yes | No | No | Yes | Yes | Yes | Yes | 89 |

To evaluate the impact of nisin on antimicrobial activity, the bacteriocin was added at 0, 50 or 100 ppm to the antimicrobial blend. Additionally, in one treatment 100 ppm nisin was added after the pH was raised to 5.5. As shown in Table 2, reducing the concentration by 50% had a significant impact on its antimicrobial effectiveness, while adding nisin after the pH was raised was more effective than adding nisin as a part of the antimicrobial blend.

TABLE 2

Relative effectiveness of different nisin concentrations in the laboratory scale model. Percent of standard or % Std represents the change in pH of the treatment relative to the control divided the change in pH observed with the standard treatment (shown in row 1) relative to the control, multiplied by 100.

| Treatment | pH 3.2 | Formate 0.1% w/v | Nisin Z 100 ppm | Hops 10 ppm | EtOH 3% w/v | Nisin Z 100 ppm | % Std |
|---|---|---|---|---|---|---|---|
| 1 | Yes | Yes | Yes | Yes | Yes | No | 100 |
| 2 | Yes | Yes | Half | Yes | Yes | No | 72 |
| 3 | Yes | Yes | No | Yes | Yes | No | 69 |
| 4 | Yes | Yes | No | Yes | Yes | Yes | 114 |

Next, the level of hop acid addition was varied from 0 to 50 ppm to evaluate the impact of hop acid concentration on antimicrobial efficacy (Table 3). Increasing the concentration of hop acids from 10 ppm, the standard quantity used, to 20, 30 or 40 ppm had a significant impact on the effectiveness of the antimicrobial blend.

TABLE 3

Relative effectiveness of different hops concentrations in the laboratory scale model. Percent of standard or % Std represents the change in pH of the treatment relative to the control divided the change in pH observed with the standard treatment (shown in row 1) relative to the control, multiplied by 100.

| Treatment | pH 3.2 | Formate 0.1% w/v | Nisin Z 100 ppm | Hops 10 ppm | EtOH 3% w/v | % Std |
|---|---|---|---|---|---|---|
| 1 | Yes | Yes | Yes | Yes | Yes | 100 |
| 2 | Yes | Yes | Yes | No | Yes | 78 |
| 3 | Yes | Yes | Yes | 20 | Yes | 146 |
| 4 | Yes | Yes | Yes | 30 | Yes | 162 |
| 5 | Yes | Yes | Yes | 40 | Yes | 178 |
| 6 | Yes | Yes | Yes | 50 | Yes | 177 |

The impact of individual components was evaluated both by evaluating the components one-by-one (Table 4) and by removal of individual components from the standard antimicrobial mixture (Table 5). These results indicate that no single component is responsible for 50% of the observed inhibition.

TABLE 4

Relative effectiveness of each component in the laboratory scale model. Percent of standard or % Std represents the change in pH of the treatment relative to the control divided the change in pH observed with the standard treatment (shown in row 1) relative to the control, multiplied by 100.

| Treatment | pH 3.2 | Formate 0.1% w/v | Nisin Z 100 ppm | Hops 10 ppm | EtOH 3% w/v | % Std |
|---|---|---|---|---|---|---|
| 1 | Yes | Yes | Yes | Yes | Yes | 100 |
| 2 | Yes | No | No | No | No | 9 |
| 3 | Yes | Yes | No | No | No | 21 |
| 3 | Yes | No | Yes | No | No | 44 |
| 4 | Yes | No | No | Yes | No | 19 |
| 5 | Yes | No | No | No | Yes | 26 |

TABLE 5

Relative effectiveness of each component in the laboratory scale model. Percent of standard or % Std represents the change in pH of the treatment relative to the control divided the change in pH observed with the standard treatment (shown in row 1) relative to the control, multiplied by 100.

| Treatment | pH 3.2 | Formate 0.1% w/v | Nisin Z 100 ppm | Hops 10 ppm | EtOH 3% w/v | % Std |
|---|---|---|---|---|---|---|
| 1 | Yes | Yes | Yes | Yes | Yes | 100 |
| 2 | Yes | No | Yes | Yes | Yes | 95 |
| 3 | Yes | Yes | No | Yes | Yes | 56 |
| 4 | Yes | Yes | Yes | No | Yes | 77 |
| 5 | Yes | Yes | Yes | Yes | No | 78 |

EXAMPLE II

Characterization of Recombinant Host Cells

Figure 3:
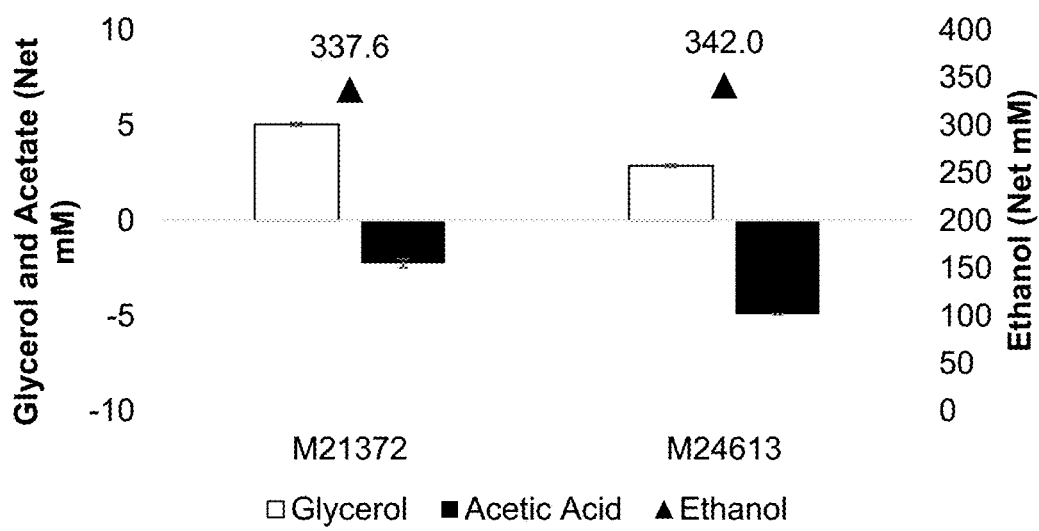
FIG. 3 illustrates the glycerol (white bars, in mM, left axis), acetic acid (black bars, in mM, left axis) and ethanol (▲, in mM, right axis) content after the fermentation of a YPD media supplemented with lactate. Results are shown in function of the yeast strain used.
Figure 4:
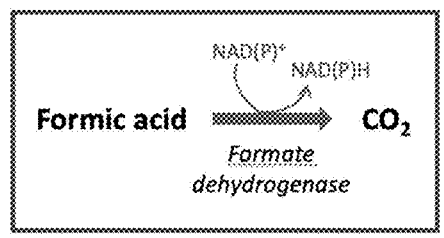
FIG. 4 illustrates the metabolic pathway for formic acid metabolism. Enzyme name is italicized.

Acetate utilization. *Saccharomyces cerevisiae* strain M21372 was engineered for acetate utilization by introducing 2-copies (2-per chromosome) of the *Bifidobacterium adolescentis* adhE (having the amino acid sequence of SEQ ID NO: 1 encoded by the nucleic acid sequence of SEQ ID NO: 2) which is a bi-functional acetaldehyde/alcohol dehydrogenase and an acetyl-CoA synthetase respectively. Strain M21372 was also engineered to up-regulate the expression of the native ACS2 (having the amino acid sequence of SEQ ID NO: 3, encoded by the nucleic acid sequence of SEQ ID NO: 4). Strain M24613 was engineered using strain M21372 as a parental strain. As the introduced acetate conversion pathway is required to compete for NADH with the native glycerol biosynthetic pathway, the later was down-regulated by deletion of gpd2, encoding a glycerol-3-phosphate dehydrogenase, to generate yeast strain M24613. The strains were then submitted to a fermentation of a YPD media supplemented with 1 g/L of lactate. As shown in FIG. 3, acetate utilization of strain M24613 was increased by 2-fold when compared to strain M21372.

Figure 5:
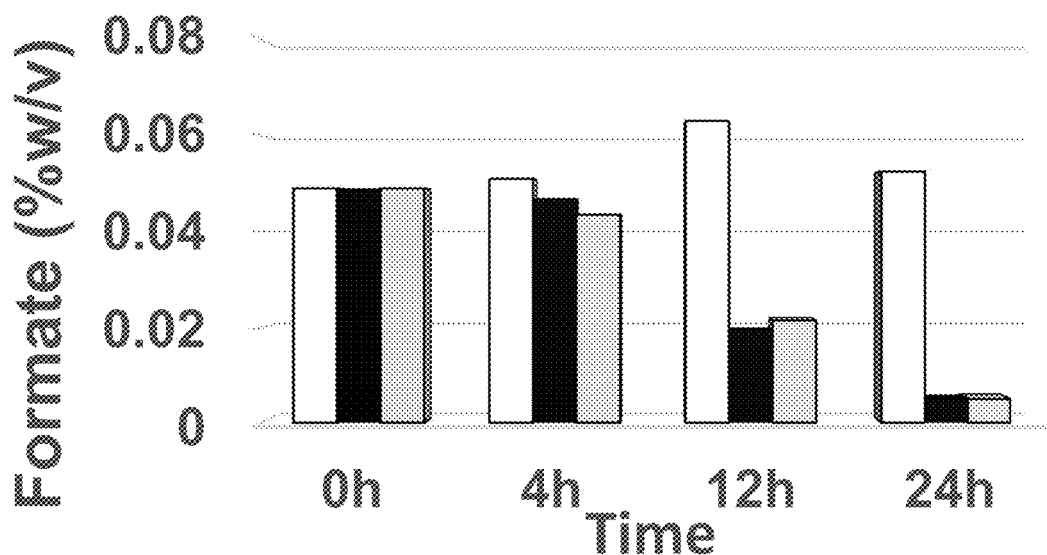
FIG. 5 illustrates the formic acid content (% w/v) after the fermentation of a medium supplemented with formate. Results are shown in function of the bacterial strain/isolate used (M23271=white bars, M23271-FDH2=black bars, M23271-FDH3=grey bars). Isolates M23271-FDH2 and M23271-FDH3 refer to two different isolates from the same genetic constructs.

Formate utilization. *Lactobacillus paracasei* strain 12A (also referred to as strain M23271) was converted to an ethanologen through deletion of four native lactate dehydrogenases, two native mannitol dehydrogenases, and incorporation of a heterologous Production of Ethanol cassette (PET) consisting of the *Zymomonas mobilis* pyruvate decarboxylase (SEQ ID NO: 5) and alcohol dehydrogenase (SEQ ID NO: 8) (ΔL-ldh1::Ppgm-PET, ΔL-ldh2, ΔD-hic, ΔmtlD1, ΔmtlD2, ΔL-ldh3PuspA-PET). Strain M23271 was engineered for formate utilization by introducing a codon-optimized NAD(H)-specific formate dehydrogenase (FDH, having the amino acid sequence of SEQ ID NO: 11 encoded by the nucleic acid sequence of SEQ ID NO: 12) in parental strain 12A. As is shown in FIG. 5, FDH expression by *Lb. paracasei* M23271 enabled complete degradation of 0.05% formate within 24 h.

Hop acid resistance. Strain M23271 can tolerate up to 10 mM hops (data not shown). To further increase hop resistance an adaptive evolution of strains to hops was performed. More specifically, the adaptive evolution was performed by serial transfer of the bacterium in laboratory broth that contains increasing concentrations of hops acids. By this approach, strain M23271 has been adapted to grow in MRS broth with 50 ppm hop acids (data not shown). In a separate approach, *Lactococcus lactis* strain M23989 with a codon optimized version of the *Lactobacillus brevis* ATP-dependent efflux protein HorA (having the amino acid sequence of SEQ ID NO: 13, encoded by the nucleic acid sequence of SEQ ID NO: 14).

While the invention has been described in connection with specific embodiments thereof, it will be understood that the scope of the claims should not be limited by the preferred embodiments set forth in the examples, but should be given the broadest interpretation consistent with the description as a whole.

REFERENCE

Gabrielsen C, Brede D A, Nes I F, Diep D B. Circular bacteriocins: biosynthesis and mode of action. Appl Environ Microbiol. 2014 November; 80(22):6854-62.

What is claimed is:

1. A process for making a medium for a yeast, the process comprising:
   (i) adjusting the pH of a raw medium with a strong acid to provide a first acidified medium having a pH below 4.5;
   (ii) maintaining the first acidified medium at the adjusted pH for a period of time to provide a second acidified medium, wherein the period of time is at least 10 minutes; and
   (iii) adjusting the pH of the second acidified medium with a base to provide the medium for the yeast having a pH above 4.5;
wherein
   the process comprises adding an antimicrobial composition to the:
      raw medium prior to or during step (i), and/or
      acidified medium prior to or during step (ii);
wherein the antimicrobial composition comprises at least one weak acid, optionally, in combination with an acid stable bacteriocin and/or an antibiotic;
wherein step (i) comprises adjusting the pH of the raw medium below or equal to the pKa of the at least one weak acid of the antimicrobial composition; and wherein step (ii) comprises maintaining the first acidified medium so as to decrease the contaminating microbial activity in the second acidified medium, when compared to a corresponding control medium not previously treated with the antimicrobial composition; and wherein the raw medium comprises a fermentable material.

2. The process of claim 1, wherein the at least one weak acid comprises or is a carboxylic acid and/or comprises or is a vinylogous acid.

3. The process of claim 2, wherein the carboxylic acid is acetic acid, lactic acid and/or formic acid and/or the vinylogous acid is a hop acid.

4. The process of claim 1, wherein the strong acid is sulfuric acid.

5. The process of claim 1, wherein the acid stable bacteriocin comprises or is a lantibiotic and/or a Class IIc bacteriocin.

6. The process of claim 5, wherein the antimicrobial composition comprises nisin.

7. The process of claim 1, further comprising, prior to step (i), applying a heat treatment to the raw medium.

8. The process of claim 1, wherein the period of time is at least 15 minutes.

9. The process of claim 1, further comprising adding:
the yeast and/or a second bacteriocin to the raw medium prior to or during step (i);
the yeast and/or the second bacteriocin to the first acidified medium prior to or during step (ii); and/or
the yeast, the second bacteriocin, a recombinant lactic acid bacterium (LAB) and/or an antibiotic to the medium for the yeast;
wherein when the second bacteriocin is added to the first raw medium prior to or during step (i) and/or first acidified medium prior to or during step (ii), the second bacteriocin is acid stable.

10. The process of claim 1, further comprising:
(iv) adding the yeast to the medium obtained from step (iii) to obtain an inoculated medium; and
(v) culturing the yeast under conditions so as to favor the propagation of the yeast and obtain a propagated medium comprising a propagated yeast population.

11. The process of claim 1, further comprising:
(iv) adding the yeast to the medium obtained from step (iii); and
(iv) culturing the yeast under conditions so as to allow the conversion of at least in part a fermentable material into a fermentation product.

12. The process of claim 10, further comprising:
(vi) culturing the yeast of step (v) under conditions so as to allow the conversion of at least in part a fermentable material into a fermentation product.

13. The process of claim 1, wherein the fermentable material comprises or is derived from corn.

14. The process of claim 9, wherein the yeast is a recombinant yeast host cell.

15. The process of claim 14, wherein the recombinant yeast host cell comprises:
at least one first genetic modification for providing or increasing the catabolism of the at least one weak acid; and/or
at least one second genetic modification for converting, at least in part, a fermentable material into a fermentation product.

16. The process of claim 15, wherein the at least one first genetic modification comprises the introduction of one or more of a first heterologous nucleic acid molecule encoding one or more first heterologous polypeptide for catabolizing the at least one weak acid.

17. The process of claim 16, wherein:
the at least one weak acid comprises acetic acid and the one or more first heterologous polypeptide for catabolizing the at least one weak acid comprises a polypeptide having acetylating acetaldehyde dehydrogenase (AADH) activity;
the at least one weak acid comprises formic acid and the one or more first heterologous polypeptide for catabolizing the at least one weak acid comprises a polypeptide having formate dehydrogenase (FDH) activity; and/or
the at least one weak acid comprises lactic acid and the one or more first heterologous polypeptide for catabolizing the at least one weak acid comprises a polypeptide having NAD-independent lactate dehydrogenase activity.

18. The process of claim 9, wherein the yeast or the recombinant yeast host cell is from the genus *Saccharomyces* sp. and/or from the species *Saccharomyces cerevisiae*.

19. The process of claim 9, wherein the recombinant LAB host cell includes at least one third genetic modification for converting, at least in part, the medium into a fermentation product.

20. The process of claim 19, wherein the at least one third genetic modification comprises the introduction of one or more third genetic heterologous nucleic acid molecules encoding one or more third heterologous polypeptide for converting, at least in part, the medium into the fermentation product.

21. The process of claim 20, wherein:
the fermentation product is ethanol and the at least one third heterologous polypeptide for converting, at least in part, the medium into the fermentation product comprises a polypeptide having pyruvate decarboxylase activity; and/or a polypeptide having alcohol dehydrogenase activity; and/or
the recombinant LAB host cell has a decreased lactate dehydrogenase activity when compared to a corresponding native LAB cell.

22. The process of claim 21, wherein the recombinant LAB host cell further comprises:
at least one fourth genetic modification for providing or increasing the catabolism of the at least one weak acid;
at least one fifth genetic modification for providing or increasing resistance against the at least one weak acid;
at least one sixth genetic modification for providing or increasing immunity against the acid stable bacteriocin, and/or the second bacteriocin;
at least one seventh genetic modification for expressing the acid stable bacteriocin, and/or the second bacteriocin; and/or
at least one eighth genetic modification for providing or increasing immunity resistance against the antibiotic.

23. The process of claim 22, wherein:
the at least one fourth genetic modification comprises the introduction of one or more of a fourth heterologous nucleic acid molecule encoding one or more fourth heterologous polypeptide for catabolizing the at least one weak acid;
the at least one fifth genetic modification comprises the introduction of one or more of a fifth heterologous nucleic acid molecule encoding one or more fifth heterologous polypeptide for providing or increasing resistance against the at least one weak acid;
the at least one sixth genetic modification comprises the introduction of one or more of a sixth heterologous nucleic acid molecule encoding one or more sixth heterologous polypeptide for providing or increasing immunity against the acid-stable bacteriocin, and/or the second bacteriocin;
the at least one seventh genetic modification comprises the introduction of one or more of a seventh heterologous nucleic acid molecule encoding one or more seventh heterologous polypeptide for expressing the acid stable bacteriocin, and/or the second bacteriocin; and/or
the at least one eighth genetic modification comprises the introduction of one or more of an eighth heterologous nucleic acid molecule encoding one or more eighth heterologous for providing or increasing immunity against the antibiotic.

24. The process of claim 23, wherein:

the at least one weak acid comprises acetic acid and the one or more fourth heterologous polypeptide for catabolizing the at least one weak acid comprises one or more polypeptide having acetylating acetaldehyde dehydrogenase (AADH) activity and alcohol dehydrogenase (ADH) activity;

the at least one weak acid comprises formic acid and the one or more fourth heterologous polypeptide for catabolizing the at least one weak acid comprises a polypeptide having formate dehydrogenase (FDH) activity;

the at least one weak acid comprises lactic acid and the one or more fourth heterologous polypeptide for catabolizing the at least one weak acid comprises a polypeptide having a NAD-independent lactate dehydrogenase activity; and/or the at least one weak acid comprises hop acid and the one or more fifth heterologous polypeptide for providing or increasing resistance against the at least one weak acid comprises a polypeptide having an adenosine triphosphate (ATP)-dependent efflux activity.

25. The process of claim 9, wherein the recombinant LAB host cell exhibits adaptive immunity against the at least one weak acid and/or the antibiotic.

26. The process of claim 9, wherein the recombinant LAB host cell is from the genus *Lactobacillus* sp. and/or from the species *Lactobacillus paracasei*.

* * * * *

SEQUENCE LISTING

```
<160> NUMBER OF SEQ ID NOS: 34

<210> SEQ ID NO 1
<211> LENGTH: 910
<212> TYPE: PRT
<213> ORGANISM: Bifidobacterium adolescentis

<400> SEQUENCE: 1

Met Ala Asp Ala Lys Lys Lys Glu Glu Pro Thr Lys Pro Thr Pro Glu
1               5                   10                  15

Glu Lys Leu Ala Ala Glu Ala Glu Val Asp Ala Leu Val Lys Lys
            20                  25                  30

Gly Leu Lys Ala Leu Asp Glu Phe Glu Lys Leu Asp Gln Lys Gln Val
            35                  40                  45

Asp His Ile Val Ala Lys Ala Ser Val Ala Ala Leu Asn Lys His Leu
        50                  55                  60

Val Leu Ala Lys Met Ala Val Asp Glu Thr His Arg Gly Leu Val Glu
65                  70                  75                  80

Asp Lys Ala Thr Lys Asn Ile Phe Ala Cys Glu His Val Thr Asn Tyr
                85                  90                  95

Leu Ala Gly Gln Lys Thr Val Gly Ile Ile Arg Glu Asp Asp Val Leu
            100                 105                 110

Gly Ile Asp Glu Ile Ala Glu Pro Val Gly Val Val Ala Gly Val Thr
        115                 120                 125

Pro Val Thr Asn Pro Thr Ser Thr Ala Ile Phe Lys Ser Leu Ile Ala
        130                 135                 140

Leu Lys Thr Arg Cys Pro Ile Ile Phe Gly Phe His Pro Gly Ala Gln
145                 150                 155                 160

Asn Cys Ser Val Ala Ala Ala Lys Ile Val Arg Asp Ala Ala Ile Ala
                165                 170                 175

Ala Gly Ala Pro Glu Asn Cys Ile Gln Trp Ile Glu His Pro Ser Ile
            180                 185                 190

Glu Ala Thr Gly Ala Leu Met Lys His Asp Gly Val Ala Thr Ile Leu
        195                 200                 205

Ala Thr Gly Gly Pro Gly Met Val Lys Ala Ala Tyr Ser Ser Gly Lys
    210                 215                 220

Pro Ala Leu Gly Val Gly Ala Gly Asn Ala Pro Ala Tyr Val Asp Lys
225                 230                 235                 240

Asn Val Asp Val Val Arg Ala Ala Asn Asp Leu Ile Leu Ser Lys His
                245                 250                 255

Phe Asp Tyr Gly Met Ile Cys Ala Thr Glu Gln Ala Ile Ile Ala Asp
            260                 265                 270

Lys Asp Ile Tyr Asp Pro Leu Val Lys Glu Leu Lys Arg Arg Lys Ala
        275                 280                 285

Tyr Phe Val Asn Ala Glu Glu Lys Ala Lys Leu Glu Gln Tyr Met Phe
    290                 295                 300

Gly Cys Thr Ala Tyr Ser Gly Gln Thr Pro Lys Leu Asn Ser Val Val
```

-continued

```
                305                 310                 315                 320
        Pro Gly Lys Ser Pro Gln Tyr Ile Ala Lys Ala Gly Phe Glu Ile
                    325                 330                 335

Pro Glu Asp Ala Thr Ile Leu Ala Ala Glu Cys Lys Glu Val Gly Glu
                    340                 345                 350

Asn Glu Pro Leu Thr Met Glu Lys Leu Ala Pro Val Gln Ala Val Leu
                    355                 360                 365

Lys Ser Asp Asn Lys Glu Gln Ala Phe Glu Met Cys Glu Ala Met Leu
        370                 375                 380

Lys His Gly Ala Gly His Thr Ala Ala Ile His Thr Asn Asp Arg Asp
        385                 390                 395                 400

Leu Val Arg Glu Tyr Gly Gln Arg Met His Ala Cys Arg Ile Ile Trp
                        405                 410                 415

Asn Ser Pro Ser Ser Leu Gly Gly Val Gly Asp Ile Tyr Asn Ala Ile
                        420                 425                 430

Ala Pro Ser Leu Thr Leu Gly Cys Gly Ser Tyr Gly Gly Asn Ser Val
                        435                 440                 445

Ser Gly Asn Val Gln Ala Val Asn Leu Ile Asn Ile Lys Arg Ile Ala
        450                 455                 460

Arg Arg Asn Asn Asn Met Gln Trp Phe Lys Ile Pro Ala Lys Thr Tyr
        465                 470                 475                 480

Phe Glu Pro Asn Ala Ile Lys Tyr Leu Arg Asp Met Tyr Gly Ile Glu
                        485                 490                 495

Lys Ala Val Ile Val Cys Asp Lys Val Met Glu Gln Leu Gly Ile Val
                        500                 505                 510

Asp Lys Ile Ile Asp Gln Leu Arg Ala Arg Ser Asn Arg Val Thr Phe
                        515                 520                 525

Arg Ile Ile Asp Tyr Val Glu Pro Glu Pro Ser Val Glu Thr Val Glu
                        530                 535                 540

Arg Gly Ala Ala Met Met Arg Glu Glu Phe Glu Pro Asp Thr Ile Ile
        545                 550                 555                 560

Ala Val Gly Gly Gly Ser Pro Met Asp Ala Ser Lys Ile Met Trp Leu
                        565                 570                 575

Leu Tyr Glu His Pro Glu Ile Ser Phe Ser Asp Val Arg Glu Lys Phe
                        580                 585                 590

Phe Asp Ile Arg Lys Arg Ala Phe Lys Ile Pro Pro Leu Gly Lys Lys
                        595                 600                 605

Ala Lys Leu Val Cys Ile Pro Thr Ser Ser Gly Thr Gly Ser Glu Val
                        610                 615                 620

Thr Pro Phe Ala Val Ile Thr Asp His Lys Thr Gly Tyr Lys Tyr Pro
        625                 630                 635                 640

Ile Thr Asp Tyr Ala Leu Thr Pro Ser Val Ala Ile Val Asp Pro Val
                        645                 650                 655

Leu Ala Arg Thr Gln Pro Arg Lys Leu Ala Ser Asp Ala Gly Phe Asp
                        660                 665                 670

Ala Leu Thr His Ala Phe Glu Ala Tyr Val Ser Val Tyr Ala Asn Asp
                        675                 680                 685

Phe Thr Asp Gly Met Ala Leu His Ala Ala Lys Leu Val Trp Asp Asn
                        690                 695                 700

Leu Ala Glu Ser Val Asn Gly Glu Pro Gly Glu Glu Lys Thr Arg Ala
        705                 710                 715                 720

Gln Glu Lys Met His Asn Ala Ala Thr Met Ala Gly Met Ala Phe Gly
                        725                 730                 735
```

```
Ser Ala Phe Leu Gly Met Cys His Gly Met Ala His Thr Ile Gly Ala
                740                 745                 750

Leu Cys His Val Ala His Gly Arg Thr Asn Ser Ile Leu Leu Pro Tyr
                755                 760                 765

Val Ile Arg Tyr Asn Gly Ser Val Pro Glu Glu Pro Thr Ser Trp Pro
        770                 775                 780

Lys Tyr Asn Lys Tyr Ile Ala Pro Glu Arg Tyr Gln Glu Ile Ala Lys
785                 790                 795                 800

Asn Leu Gly Val Asn Pro Gly Lys Thr Pro Glu Glu Gly Val Glu Asn
                805                 810                 815

Leu Ala Lys Ala Val Glu Asp Tyr Arg Asp Asn Lys Leu Gly Met Asn
                820                 825                 830

Lys Ser Phe Lys Glu Cys Gly Val Asp Glu Asp Tyr Tyr Trp Ser Ile
                835                 840                 845

Ile Asp Gln Ile Gly Met Arg Ala Tyr Glu Asp Gln Cys Ala Pro Ala
        850                 855                 860

Asn Pro Arg Ile Pro Gln Ile Glu Asp Met Lys Asp Ile Ala Ile Ala
865                 870                 875                 880

Ala Tyr Tyr Gly Val Ser Gln Glu Glu Gly His Lys Leu Arg Ile Glu
                885                 890                 895

Arg Gln Gly Glu Ala Ala Thr Glu Glu Ala Ser Glu Arg Ala
                900                 905                 910

<210> SEQ ID NO 2
<211> LENGTH: 2733
<212> TYPE: DNA
<213> ORGANISM: Bifidobacterium adolescentis

<400> SEQUENCE: 2
gtggcagacg caaagaagaa ggaagagccg accaagccga ctccggaaga gaagctcgcc      60
gcagccgagc tgaggtcgac gctctggtc aagaagggcc tgaaggctct tgatgaattc      120
gagaagctcg atcagaagca ggttgaccac atcgtggcca aggcttccgt cgcagccctg      180
aacaagcact ggtgctcgc caagatggcc gtcgaggaga cccaccgtgg tctggtcgaa      240
gacaaggcca ccaagaacat cttcgcctgc gagcatgtca ccaactacct ggctggtcag      300
aagaccgtcg gcatcatccg cgaggacgac gtgctgggca tcgacgaaat cgccgagccg      360
gttggcgtcg tcgctggcgt gaccccggtc accaacccga cctccaccgc catcttcaag      420
tcgctgatcg cactgaagac ccgctgcccg atcatcttcg gcttccaccc gggcgcacag      480
aactgctccg tcgcggccgc caagatcgtt cgcgatgccg ctatcgcagc aggcgctcct      540
gagaactgta ttcagtggat cgagcatccg tccatcgagg ccactggcgc cctgatgaag      600
catgatggtg tcgccaccat cctcgccacc ggtggtccgg gcatggtcaa ggccgcatac      660
tcctccggca gccggccct gggcgtcggc gcgggcaatg ctccggcata cgttgacaag      720
aacgtcgacg tcgtgcgtgc agccaacgat ctgattcttt ccaagcactt cgattacggc      780
atgatctgcg ctaccgagca ggccatcatc gccgacaagg acatctacgc tccgctcgtt      840
aaggaactca gcgtcgcaa ggcctatttc gtgaacgctg acgagaaggc caagctcgag      900
cagtacatgt tcggctgcac cgcttactcc ggacagaccc cgaagctcaa ctccgtggtg      960
ccgggcaagt ccccgcagta catcgccaag gccgccggct tcgagattcc ggaagacgcc     1020
accatccttg ccgctgagtg caaggaagtc ggcgagaacg agccgctgac catggagaag     1080
cttgctccgg tccaggccgt gctgaagtcc gacaacaagg aacaggcctt cgagatgtgc     1140
```

-continued

```
gaagccatgc tgaagcatgg cgccggccac accgccgcca tccacaccaa cgaccgtgac    1200
ctggtccgcg agtacggcca gcgcatgcac gcctgccgta tcatctggaa ctccccgagc    1260
tccctcggcg gcgtgggcga catctacaac gccatcgctc cgtccctgac cctgggctgc    1320
ggctcctacg gcggcaactc cgtgtccggc aacgtccagg cagtcaacct catcaacatc    1380
aagcgcatcg ctcggaggaa caacaacatg cagtggttca agattccggc caagacctac    1440
ttcgagccga acgccatcaa gtacctgcgc gacatgtacg catcgaaaa ggccgtcatc     1500
gtgtgcgata aggtcatgga gcagctcggc atcgttgaca agatcatcga tcagctgcgt    1560
gcacgttcca accgcgtgac cttccgtatc atcgattatg tcgagccgga gccgagcgtg    1620
gagaccgtcg aacgtggcgc cgccatgatg cgcgaggagt tcgagccgga taccatcatc    1680
gccgtcggcg gtggttcccc gatggatgcg tccaagatta tgtggctgct gtacgagcac    1740
ccggaaatct ccttctccga tgtgcgtgag aagttcttcg atatccgtaa gcgcgcgttc    1800
aagattccgc cgctgggcaa gaaggccaag ctggtctgca ttccgacttc ttccggcacc    1860
ggttccgaag tcacgccgtt cgctgtgatt accgaccaca agaccggcta agtacccg     1920
atcaccgatt acgcgctgac cccgtccgtc gctatcgtcg atccggtgct ggcacgtact    1980
cagccgcgca agctggcttc cgatgctggt ttcgatgctc tgacccacgc ttttgaggct    2040
tatgtgtccg tgtatgccaa cgacttcacc gatggtatgg cattgcacgc tgccaagctg    2100
gtttgggaca acctcgctga gtccgtcaat ggcgagccgg gtgaggagaa gacccgtgcc    2160
caggagaaga tgcataatgc cgccaccatg gccggcatgg ctttcggctc cgccttcctc    2220
ggcatgtgcc acggcatggc ccacaccatt ggtgcactgt gccacgttgc ccacggtcgt    2280
accaactcca tcctcctgcc gtacgtgatc cgttacaacg gttccgtccc ggaggagccg    2340
accagctggc cgaagtacaa caagtacatc gctccggaac gctaccagga gatcgccaag    2400
aaccttggcg tgaacccggg caagactccg aagagggcg tcgagaacct ggccaaggct     2460
gttgaggatt accgtgacaa caagctcggt atgaacaaga gcttccagga gtgcggtgtg    2520
gatgaggact actattggtc catcatcgac cagatcggca tgcgcgccta cgaagaccag    2580
tgcgcaccgg cgaacccgcg tatcccgcag atcgaggata tgaaggatat cgccattgcc    2640
gcctactacg cgtcagccag gcggaaggc cacaagctgc cgtccagcg tcagggcgaa       2700
gccgctacgg aggaagcttc cgagcgcgcc tga                                  2733
```

<210> SEQ ID NO 3
<211> LENGTH: 683
<212> TYPE: PRT
<213> ORGANISM: Saccharomyces cerevisiae

<400> SEQUENCE: 3

Met Thr Ile Lys Glu His Lys Val Val Tyr Glu Ala His Asn Val Lys
1               5                   10                  15

Ala Leu Lys Ala Pro Gln His Phe Tyr Asn Ser Gln Pro Gly Lys Gly
                20                  25                  30

Tyr Val Thr Asp Met Gln His Tyr Gln Glu Met Tyr Gln Gln Ser Ile
            35                  40                  45

Asn Glu Pro Glu Lys Phe Phe Asp Lys Met Ala Lys Glu Tyr Leu His
        50                  55                  60

Trp Asp Ala Pro Tyr Thr Lys Val Gln Ser Gly Ser Leu Asn Asn Gly
65                  70                  75                  80

Asp Val Ala Trp Phe Leu Asn Gly Lys Leu Asn Ala Ser Tyr Asn Cys

```
            85                  90                  95
Val Asp Arg His Ala Phe Ala Asn Pro Asp Lys Pro Ala Leu Ile Tyr
            100                 105                 110
Glu Ala Asp Asp Glu Ser Asp Asn Lys Ile Ile Thr Phe Gly Glu Leu
            115                 120                 125
Leu Arg Lys Val Ser Gln Ile Ala Gly Val Leu Lys Ser Trp Gly Val
            130                 135             140
Lys Lys Gly Asp Thr Val Ala Ile Tyr Leu Pro Met Ile Pro Glu Ala
145             150                 155                 160
Val Ile Ala Met Leu Ala Val Ala Arg Ile Gly Ala Ile His Ser Val
                165                 170                 175
Val Phe Ala Gly Phe Ser Ala Gly Ser Leu Lys Asp Arg Val Val Asp
                180                 185                 190
Ala Asn Ser Lys Val Val Ile Thr Cys Asp Glu Gly Lys Arg Gly Gly
            195                 200                 205
Lys Thr Ile Asn Thr Lys Lys Ile Val Asp Glu Gly Leu Asn Gly Val
            210                 215                 220
Asp Leu Val Ser Arg Ile Leu Val Phe Gln Arg Thr Gly Thr Glu Gly
225                 230                 235                 240
Ile Pro Met Lys Ala Gly Arg Asp Tyr Trp Trp His Glu Glu Ala Ala
                245                 250                 255
Lys Gln Arg Thr Tyr Leu Pro Pro Val Ser Cys Asp Ala Glu Asp Pro
                260                 265                 270
Leu Phe Leu Leu Tyr Thr Ser Gly Ser Thr Gly Ser Pro Lys Gly Val
                275                 280                 285
Val His Thr Thr Gly Gly Tyr Leu Leu Gly Ala Ala Leu Thr Thr Arg
        290                 295                 300
Tyr Val Phe Asp Ile His Pro Glu Asp Val Leu Phe Thr Ala Gly Asp
305                 310                 315                 320
Val Gly Trp Ile Thr Gly His Thr Tyr Ala Leu Tyr Gly Pro Leu Thr
                325                 330                 335
Leu Gly Thr Ala Ser Ile Ile Phe Glu Ser Thr Pro Ala Tyr Pro Asp
            340                 345                 350
Tyr Gly Arg Tyr Trp Arg Ile Ile Gln Arg His Lys Ala Thr His Phe
            355                 360                 365
Tyr Val Ala Pro Thr Ala Leu Arg Leu Ile Lys Arg Val Gly Glu Ala
        370                 375                 380
Glu Ile Ala Lys Tyr Asp Thr Ser Ser Leu Arg Val Leu Gly Ser Val
385                 390                 395                 400
Gly Glu Pro Ile Ser Pro Asp Leu Trp Glu Trp Tyr His Glu Lys Val
                405                 410                 415
Gly Asn Lys Asn Cys Val Ile Cys Asp Thr Met Trp Gln Thr Glu Ser
            420                 425                 430
Gly Ser His Leu Ile Ala Pro Leu Ala Gly Ala Val Pro Thr Lys Pro
            435                 440                 445
Gly Ser Ala Thr Val Pro Phe Phe Gly Ile Asn Ala Cys Ile Ile Asp
        450                 455                 460
Pro Val Thr Gly Val Glu Leu Glu Gly Asn Asp Val Glu Gly Val Leu
465                 470                 475                 480
Ala Val Lys Ser Pro Trp Pro Ser Met Ala Arg Ser Val Trp Asn His
                485                 490                 495
His Asp Arg Tyr Met Asp Thr Tyr Leu Lys Pro Tyr Pro Gly His Tyr
            500                 505                 510
```

```
Phe Thr Gly Asp Gly Ala Gly Arg Asp His Asp Gly Tyr Tyr Trp Ile
            515                 520                 525

Arg Gly Arg Val Asp Asp Val Val Asn Val Ser Gly His Arg Leu Ser
        530                 535                 540

Thr Ser Glu Ile Glu Ala Ser Ile Ser Asn His Glu Asn Val Ser Glu
545                 550                 555                 560

Ala Ala Val Val Gly Ile Pro Asp Glu Leu Thr Gly Gln Thr Val Val
                565                 570                 575

Ala Tyr Val Ser Leu Lys Asp Gly Tyr Leu Gln Asn Asn Ala Thr Glu
            580                 585                 590

Gly Asp Ala Glu His Ile Thr Pro Asp Asn Leu Arg Arg Glu Leu Ile
            595                 600                 605

Leu Gln Val Arg Gly Glu Ile Gly Pro Phe Ala Ser Pro Lys Thr Ile
        610                 615                 620

Ile Leu Val Arg Asp Leu Pro Arg Thr Arg Ser Gly Lys Ile Met Arg
625                 630                 635                 640

Arg Val Leu Arg Lys Val Ala Ser Asn Glu Ala Glu Gln Leu Gly Asp
                645                 650                 655

Leu Thr Thr Leu Ala Asn Pro Glu Val Val Pro Ala Ile Ile Ser Ala
            660                 665                 670

Val Glu Asn Gln Phe Phe Ser Gln Lys Lys Lys
            675                 680

<210> SEQ ID NO 4
<211> LENGTH: 2052
<212> TYPE: DNA
<213> ORGANISM: Saccharomyces cerevisiae

<400> SEQUENCE: 4
```

| | | |
|---|---|---|
| atgacaatca aggaacataa agtagtttat gaagctcaca acgtaaaggc tcttaaggct | 60 |
| cctcaacatt tttacaacag ccaacccggc aagggttacg ttactgatat gcaacattat | 120 |
| caagaaatgt atcaacaatc tatcaatgag ccagaaaaat tctttgataa gatggctaag | 180 |
| gaatacttgc attgggatgc tccatacacc aaagttcaat ctggttcatt gaacaatggt | 240 |
| gatgttgcat ggttttttgaa cggtaaattg aatgcatcat acaattgtgt tgacagacat | 300 |
| gcctttgcta tcccgacaa gccagctttg atctatgaag ctgatgacga atccgacaac | 360 |
| aaaatcatca catttggtga attactcaga aaagtttccc aaatcgctgg tgtcttaaaa | 420 |
| agctggggcg ttaagaaagg tgacacagtg gctatctatt gccaatgat ccagaagcg | 480 |
| gtcattgcta tgttggctgt ggctcgtatt ggtgctattc actctgttgt ctttgctggg | 540 |
| ttctccgctg gttcgttgaa agatcgtgtc gttgacgcta attctaaagt ggtcatcact | 600 |
| tgtgatgaag gtaaaagagg tggtaagacc atcaacacta aaaaaattgt tgacgaaggt | 660 |
| ttgaacggag tcgatttggt ttcccgtatc ttggttttcc aaagaactgg tactgaaggt | 720 |
| attccaatga aggccggtag agattactgg tggcatgagg aggccgctaa gcagagaact | 780 |
| tacctaccctc ctgtttcatg tgacgctgaa gatcctctat ttttattata cacttccggt | 840 |
| tccactggtt ctccaaaggg tgtcgttcac actacaggtg ttatttatt aggtgccgct | 900 |
| ttaacaacta gatacgtttt tgatattcac ccagaagatg ttctcttcac tgccggtgac | 960 |
| gtcggctgga tcacgggtca cacctatgct ctatatggtc cattaacctt gggtaccgcc | 1020 |
| tcaataattt tcgaatccac tcctgcctac ccagattatg gtagatattg gagaattatc | 1080 |
| caacgtcaca aggctaccca tttctatgtg gctccaactg ctttaagatt aatcaaacgt | 1140 |

```
gtaggtgaag ccgaaattgc caaatatgac acttcctcat tacgtgtctt gggttccgtc   1200
ggtgaaccaa tctctccaga cttatgggaa tggtatcatg aaaaagtggg taacaaaaac   1260
tgtgtcattt gtgacactat gtggcaaaca gagtctggtt ctcatttaat tgctcctttg   1320
gcaggtgctg tcccaacaaa acctggttct gctaccgtgc cattctttgg tattaacgct   1380
tgtatcattg accctgttac aggtgtggaa ttagaaggta atgatgtcga aggtgtcctt   1440
gccgttaaat caccatggcc atcaatggct agatctgttt ggaaccacca cgaccgttac   1500
atggatactt acttgaaacc ttatcctggt cactatttca caggtgatgg tgctggtaga   1560
gatcatgatg ttactactg gatcaggggt agagttgacg acgttgtaaa tgtttccggt   1620
catagattat ccacatcaga aattgaagca tctatctcaa atcacgaaaa cgtctcggaa   1680
gctgctgttg tcggtattcc agatgaattg accggtcaaa ccgtcgttgc atatgtttcc   1740
ctaaaagatg gttatctaca aaacaacgct actgaaggtg atgcagaaca catcacacca   1800
gataatttac gtagagaatt gatcttacaa gttaggggtg agattggtcc tttcgcctca   1860
ccaaaaacca ttattctagt tagagatcta ccaagaacaa ggtcaggaaa gattatgaga   1920
agagttctaa gaaaggttgc ttctaacgaa gccgaacagc taggtgacct aactactttg   1980
gccaacccag aagttgtacc tgccatcatt tctgctgtag agaaccaatt tttctctcaa   2040
aaaaagaaat aa                                                      2052

<210> SEQ ID NO 5
<211> LENGTH: 568
<212> TYPE: PRT
<213> ORGANISM: Zymomonas mobilis

<400> SEQUENCE: 5

Met Ser Tyr Thr Val Gly Thr Tyr Leu Ala Glu Arg Leu Val Gln Ile
1               5                   10                  15

Gly Leu Lys His His Phe Ala Val Ala Gly Asp Tyr Asn Leu Val Leu
            20                  25                  30

Leu Asp Asn Leu Leu Leu Asn Lys Asn Met Glu Gln Val Tyr Cys Cys
        35                  40                  45

Asn Glu Leu Asn Cys Gly Phe Ser Ala Glu Gly Tyr Ala Arg Ala Lys
    50                  55                  60

Gly Ala Ala Ala Val Val Thr Tyr Ser Val Gly Ala Leu Ser Ala
65                  70                  75                  80

Phe Asp Ala Ile Gly Gly Ala Tyr Ala Glu Asn Leu Pro Val Ile Leu
                85                  90                  95

Ile Ser Gly Ala Pro Asn Asn Asn Asp His Ala Ala Gly His Val Leu
            100                 105                 110

His His Ala Leu Gly Lys Thr Asp Tyr His Tyr Gln Leu Glu Met Ala
        115                 120                 125

Lys Asn Ile Thr Ala Ala Ala Glu Ala Ile Tyr Thr Pro Glu Glu Ala
    130                 135                 140

Pro Ala Lys Ile Asp His Val Ile Lys Thr Ala Leu Arg Glu Lys Lys
145                 150                 155                 160

Pro Val Tyr Leu Glu Ile Ala Cys Asn Ile Ala Ser Met Pro Cys Ala
                165                 170                 175

Ala Pro Gly Pro Ala Ser Ala Leu Phe Asn Asp Glu Ala Ser Asp Glu
            180                 185                 190

Ala Ser Leu Asn Ala Ala Val Glu Glu Thr Leu Lys Phe Ile Ala Asn
        195                 200                 205
```

Arg Asp Lys Val Ala Val Leu Val Gly Ser Lys Leu Arg Ala Ala Gly
210                 215                 220

Ala Glu Glu Ala Ala Val Lys Phe Ala Asp Ala Leu Gly Gly Ala Val
225                 230                 235                 240

Ala Thr Met Ala Ala Lys Ser Phe Phe Pro Glu Glu Asn Pro His
            245                 250                 255

Tyr Ile Gly Thr Ser Trp Gly Glu Val Ser Tyr Pro Gly Val Glu Lys
            260                 265                 270

Thr Met Lys Glu Ala Asp Ala Val Ile Ala Leu Ala Pro Val Phe Asn
        275                 280                 285

Asp Tyr Ser Thr Thr Gly Trp Thr Asp Ile Pro Asp Pro Lys Lys Leu
290                 295                 300

Val Leu Ala Glu Pro Arg Ser Val Val Asn Gly Val Arg Phe Pro
305                 310                 315                 320

Ser Val His Leu Lys Asp Tyr Leu Thr Arg Leu Ala Gln Lys Val Ser
                325                 330                 335

Lys Lys Thr Gly Ala Leu Asp Phe Phe Lys Ser Leu Asn Ala Gly Glu
            340                 345                 350

Leu Lys Lys Ala Ala Pro Ala Asp Pro Ser Ala Pro Leu Val Asn Ala
        355                 360                 365

Glu Ile Ala Arg Gln Val Glu Ala Leu Leu Thr Pro Asn Thr Thr Val
370                 375                 380

Ile Ala Glu Thr Gly Asp Ser Trp Phe Asn Ala Gln Arg Met Lys Leu
385                 390                 395                 400

Pro Asn Gly Ala Arg Val Glu Tyr Glu Met Gln Trp Gly His Ile Gly
                405                 410                 415

Trp Ser Val Pro Ala Ala Phe Gly Tyr Ala Val Gly Ala Pro Glu Arg
            420                 425                 430

Arg Asn Ile Leu Met Val Gly Asp Gly Ser Phe Gln Leu Thr Ala Gln
        435                 440                 445

Glu Val Ala Gln Met Val Arg Leu Lys Leu Pro Val Ile Ile Phe Leu
450                 455                 460

Ile Asn Asn Tyr Gly Tyr Thr Ile Glu Val Met Ile His Asp Gly Pro
465                 470                 475                 480

Tyr Asn Asn Ile Lys Asn Trp Asp Tyr Ala Gly Leu Met Glu Val Phe
                485                 490                 495

Asn Gly Asn Gly Gly Tyr Asp Ser Gly Ala Gly Lys Gly Leu Lys Ala
            500                 505                 510

Lys Thr Gly Gly Glu Leu Ala Glu Ala Ile Lys Val Ala Leu Ala Asn
        515                 520                 525

Thr Asp Gly Pro Thr Leu Ile Glu Cys Phe Ile Gly Arg Glu Asp Cys
530                 535                 540

Thr Glu Glu Leu Val Lys Trp Gly Lys Arg Val Ala Ala Ala Asn Ser
545                 550                 555                 560

Arg Lys Pro Val Asn Lys Leu Leu
                565

<210> SEQ ID NO 6
<211> LENGTH: 1707
<212> TYPE: DNA
<213> ORGANISM: Zymomonas mobilis

<400> SEQUENCE: 6
atgagttata ctgtcggtac ctatttagcg gagcggcttg tccagattgg tctcaagcat        60

-continued

```
cacttcgcag tcgcgggcga ctacaacctc gtccttcttg acaacctgct tttgaacaaa      120
aacatggagc aggtttattg ctgtaacgaa ctgaactgcg gtttcagtgc agaaggttat      180
gctcgtgcca aggcgcagc agcagccgtc gttacctaca gcgtcggtgc gctttccgca       240
tttgatgcta tcggtggcgc ctatgcagaa aaccttccgg ttatcctgat ctccggtgct      300
ccgaacaaca atgatcacgc tgctggtcac gtgttgcatc acgctcttgg caaaaccgac      360
tatcactatc agttggaaat ggccaagaac atcacggccg cagctgaagc gatttacacc      420
ccagaagaag ctccggctaa aatcgatcac gtgattaaaa ctgctcttcg tgagaagaag      480
ccggtttatc tcgaaatcgc ttgcaacatt gcttccatgc cctgcgccgc tcctggaccg      540
gcaagcgcat tgttcaatga cgaagccagc gacgaagctt ctttgaatgc agcggttgaa      600 gaaacccctga aattcatcgc caaccgcgac aaagttgccg tcctcgtcgg cagcaagctg      660
cgcgcagctg gtgctgaaga agctgctgtc aaatttgctg atgctctcgg tggcgcagtt      720
gctaccatgg ctgctgcaaa aagcttcttc ccagaagaaa acccgcatta catcggtacc      780
tcatggggtg aagtcagcta tccgggcgtt gaaaagacga tgaagaagc cgatgcggtt       840 atcgctctgg ctcctgtctt caacgactac tccaccactg gttggacgga tattcctgat      900
cctaagaaac tggttctcgc tgaaccgcgt tctgtcgtcg ttaacggcgt tcgcttcccc      960
agcgttcatc tgaaagacta tctgacccgt ttggctcaga agtttccaa gaaaaccggt     1020 gctttggact tcttcaaatc cctcaatgca ggtgaactga agaaagccgc tccggctgat     1080
ccgagtgctc cgttggtcaa cgcagaaatc gcccgtcagg tcgaagctct tctgaccccg     1140
aacacgacgg ttattgctga aaccggtgac tcttggttca atgctcagcg catgaagctc     1200
ccgaacggtg ctcgcgttga atatgaaatg cagtggggtc acatcggttg gtccgttcct     1260
gccgccttcg gttatgccgt cggtgctccg gaacgtcgca acatcctcat ggttggtgat     1320
ggttccttcc agctgacggc tcaggaagtc gctcagatgg ttcgcctgaa actgccggtt     1380
atcatcttct tgatcaataa ctatggttac accatcgaag ttatgatcca tgatggtccg     1440
tacaacaaca tcaagaactg ggattatgcc ggtctgatgg aagtgttcaa cggtaacggt     1500
ggttatgaca gcggtgctgg taaaggcctg aaggctaaaa ccggtggcga actggcagaa     1560
gctatcaagg ttgctctggc aaacaccgac ggcccaaccc tgatcgaatg cttcatcggt     1620
cgtgaagact gcactgaaga attggtcaaa tggggtaagc gcgttgctgc cgccaacagc     1680
cgtaagcctg ttaacaagct cctctag                                         1707
```

<210> SEQ ID NO 7
<211> LENGTH: 1707
<212> TYPE: DNA
<213> ORGANISM: Artificial Sequence
<220> FEATURE:
<223> OTHER INFORMATION: Encoding SEQ ID NO: 5, codon-optimized for
Lactobacillus paracasei

<400> SEQUENCE: 7

```
atgtcatata ccgttggcac ctatttggct gaacgtttgg ttcaaatcgg cttgaagcac       60
cacttcgctg ttgctggcga ttataacttg gttttgttgg ataacttgtt gttgaacaag      120
aacatggaac aagtttattg ctgcaacgaa ttgaactgcg gcttctcagc tgaaggctat      180
gctcgtgcta agggcgctgc tgctgctgtt gttacctatt cagttggcgc tttgtcagct      240
ttcgatgcta tcggcggcgc ttatgctgaa aacttgccag ttatcttgat ctcaggcgct      300
ccaaacaaca acgatcacgc tgctggccac gttttgcacc acgctttggg caagaccgat      360
```

```
tatcactatc aattggaaat ggctaagaac atcaccgctg ctgctgaagc tatctatacc    420
ccagaagaag ctccagctaa gatcgatcac gttatcaaga ccgctttgcg tgaaaagaag    480
ccagtttatt tggaaatcgc ttgcaacatc gcttcaatgc catgcgctgc tccaggccca    540
gcttcagctt tgttcaacga tgaagcttca gatgaagctt cattgaacgc tgctgttgaa    600
gaaaccttga agttcatcgc taaccgtgat aaggttgctg ttttggttgg ctcaaagttg    660
cgtgctgctg gcgctgaaga agctgctgtt aagttcgctg atgctttggg cggcgctgtt    720
gctaccatgg ctgctgctaa gtcattcttc ccagaagaaa acccacacta tcggcacc     780 tcatggggcg aagtttcata tccaggcgtt gaaaagacca tgaaggaagc tgatgctgtt    840
atcgctttgg ctccagtttt caacgattat tcaaccaccg ctggaccgat atcccagat     900 ccaaagaagt tggttttggc tgaaccacgt tcagttgttg ttaacggcgt tcgtttccca    960
tcagttcact tgaaggatta tttgacccgt ttggctcaaa aggtttcaaa gaagaccggc   1020
gctttggatt tcttcaagtc attgaacgct ggcgaattga agaaggctgc tccagctgat   1080
ccatcagctc cattggttaa cgctgaaatc gctcgtcaag ttgaagcttt gttgaccca    1140 aacaccaccg ttatcgctga aaccggcgat tcatggttca acgctcaacg tatgaagttg   1200
ccaaacggcg ctcgtgttga atatgaaatg caatggggcc acatcggctg gtcagttcca   1260
gctgctttcg gctatgctgt tggcgctcca gaacgtcgta acatcttgat ggttggcgat   1320
ggctcattcc aattgaccgc tcaagaagtt gctcaaatgg ttcgtttgaa gttgccagtt   1380
atcatcttct tgatcaacaa ctatggctat accatcgaag ttatgatcca cgatggccca   1440
tataacaaca tcaagaactg ggattatgct ggcttgatgg aagttttcaa cggcaacggc   1500
ggctatgatt caggcgctgg caagggcttg aaggctaaga ccggcggcga attggctgaa   1560
gctatcaagg ttgctttggc taacaccgat ggcccaacct tgatcgaatg cttcatcggc   1620
cgtgaagatt gcaccgaaga attggttaag tggggcaagc gtgttgctgc tgctaactca   1680
cgtaagccag ttaacaagtt gttgtag                                       1707

<210> SEQ ID NO 8
<211> LENGTH: 383
<212> TYPE: PRT
<213> ORGANISM: Zymomonas mobilis

<400> SEQUENCE: 8

Met Ala Ser Ser Thr Phe Tyr Ile Pro Phe Val Asn Glu Met Gly Glu
1               5                   10                  15

Gly Ser Leu Glu Lys Ala Ile Lys Asp Leu Asn Gly Ser Gly Phe Lys
            20                  25                  30

Asn Ala Leu Ile Val Ser Asp Ala Phe Met Asn Lys Ser Gly Val Val
        35                  40                  45

Lys Gln Val Ala Asp Leu Leu Lys Ala Gln Gly Ile Asn Ser Ala Val
    50                  55                  60

Tyr Asp Gly Val Met Pro Asn Pro Thr Val Thr Ala Val Leu Glu Gly
65                  70                  75                  80

Leu Lys Ile Leu Lys Asp Asn Asn Ser Asp Phe Val Ile Ser Leu Gly
                85                  90                  95

Gly Gly Ser Pro His Asp Cys Ala Lys Ala Ile Ala Leu Val Ala Thr
            100                 105                 110

Asn Gly Gly Glu Val Lys Asp Tyr Glu Gly Ile Asp Lys Ser Lys Lys
        115                 120                 125
```

```
Pro Ala Leu Pro Leu Met Ser Ile Asn Thr Thr Ala Gly Thr Ala Ser
        130                 135                 140

Glu Met Thr Arg Phe Cys Ile Ile Thr Asp Glu Val Arg His Val Lys
145                 150                 155                 160

Met Ala Ile Val Asp Arg His Val Thr Pro Met Val Ser Val Asn Asp
                165                 170                 175

Pro Leu Leu Met Val Gly Met Pro Lys Gly Leu Thr Ala Ala Thr Gly
            180                 185                 190

Met Asp Ala Leu Thr His Ala Phe Glu Ala Tyr Ser Ser Thr Ala Ala
        195                 200                 205

Thr Pro Ile Thr Asp Ala Cys Ala Leu Lys Ala Ala Ser Met Ile Ala
    210                 215                 220

Lys Asn Leu Lys Thr Ala Cys Asp Asn Gly Lys Asp Met Pro Ala Arg
225                 230                 235                 240

Glu Ala Met Ala Tyr Ala Gln Phe Leu Ala Gly Met Ala Phe Asn Asn
                245                 250                 255

Ala Ser Leu Gly Tyr Val His Ala Met Ala His Gln Leu Gly Gly Tyr
            260                 265                 270

Tyr Asn Leu Pro His Gly Val Cys Asn Ala Val Leu Leu Pro His Val
        275                 280                 285

Leu Ala Tyr Asn Ala Ser Val Val Ala Gly Arg Leu Lys Asp Val Gly
    290                 295                 300

Val Ala Met Gly Leu Asp Ile Ala Asn Leu Gly Asp Lys Glu Gly Ala
305                 310                 315                 320

Glu Ala Thr Ile Gln Ala Val Arg Asp Leu Ala Ala Ser Ile Gly Ile
                325                 330                 335

Pro Ala Asn Leu Thr Glu Leu Gly Ala Lys Lys Glu Asp Val Pro Leu
            340                 345                 350

Leu Ala Asp His Ala Leu Lys Asp Ala Cys Ala Leu Thr Asn Pro Arg
        355                 360                 365

Gln Gly Asp Gln Lys Glu Val Glu Glu Leu Phe Leu Ser Ala Phe
    370                 375                 380
```

<210> SEQ ID NO 9
<211> LENGTH: 1152
<212> TYPE: DNA
<213> ORGANISM: Zymomonas mobilis

<400> SEQUENCE: 9

```
atggcttctt caactttta tattcctttc gtcaacgaaa tgggcgaagg ttcgcttgaa      60
aaagcaatca aggatcttaa cggcagcggc tttaaaaatg cgctgatcgt ttctgatgct     120
ttcatgaaca atccggtgt tgtgaagcag gttgctgacc tgttgaaagc acagggtatt     180
aattctgctg tttatgatgg cgttatgccg aacccgactg ttaccgcagt tctggaaggc     240
cttaagatcc tgaaggataa caattcagac ttcgtcatct ccctcggtgg tggttctccc     300
catgactgcg ccaaagccat cgctctggtc gcaaccaatg tggtgaagt caaagactac     360
gaaggtatcg acaaatctaa gaaacctgcc ctgcctttga tgtcaatcaa cacgacggct     420
ggtacggctt ctgaaatgac gcgtttctgc atcatcactg atgaagtccg tcacgttaag     480
atggccattg ttgaccgtca cgttaccccg atggtttccg tcaacgatcc tctgttgatg     540
gttggtatgc caaaaggcct gaccgccgcc accggtatgg atgctctgac ccacgcattt     600
gaagcttatt cttcaacggc agctactccg atcaccgatg cttgcgcctt gaaggctgcg     660
tccatgatcg ctaagaatct gaagaccgct tgcgacaacg gtaaggatat gccagctcgt     720
```

```
gaagctatgg cttatgccca attcctcgct ggtatggcct tcaacaacgc ttcgcttggt    780
tatgtccatg ctatggctca ccagttgggc ggctactaca acctgccgca tggtgtctgc    840
aacgctgttc tgcttccgca tgttctggct tataacgcct ctgtcgttgc tggtcgtctg    900
aaagacgttg tgttgctat gggtctcgat atcgccaatc tcggtgataa agaaggcgca    960
gaagccacca ttcaggctgt tcgcgatctg gctgcttcca ttggtattcc agcaaatctg   1020
accgagctgg gtgctaagaa agaagatgtg ccgcttcttg ctgaccacgc tctgaaagat   1080
gcttgtgctc tgaccaaccc gcgtcagggt gatcagaaag aagttgaaga actcttcctg   1140
agcgctttct aa                                                       1152
```

<210> SEQ ID NO 10
<211> LENGTH: 1152
<212> TYPE: DNA
<213> ORGANISM: Artificial Sequence
<220> FEATURE:
<223> OTHER INFORMATION: Encoding SEQ ID NO: 8, codon-optimized for
      Lactobacillus paracasei

<400> SEQUENCE: 10

```
atggcttcat caaccttcta tatcccattc gttaacgaaa tgggcgaagg ctcattggaa     60
aaggctatca aggatttgaa cggctcaggc ttcaagaacg ctttgatcgt ttcagatgct    120
ttcatgaaca agtcaggcgt tgttaagcaa gttgctgatt tgttgaaggc tcaaggcatc    180
aactcagctg tttatgatgg cgttatgcca aacccaaccg ttaccgctgt tttggaaggc    240
ttgaagatct tgaaggataa caactcagat ttcgttatct cattgggcgg cggctcacca    300
cacgattgcg ctaaggctat cgctttggtt gctaccaacg gcggcgaagt taaggattat    360
gaaggcatcg ataagtcaaa gaagccagct ttgccattga tgtcaatcaa caccaccgct    420
ggcaccgctt cagaaatgac ccgtttctgc atcatcaccg atgaagttcg tcacgttaag    480
atggctatcg ttgatcgtca cgttacccca atggtttcag ttaacgatcc attgttgatg    540
gttggcatgc caaagggctt gaccgctgct accggcatgg atgctttgac ccacgctttc    600
gaagcttatt catcaaccgc tgctacccca atcaccgatg cttgcgcttt gaaggctgct    660
tcaatgatcg ctaagaactt gaagaccgct tgcgataacg caaggatat gccagctcgt    720 gaagctatgg cttatgctca attcttggct ggcatggctt caacaacgc ttcattgggc    780 tatgttcacg ctatggctca ccaattgggc ggctattata acttgccaca cggcgtttgc    840
aacgctgttt tgttgccaca cgttttggct tataacgctt cagttgttgc tggccgtttg    900
aaggatgttg gcgttgctat gggcttggat atcgctaact gggcgataaa ggaaggcgct    960
gaagctacca tccaagctgt tcgtgatttg gctgcttcaa tcggcatccc agctaacttg   1020
accgaattgg gcgctaagaa ggaagatgtt ccattgttgg ctgatcacgc tttgaaggat   1080
gcttgcgctt tgaccaaccc acgtcaaggc gatcaaaagg aagttgaaga attgttcttg   1140
tcagctttct aa                                                      1152
```

<210> SEQ ID NO 11
<211> LENGTH: 394
<212> TYPE: PRT
<213> ORGANISM: Mycobacterium phlei

<400> SEQUENCE: 11

```
Met Ala Lys Ile Leu Cys Val Leu Tyr Pro Asp Pro Val Thr Gly Tyr
1               5                   10                  15
```

Pro Pro Val Tyr Ala Arg Asp Ser Ile Pro Val Ile Gly Gly Tyr Pro
            20                  25                  30

Asp Gly Gln Ser Leu Pro Thr Pro Ser Ala Ile Asp Phe Thr Pro Gly
        35                  40                  45

Glu Leu Leu Gly Cys Val Ser Gly Glu Leu Gly Leu Arg Arg Tyr Leu
    50                  55                  60

Glu Ala Gln Gly His Glu Leu Val Val Thr Ser Asp Lys Asp Gly Pro
65                  70                  75                  80

Gly Ser Val Phe Glu Lys Glu Leu Pro Glu Ala Asp Val Val Ile Ser
                85                  90                  95

Gln Pro Phe Trp Pro Ala Tyr Leu Ser Ala Glu Arg Ile Ala Lys Ala
            100                 105                 110

Pro Lys Leu Lys Leu Ala Leu Thr Ala Gly Ile Gly Ser Asp His Val
        115                 120                 125

Asp Leu Asp Ala Ala Ile Lys Ala Gly Ile Thr Val Ala Glu Val Thr
    130                 135                 140

Tyr Cys Asn Ser Ile Ser Val Ala Glu His Ala Val Met Gln Ile Leu
145                 150                 155                 160

Ala Leu Val Arg Asn Tyr Leu Pro Ser His Gln Trp Val Val Asp Gly
                165                 170                 175

Gly Trp Asn Ile Ala Asp Ser Val Glu Arg Ala Tyr Asp Leu Glu Gly
            180                 185                 190

Phe Asp Val Gly Ile Ile Ala Ala Gly Arg Ile Gly Gln Ala Val Met
        195                 200                 205

Arg Arg Leu Lys Pro Phe Asp Val Arg Leu His Tyr Phe Asp Thr Arg
210                 215                 220

Arg Leu Pro Ala Glu Val Glu Gln Glu Leu Gly Leu Thr Tyr His Pro
225                 230                 235                 240

Asp Val His Ser Leu Val Ser Ser Val Asp Ile Val Asp Ile His Ala
                245                 250                 255

Pro Leu His Pro Gln Thr Tyr His Leu Phe Asp Ala Asn Leu Ile Asn
            260                 265                 270

Ser Met Arg Arg Gly Ser Tyr Ile Val Asn Thr Ala Arg Ala Glu Ile
        275                 280                 285

Met Val Arg Asp Ala Val Val Asp Ala Leu Arg Ser Gly Gln Leu Ala
    290                 295                 300

Gly Tyr Ala Gly Asp Val Trp Tyr Pro Gln Pro Ala Pro Asp His
305                 310                 315                 320

Pro Trp Arg Thr Met Pro His Glu Ala Met Thr Pro His Val Ser Gly
                325                 330                 335

Thr Thr Leu Ser Ala Gln Ala Arg Tyr Ala Ala Gly Thr Arg Glu Ile
            340                 345                 350

Leu Glu Asp Phe Phe Glu Arg Arg Pro Ile Arg Asp Glu Tyr Leu Ile
        355                 360                 365

Val Glu Gly Gly Gln Leu Ala Gly Thr Gly Ala Lys Ser Tyr Thr Ala
    370                 375                 380

Asp Gly Ser Ala Ser Pro Gly Ala Gly Thr
385                 390

<210> SEQ ID NO 12
<211> LENGTH: 1185
<212> TYPE: DNA
<213> ORGANISM: Mycobacterium phlei

<400> SEQUENCE: 12

```
atggcgaaga tcttgtgtgt gctctacccc gacccggtga cgggttatcc gcccgtgtat      60
gcccgagatt cgatcccggt catcggcggc tatcccgatg ggcagagtct gcctaccccg     120
tcggccatcg atttcacccc gggcgagctg ctgggatgtg tgtccggaga actcggcttg     180
cgccgttacc tggaggcgca ggggcacgag cttgtggtta cctccgacaa ggatgggccc     240
ggttcggtgt cgagaagga gctgccagaa gccgatgtgg ttatctctca gcccttctgg     300
cccgcatatc tcagtgcgga gcgaattgcc aaggcgccca aactgaagct ggcattgacg     360
gcgggtatcg gctcggacca tgttgacctg gatgcggcga tcaaggcggg catcactgtc     420
gccgaggtga cgtactgcaa cagcatcagc gtggccgagc atgccgtcat gcagatcctg     480
gcactggtgc gcaactacct tccgtcacac cagtgggtgg tcgacggcgg ctggaacatc     540
gcggacagtg ttgaacgcgc ctacgacctt gagggattcg atgtcggcat catcgcggca     600
gggcgtatcg ggcaggcagt aatgcgtcgg ctcaagccat ttgacgttcg gctgcactat     660
tttgacactc gtcggctgcc tgccgaggtg gagcaggagc tgggtctcac ctatcacccg     720
gacgtgcact ccctggtcag ctctgtggac atcgtcgaca tccatgcccc gctgcacccg     780
cagacttatc acctgttcga cgcgaacctg atcaactcca tgcgacgagg ctcgtacatc     840
gtgaacaccg cgcgtgccga gatcatggtt cgcgatgcgg tggtcgatgc gttgcgtagc     900
ggacagctgg ccggttacgc cggcgacgtc tggtaccccc agccgcctgc ccccgatcat     960
ccatggcgca ccatgccgca cgaggccatg acgccgcatg tctccggcac cacgctgtcg    1020
gcgcaggcaa ggtatgcggc cggtacccgg gaaatcctcg aagacttctt tgagcggcgg    1080
cctatccgcg acgaatacct gatcgtcgag ggcggccagc tggccggaac cggagccaag    1140
tcctacaccg cggacggctc ggccagcccc ggcgcgggca cctag                    1185
```

<210> SEQ ID NO 13
<211> LENGTH: 583
<212> TYPE: PRT
<213> ORGANISM: Lactobacillus brevis

<400> SEQUENCE: 13

```
Met Gln Ala Gln Ser Lys Asn Asn Thr Lys Phe Asn Phe Lys Thr Phe
1               5                   10                  15

Met Gly Leu Ile Asn Arg Ile His Pro Arg Tyr Trp Gln Leu Leu Leu
            20                  25                  30

Gly Phe Phe Leu Gly Val Val Ala Thr Ala Met Gln Leu Met Val Pro
        35                  40                  45

Gly Ile Ala Lys Gly Ile Ile Asn Ser Ile Gly His Ser Met Asp Val
    50                  55                  60

Gly Leu Ile Val Ala Val Ile Leu Phe Val Ser Ser Thr Ile Ile
65                  70                  75                  80

Gly Ala Phe Ser Gly Ser Ile Leu Gly Phe Phe Gly Glu Asp Val Val
                85                  90                  95

Tyr Lys Leu Arg Thr Thr Leu Trp Asp Lys Ile Leu Thr Leu Pro Val
            100                 105                 110

Gly Tyr Phe Asp Gln Thr Lys Ser Gly Glu Ile Thr Ser Arg Leu Val
        115                 120                 125

Asn Asp Ser Thr Gln Val Lys Glu Leu Leu Ala Asn Ser Val Pro Lys
    130                 135                 140

Thr Ala Thr Ser Ile Leu Gln Leu Val Gly Ala Leu Val Leu Met Leu
145                 150                 155                 160
```

```
Ile Met Asp Trp Arg Met Thr Ile Ile Met Phe Ile Ala Val Pro Leu
            165                 170                 175

Val Leu Ile Cys Leu Leu Pro Ile Val Arg Gln Ser His Lys Val Ala
            180                 185                 190

Arg Ala Arg Gln Asp Ala Leu Ala Asp Leu Asn Gly Lys Ala Gly Glu
            195                 200                 205

Met Leu Gly Glu Val Arg Leu Val Lys Ser Ser Thr Ala Glu Asn Leu
            210                 215                 220

Glu Arg Thr Ala Gly Asp Lys Arg Met Tyr Arg Leu Tyr Arg Ile Gly
225                 230                 235                 240

Leu Lys Glu Ala Ile Tyr Asp Ser Ile Ala Gly Pro Val Met Gly Met
                245                 250                 255

Val Met Met Ala Met Val Leu Glu Ile Leu Gly Tyr Gly Ala Ile Arg
                260                 265                 270

Val Arg Glu Gly Ala Ile Asp Ile Gly Thr Leu Phe Ser Phe Leu Met
            275                 280                 285

Tyr Leu Val Gln Met Ile Ser Pro Phe Ala Val Leu Gly Gln Phe Met
    290                 295                 300

Ser Asp Val Ala Lys Ala Ser Gly Ser Thr Thr Arg Ile Gln Ala Leu
305                 310                 315                 320

Leu Gln Thr His Glu Glu Asp Arg Leu Thr Gly Thr Asp Leu Asp Ile
                325                 330                 335

Gly Asp Gln Thr Leu Gln Met Asn His Val Ser Phe Ser Tyr Asp Gln
                340                 345                 350

His His Pro Ile Leu Ser Gly Val Ser Phe Thr Ala Glu Pro Asn Ser
            355                 360                 365

Val Ile Ala Phe Ala Gly Pro Ser Gly Gly Lys Ser Thr Ile Ser
            370                 375                 380

Ser Leu Ile Glu Arg Phe Tyr Glu Pro Asn Glu Gly Ser Ile Thr Ile
385                 390                 395                 400

Gly Asn Thr Asn Ile Thr Asp Ile Gln Leu Ala Asp Trp Arg Gln Gln
                405                 410                 415

Ile Gly Leu Val Gly Gln Asp Ala Ala Ile Met Ser Gly Thr Ile Arg
            420                 425                 430

Tyr Asn Leu Thr Tyr Gly Leu Pro Gly His Phe Ser Asp Glu Gln Leu
            435                 440                 445

Trp His Val Leu Glu Met Ala Tyr Ala Thr Gln Phe Val Gln Lys Met
    450                 455                 460

Pro Arg Gly Leu Asp Thr Glu Val Gly Glu Arg Gly Val Lys Val Ser
465                 470                 475                 480

Gly Gly Gln Arg Gln Arg Leu Ala Ile Ala Arg Ala Phe Leu Arg Asn
                485                 490                 495

Pro Lys Ile Leu Met Leu Asp Glu Ala Thr Ala Ser Leu Asp Ser Glu
            500                 505                 510

Ser Glu Met Met Val Gln Lys Ala Leu Asp Gln Leu Met Ala Asn Arg
    515                 520                 525

Thr Thr Leu Val Ile Ala His Arg Leu Ser Thr Ile Thr Asn Ala Asp
    530                 535                 540

Glu Ile Tyr Phe Ile Glu Asn Gly Arg Val Thr Gly Gln Gly Thr His
545                 550                 555                 560

Gln Gln Leu Val Lys Thr Thr Pro Leu Tyr Arg Glu Tyr Val Lys Asn
                565                 570                 575

Gln Ser Ala Thr Ser Asn Gly
```

580

<210> SEQ ID NO 14
<211> LENGTH: 1952
<212> TYPE: DNA
<213> ORGANISM: Lactobacillus brevis

<400> SEQUENCE: 14

```
agaagttaaa atcatgaaca gaaccattct accccaaata tgacattatt ttatcatacg        60
ggacgtttaa aaagggcaat tcactaaaaa tcgcccttta aatgatgaaa ttggtgtaaa       120
attaaggctt gctatgctag gatatttggg ataacaatgg atgtatacac atcattagaa       180
ggatttaggg gataattttg atgcaagctc agtccaagaa caataccaag tttaacttta       240
aaacatttat gggcctaatc aaccgaattc accccgtta ctggcaactg ctgcttggct        300
ttttctagg agttgtcgca acggcgatgc aattgatggt tcccggcatc gccaagggga       360
tcatcaactc aatcggtcat tcaatggatg tcggcctaat cgttgccgtc attttactat       420
tcgtttccag taccattatt ggagcctttt ccggcagtat tttaggcttc ttcggtgaag       480
acgtcgtcta aagctgcga acaacacttt gggataaaat cttaaccctg ccggtgggtt        540
attttgacca aaccaaatct ggcgaaataa cgtccaggtt ggtcaatgat tccacacagg       600
tcaaggaact gttggccaat tcggttccca aaaccgcaac ttcgattctg caactggttg       660
gcgcattggt cttaatgctc atcatggact ggcggatgac tatcattatg tttatcgccg       720
ttccgctcgt cttgatctgc ctgctgccaa ttgtccgcca atcccacaaa gttgccagag       780
cgagacagga cgcactggca gatctcaatg gtaaagccgg tgaaatgctg ggcgaagtcc       840
gtctagtcaa atcgtctacc gcagaaaact tagaacgaac agccggcgat aaacggatgt       900
atcgccttta tcgcatcggg ttaaaagaag cgatctatga ttcaattgcc ggacctgtaa       960
tgggcatggt catgatggcc atggtcctgg aaattctggg ctatggtgcg atccgggttc      1020
gggaaggtgc cattgatatt gggacccttat tttcatttct gatgtacctg gttcaaatga      1080
ttagtccatt tgcggttctc ggccaattca tgtctgatgt tgccaaggca agtggctcaa      1140
ccactcgaat ccaggcatta ttgcaaactc atgaagaaga tcgtctgact ggaacggatt      1200
tggatattgg cgatcaaaca cttcagatga accacgtcag ttttttcttat gatcagcatc      1260
acccccatttt atccggcgtg tcgtttacgg cagaacccaa ttcggtcatt gcctttgccg      1320
gaccatccgg cggtggcaaa tcaaccattt ctagcttaat tgaacgtttt tatgaaccta      1380
acgagggcag catcacgatt ggcaatacca atattactga tattcaactt gccgattggc      1440
gccagcaaat cggcctggtc ggccaagacg ctgcgatcat gtctggaacg attcgttaca      1500
atttaaccta tggtttgccg ggcatttttt ccgatgaaca gctttggcat gtcttggaaa      1560
tggcttacgc aacgcaattt gtccagaaga tgcctcgggg cttggacacg gaagtcggtg      1620
agcgtggagt caaggtatcg gggggccaac gccaacgatt ggcgattgcc cgggccttcc      1680
tgcgtaatcc aaaaatatta atgttggatg aagcaacggc gagcctggat tccgagtccg      1740
aaatgatggt ccaaaaagcg ctggaccagt tgatggccaa tcgaacaaca ttggtgatcg      1800
cccacaggct aagcacaatt accaacgccg acgaaattta tttcatagaa acgcaggg       1860
taacgggcca gggaacccac caacagttag tgaaaacgac tcctttgtat agggagtatg      1920
tgaaaaatca gagcgcgacg agcaacgggt ga                                    1952
```

<210> SEQ ID NO 15
<211> LENGTH: 870

```
<212> TYPE: PRT
<213> ORGANISM: Entamoeba histolytica

<400> SEQUENCE: 15

Met Ser Thr Gln Gln Thr Met Thr Val Asp Glu His Ile Asn Gln Leu
1               5                   10                  15

Val Arg Lys Ala Gln Val Ala Leu Lys Glu Tyr Leu Lys Pro Glu Tyr
            20                  25                  30

Thr Gln Glu Lys Ile Asp Tyr Ile Val Lys Lys Ala Ser Val Ala Ala
        35                  40                  45

Leu Asp Gln His Cys Ala Leu Ala Ala Ala Val Glu Glu Thr Gly
    50                  55                  60

Arg Gly Ile Phe Glu Asp Lys Ala Thr Lys Asn Ile Phe Ala Cys Glu
65                  70                  75                  80

His Val Thr His Glu Met Arg His Ala Lys Thr Val Gly Ile Ile Asn
                85                  90                  95

Val Asp Pro Leu Tyr Gly Ile Thr Glu Ile Ala Glu Pro Val Gly Val
            100                 105                 110

Val Cys Gly Val Thr Pro Val Thr Asn Pro Thr Ser Thr Ala Ile Phe
        115                 120                 125

Lys Ser Leu Ile Ser Ile Lys Thr Arg Asn Pro Ile Val Phe Ser Phe
    130                 135                 140

His Pro Ser Ala Leu Lys Cys Ser Ile Met Ala Ala Lys Ile Val Arg
145                 150                 155                 160

Asp Ala Ala Ile Ala Ala Gly Ala Pro Glu Asn Cys Ile Gln Trp Ile
                165                 170                 175

Glu Phe Gly Gly Ile Glu Ala Ser Asn Lys Leu Met Asn His Pro Gly
            180                 185                 190

Val Ala Thr Ile Leu Ala Thr Gly Gly Asn Ala Met Val Lys Ala Ala
        195                 200                 205

Tyr Ser Ser Gly Lys Pro Ala Leu Gly Val Gly Ala Gly Asn Val Pro
    210                 215                 220

Thr Tyr Ile Glu Lys Thr Cys Asn Ile Lys Gln Ala Ala Asn Asp Val
225                 230                 235                 240

Val Met Ser Lys Ser Phe Asp Asn Gly Met Ile Cys Ala Ser Glu Gln
                245                 250                 255

Ala Ala Ile Ile Asp Lys Glu Ile Tyr Asp Gln Val Val Glu Glu Met
            260                 265                 270

Lys Thr Leu Gly Ala Tyr Phe Ile Asn Glu Glu Lys Ala Lys Leu
        275                 280                 285

Glu Lys Phe Met Phe Gly Val Asn Ala Tyr Ser Ala Asp Val Asn Asn
    290                 295                 300

Ala Arg Leu Asn Pro Lys Cys Pro Gly Met Ser Pro Gln Trp Phe Ala
305                 310                 315                 320

Glu Gln Val Gly Ile Lys Val Pro Glu Asp Cys Asn Ile Ile Cys Ala
                325                 330                 335

Val Cys Lys Glu Val Gly Pro Asn Glu Pro Leu Thr Arg Glu Lys Leu
            340                 345                 350

Ser Pro Val Leu Ala Ile Leu Lys Ala Glu Asn Thr Gln Asp Gly Ile
        355                 360                 365

Asp Lys Ala Glu Ala Met Val Glu Phe Asn Gly Arg Gly His Ser Ala
    370                 375                 380

Ala Ile His Ser Asn Asp Lys Ala Val Val Glu Lys Tyr Ala Leu Thr
385                 390                 395                 400
```

```
Met Lys Ala Cys Arg Ile Leu His Asn Thr Pro Ser Ser Gln Gly Gly
                405                 410                 415

Ile Gly Ser Ile Tyr Asn Tyr Ile Trp Pro Ser Phe Thr Leu Gly Cys
            420                 425                 430

Gly Ser Tyr Gly Gly Asn Ser Val Ser Ala Asn Val Thr Tyr His Asn
        435                 440                 445

Leu Leu Asn Ile Lys Arg Leu Ala Asp Arg Arg Asn Asn Leu Gln Trp
450                 455                 460

Phe Arg Val Pro Pro Lys Ile Phe Phe Glu Pro His Ser Ile Arg Tyr
465                 470                 475                 480

Leu Ala Glu Leu Lys Glu Leu Ser Lys Ile Phe Ile Val Ser Asp Arg
                485                 490                 495

Met Met Tyr Lys Leu Gly Tyr Val Asp Arg Val Met Asp Val Leu Lys
            500                 505                 510

Arg Arg Ser Asn Glu Val Glu Ile Glu Ile Phe Ile Asp Val Glu Pro
        515                 520                 525

Asp Pro Ser Ile Gln Thr Val Gln Lys Gly Leu Ala Val Met Asn Thr
530                 535                 540

Phe Gly Pro Asp Asn Ile Ile Ala Ile Gly Gly Gly Ser Ala Met Asp
545                 550                 555                 560

Ala Ala Lys Ile Met Trp Leu Leu Tyr Glu His Pro Glu Ala Asp Phe
                565                 570                 575

Phe Ala Met Lys Gln Lys Phe Ile Asp Leu Arg Lys Arg Ala Phe Lys
            580                 585                 590

Phe Pro Thr Met Gly Lys Lys Ala Arg Leu Ile Cys Ile Pro Thr Thr
        595                 600                 605

Ser Gly Thr Gly Ser Glu Val Thr Pro Phe Ala Val Ile Ser Asp His
610                 615                 620

Glu Thr Gly Lys Lys Tyr Pro Leu Ala Asp Tyr Ser Leu Thr Pro Ser
625                 630                 635                 640

Val Ala Ile Val Asp Pro Met Phe Thr Met Ser Leu Pro Lys Arg Ala
                645                 650                 655

Ile Ala Asp Thr Gly Leu Asp Val Leu Val His Ala Thr Glu Ala Tyr
            660                 665                 670

Val Ser Val Met Ala Asn Glu Tyr Thr Asp Gly Leu Ala Arg Glu Ala
        675                 680                 685

Val Lys Leu Val Phe Glu Asn Leu Leu Lys Ser Tyr Asn Gly Asp Leu
690                 695                 700

Glu Ala Arg Glu Lys Met His Asn Ala Ala Thr Ile Ala Gly Met Ala
705                 710                 715                 720

Phe Ala Ser Ala Phe Leu Gly Met Asp His Ser Met Ala His Lys Val
                725                 730                 735

Gly Ala Ala Phe His Leu Pro His Gly Arg Cys Val Ala Val Leu Leu
            740                 745                 750

Pro His Val Ile Arg Tyr Asn Gly Gln Lys Pro Arg Lys Leu Ala Met
        755                 760                 765

Trp Pro Lys Tyr Asn Phe Tyr Lys Ala Asp Gln Arg Tyr Met Glu Leu
770                 775                 780

Ala Gln Met Val Gly Leu Lys Cys Asn Thr Pro Ala Glu Gly Val Glu
785                 790                 795                 800

Ala Phe Ala Lys Ala Cys Glu Glu Leu Met Lys Ala Thr Glu Thr Ile
                805                 810                 815
```

```
Thr Gly Phe Lys Lys Ala Asn Ile Asp Glu Ala Ala Trp Met Ser Lys
                820                 825                 830

Val Pro Glu Met Ala Leu Leu Ala Phe Glu Asp Gln Cys Ser Pro Ala
            835                 840                 845

Asn Pro Arg Val Pro Met Val Lys Asp Met Glu Lys Ile Leu Lys Ala
        850                 855                 860

Ala Tyr Tyr Pro Ile Ala
865                 870

<210> SEQ ID NO 16
<211> LENGTH: 2639
<212> TYPE: DNA
<213> ORGANISM: Entamoeba histolytica

<400> SEQUENCE: 16
```

| | | | | | |
|---|---|---|---|---|---|
| acatgtcaac | acaacaaact | atgactgtag | atgaacatat | taatcaactt | gttcgtaaag    60 |
| cacaagttgc | acttaaagaa | tatcttaaac | cagaatatac | acaagaaaaa | atagattata   120 |
| ttgtaaagaa | agcatcagtt | gcagcacttg | atcaacattg | tgcacttgca | gcagctgcag   180 |
| ttgaagaaac | aggaagaggt | attttgaag | ataaagctac | taaaaatata | tttgcatgtg   240 |
| aacatgttac | acatgaaatg | agacatgcta | aaacagttgg | tattattaat | gtagatccac   300 |
| tttatggaat | tacagaaatt | gcagaaccag | ttggagttgt | tgtggagtt | acaccagtta   360 |
| ctaatccaac | atcaacagct | attttcaagt | cacttatttc | aattaaaaca | agaaatccaa   420 |
| ttgtattttc | attccatcca | tcagcactta | aatgttctat | tatggcagct | aaaattgtta   480 |
| gagatgcagc | tattgcagca | ggagcaccag | aaaattgtat | tcaatggatt | gaatttggag   540 |
| gaattgaagc | atcaaataaa | ttaatgaatc | atccaggagt | tgctactatt | cttgctacag   600 |
| gaggaaatgc | tatggttaaa | gcagcatatt | catcaggaaa | accagcactt | ggagtaggag   660 |
| caggaaatgt | accaacatat | attgaaaaaa | catgtaatat | taaacaagca | gcaaatgatg   720 |
| tagttatgtc | aaaatcattt | gataatggta | tgatttgtgc | atcagaacaa | gcagcaatta   780 |
| ttgataaaga | aatttatgat | caagtagttg | aagaaatgaa | acacttgga | gcatatttca   840 |
| ttaatgaaga | agaaaaagct | aaattagaaa | agtttatgtt | tggagttaat | gcatattcag   900 |
| cagatgttaa | taatgcaaga | cttaatccaa | aatgtccagg | tatgtcacca | caatggtttg   960 |
| ctgaacaagt | tggaattaaa | gttccagaag | attgtaatat | tatttgtgca | gtttgtaaag  1020 |
| aagttggacc | aaatgaacca | ttaacaagag | aaaaattatc | accagttctt | gctattctta  1080 |
| aagcagaaaa | tacacaagat | ggtattgata | aagctgaagc | tatggttgaa | tttaatggta  1140 |
| gaggacattc | agcagctatt | cattcgaatg | ataaagcagt | agttgaaaag | tatgcactta  1200 |
| caatgaaagc | atgcagaatt | ttacataata | caccatcatc | acaaggagga | attggatcaa  1260 |
| tttataacta | tatttggcca | tcatttacac | ttggatgtgg | atcatatgga | ggaaattctg  1320 |
| tatcagctaa | tgttacatat | cataatttat | taaatattaa | aagacttgca | gatagaagaa  1380 |
| acaaccttca | atggttcaga | gttccaccaa | agattttctt | tgaaccacat | tctattagat  1440 |
| atcttgctga | acttaaggaa | cttagtaaaa | tattcattgt | ttcagataga | atgatgtata  1500 |
| aattaggata | tgtagataga | gttatggatg | tattgaaaag | aagaagtaat | gaagtagaaa  1560 |
| ttgaaatttt | cattgatgta | gaaccagatc | catctattca | aaccgttcaa | aaaggacttg  1620 |
| ctgttatgaa | tacatttgga | ccagataata | ttattgctat | tggaggagga | tcagctatgg  1680 |
| atgcagctaa | gattatgtgg | ttactttatg | aacatccaga | agccgatttc | tttgcaatga  1740 |
| aacaaaaatt | cattgatctt | agaaagagag | catttaaatt | cccaacaatg | ggtaagaaag  1800 |

-continued

```
ctagattaat ttgtattcca acaacatcag gaactggatc agaagttaca ccatttgcag    1860
ttatttcaga tcatgaaaca ggtaagaaat atccacttgc tgattattca cttacaccat    1920
cagttgctat tgttgatcca atgtttacta tgtcacttcc aaagagagct attgctgata    1980
ctggacttga tgtattggtt catgcaacag aagcatatgt ttcagttatg gctaatgaat    2040
atactgatgg acttgctaga gaagcagtta aattagtctt tgaaaatctt cttaaatcat    2100
ataatgagga tttagaagca agagaaaaga tgcacaatgc tgcaacaatt gcaggtatgg    2160
catttgcatc agcattcctt ggtatggacc attccatggc acataaagtt ggagcagcat    2220
tccatcttcc acatggtaga tgtgtagcag tattattacc acatgtcatt agatataatg    2280
gacaaaaacc aagaaagctt gcaatgtggc caaaatataa tttctataag gcagaccaaa    2340
gatatatgga acttgcacaa atggttggac ttaaatgtaa taccagct gaaggagttg    2400 aagcatttgc taaagcatgt gaagaattaa tgaaagccac agagactatt actggattca    2460
agaaagcaaa tattgatgaa gcagcatgga tgagtaaagt accagaaatg gcacttcttg    2520
catttgaaga tcaatgttca ccagctaatc caagagtccc aatggttaag gatatggaaa    2580
agattctcaa agctgcatat tatccaattg cttaaataga attgaatagg ttcttgttt    2639
```

<210> SEQ ID NO 17
<211> LENGTH: 376
<212> TYPE: PRT
<213> ORGANISM: Saccharomyces cerevisiae

<400> SEQUENCE: 17

```
Met Ser Lys Gly Lys Val Leu Leu Val Leu Tyr Glu Gly Gly Lys His
1               5                   10                  15

Ala Glu Gln Glu Lys Leu Leu Gly Cys Ile Glu Asn Gly Leu Gly
            20                  25                  30

Ile Arg Asn Phe Ile Glu Glu Gln Gly Tyr Glu Leu Val Thr Thr Ile
        35                  40                  45

Asp Lys Asp Pro Glu Pro Thr Ser Thr Val Asp Arg Glu Leu Lys Asp
    50                  55                  60

Ala Glu Ile Val Ile Thr Thr Pro Phe Phe Pro Ala Tyr Ile Ser Arg
65                  70                  75                  80

Asn Arg Ile Ala Glu Ala Pro Asn Leu Lys Leu Cys Val Thr Ala Gly
                85                  90                  95

Val Gly Ser Asp His Val Asp Leu Glu Ala Ala Asn Glu Arg Lys Ile
            100                 105                 110

Thr Val Thr Glu Val Thr Gly Ser Asn Val Val Ser Val Ala Glu His
        115                 120                 125

Val Met Ala Thr Ile Leu Val Leu Ile Arg Asn Tyr Asn Gly Gly His
    130                 135                 140

Gln Gln Ala Ile Asn Gly Glu Trp Asp Ile Ala Gly Val Ala Lys Asn
145                 150                 155                 160

Glu Tyr Asp Leu Glu Asp Lys Ile Ile Ser Thr Val Gly Ala Gly Arg
                165                 170                 175

Ile Gly Tyr Arg Val Leu Glu Arg Leu Val Ala Phe Asn Pro Lys Lys
            180                 185                 190

Leu Leu Tyr Tyr Asp Tyr Gln Glu Leu Pro Ala Glu Ala Ile Asn Arg
        195                 200                 205

Leu Asn Glu Ala Ser Lys Leu Phe Asn Gly Arg Gly Asp Ile Val Gln
    210                 215                 220
```

Arg Val Glu Lys Leu Glu Asp Met Val Ala Gln Ser Asp Val Val Thr
225                 230                 235                 240

Ile Asn Cys Pro Leu His Lys Asp Ser Arg Gly Leu Phe Asn Lys Lys
            245                 250                 255

Leu Ile Ser His Met Lys Asp Gly Ala Tyr Leu Val Asn Thr Ala Arg
        260                 265                 270

Gly Ala Ile Cys Val Ala Glu Asp Val Ala Glu Ala Val Lys Ser Gly
        275                 280                 285

Lys Leu Ala Gly Tyr Gly Gly Asp Val Trp Asp Lys Gln Pro Ala Pro
290                 295                 300

Lys Asp His Pro Trp Arg Thr Met Asp Asn Lys Asp His Val Gly Asn
305                 310                 315                 320

Ala Met Thr Val His Ile Ser Gly Thr Ser Leu Asp Ala Gln Lys Arg
            325                 330                 335

Tyr Ala Gln Gly Val Lys Asn Ile Leu Asn Ser Tyr Phe Ser Lys Lys
            340                 345                 350

Phe Asp Tyr Arg Pro Gln Asp Ile Ile Val Gln Asn Gly Ser Tyr Ala
            355                 360                 365

Thr Arg Ala Tyr Gly Gln Lys Lys
370                 375

<210> SEQ ID NO 18
<211> LENGTH: 1131
<212> TYPE: DNA
<213> ORGANISM: Saccharomyces cerevisiae

<400> SEQUENCE: 18

```
atgtcgaagg gaaaggtttt gctggttctt tacgaaggtg gtaagcatgc tgaagagcag      60
gaaaagttat tggggtgtat tgaaaatgaa cttggtatca gaaatttcat tgaagaacag     120
ggatacgagt tggttactac cattgacaag gaccctgagc aacctcaac ggtagacagg      180
gagttgaaag acgctgaaat tgtcattact acgcccttt tccccgccta catctcgaga      240
aacaggattg cagaagctcc taacctgaag ctctgtgtaa ccgctggcgt cggttcagac     300
catgtcgatt tagaagctgc aaatgaacgg aaaatcacgg tcaccgaagt tactggttct     360
aacgtcgttt ctgtcgcaga gcacgttatg gccacaattt tggttttgat aagaaactat     420
aatggtggtc atcaacaagc aattaatggt gagtgggata ttgccggcgt ggctaaaaat     480
gagtatgatc tggaagacaa ataaatttca acggtaggtg ccggtagaat tggatatagg     540
gttctggaaa gattggtcgc atttaatccg aagaagttac tgtactacga ctaccaggaa     600
ctacctgcgg aagcaatcaa tagattgaac gaggccagca agcttttcaa tggcagaggt     660
gatattgttc agagagtaga gaaattggag gatatggttg ctcagtcaga tgttgttacc     720
atcaactgtc cattgcacaa ggactcaagg ggtttattca ataaaaagct tatttcccac     780
atgaaagatg gtgcatactt ggtgaatacc gctagaggtg ctatttgtgt cgcagaagat     840
gttgccgagg cagtcaagtc tggtaaattg gctggctatg gtggtgatgt ctgggataag     900
caaccagcac caaaagacca tccctggagg actatggaca ataaggacca cgtgggaaac     960
gcaatgactg ttcatatcag tggcacatct ctggatgctc aaaagaggta cgctcaggga    1020
gtaaagaaca tcctaaatag ttactttttcc aaaaagtttg attaccgtcc acaggatatt    1080
attgtgcaga atggttctta tgccaccaga gcttatggac agaagaaata a             1131
```

<210> SEQ ID NO 19
<211> LENGTH: 145

<212> TYPE: PRT
<213> ORGANISM: Saccharomyces cerevisiae

<400> SEQUENCE: 19

```
Met Ser Lys Gly Lys Val Leu Leu Val Leu Tyr Glu Gly Gly Lys His
1               5                   10                  15

Ala Glu Glu Gln Glu Lys Leu Leu Gly Cys Ile Glu Asn Glu Leu Gly
            20                  25                  30

Ile Arg Asn Phe Ile Glu Glu Gln Gly Tyr Glu Leu Val Thr Thr Ile
        35                  40                  45

Asp Lys Asp Pro Glu Pro Thr Ser Thr Val Asp Arg Glu Leu Lys Asp
    50                  55                  60

Ala Glu Ile Val Ile Thr Thr Pro Phe Phe Pro Ala Tyr Ile Ser Arg
65                  70                  75                  80

Asn Arg Ile Ala Glu Ala Pro Asn Leu Lys Leu Cys Val Thr Ala Gly
                85                  90                  95

Val Gly Ser Asp His Val Asp Leu Glu Ala Ala Asn Glu Arg Lys Ile
            100                 105                 110

Thr Val Thr Glu Val Thr Gly Ser Asn Val Val Ser Val Ala Glu His
        115                 120                 125

Val Met Ala Thr Ile Leu Val Leu Ile Arg Asn Tyr Asn Gly Gly His
    130                 135                 140

Gln
145
```

<210> SEQ ID NO 20
<211> LENGTH: 438
<212> TYPE: DNA
<213> ORGANISM: Saccharomyces cerevisiae

<400> SEQUENCE: 20

```
atgtcgaagg gaaaggtttt gctggttctt tatgaaggtg gtaagcatgc tgaagagcag      60
gaaaagttat tgggtgtat tgaaaatgaa cttggtatca gaaatttcat tgaagaacag      120
ggatacgagt tggttactac cattgacaag gaccctgagc caacctcaac ggtagacagg     180
gagttgaaag acgctgaaat tgtcattact acgccctttt tccccgccta catctcgaga     240
aacaggattg cagaagctcc taacctgaag ctctgtgtaa ccgctggcgt cggttcagac     300
catgtcgatt tagaagctgc aaatgaacgg aaaatcacgg tcaccgaagt tactggttct     360
aacgtcgttt ctgtcgcaga gcacgttatg gccacaattt tggttttgat aagaaactat     420
aatggtggtc atcaataa                                                    438
```

<210> SEQ ID NO 21
<211> LENGTH: 57
<212> TYPE: PRT
<213> ORGANISM: Lactococcus lactis

<400> SEQUENCE: 21

```
Met Ser Thr Lys Asp Phe Asn Leu Asp Leu Val Ser Val Ser Lys Lys
1               5                   10                  15

Asp Ser Gly Ala Ser Pro Arg Ile Thr Ser Ile Ser Leu Cys Thr Pro
            20                  25                  30

Gly Cys Lys Thr Gly Ala Leu Met Gly Cys Asn Met Lys Thr Ala Thr
        35                  40                  45

Cys Asn Cys Ser Ile His Val Ser Lys
    50                  55
```

<210> SEQ ID NO 22
<211> LENGTH: 34
<212> TYPE: PRT
<213> ORGANISM: Lactococcus lactis

<400> SEQUENCE: 22

Ile Thr Ser Ile Ser Leu Cys Thr Pro Gly Cys Lys Thr Gly Ala Leu
1               5                   10                  15

Met Gly Cys Asn Met Lys Thr Ala Thr Cys Asn Cys Ser Ile His Val
            20                  25                  30

Ser Lys

<210> SEQ ID NO 23
<211> LENGTH: 57
<212> TYPE: PRT
<213> ORGANISM: Lactococcus lactis

<400> SEQUENCE: 23

Met Ser Thr Lys Asp Phe Asn Leu Asp Leu Val Ser Val Ser Lys Lys
1               5                   10                  15

Asp Ser Gly Ala Ser Pro Arg Ile Thr Ser Ile Ser Leu Cys Thr Pro
            20                  25                  30

Gly Cys Lys Thr Gly Ala Leu Met Gly Cys Asn Met Lys Thr Ala Thr
        35                  40                  45

Cys His Cys Ser Ile His Val Ser Lys
    50                  55

<210> SEQ ID NO 24
<211> LENGTH: 34
<212> TYPE: PRT
<213> ORGANISM: Lactococcus lactis

<400> SEQUENCE: 24

Ile Thr Ser Ile Ser Leu Cys Thr Pro Gly Cys Lys Thr Gly Ala Leu
1               5                   10                  15

Met Gly Cys Asn Met Lys Thr Ala Thr Cys His Cys Ser Ile His Val
            20                  25                  30

Ser Lys

<210> SEQ ID NO 25
<211> LENGTH: 245
<212> TYPE: PRT
<213> ORGANISM: Lactococcus lactis

<400> SEQUENCE: 25

Met Arg Arg Tyr Leu Ile Leu Ile Val Ala Leu Ile Gly Ile Thr Gly
1               5                   10                  15

Leu Ser Gly Cys Tyr Gln Thr Ser His Lys Lys Val Arg Phe Asp Glu
            20                  25                  30

Gly Ser Tyr Thr Asn Phe Ile Tyr Asp Asn Lys Ser Tyr Phe Val Thr
        35                  40                  45

Asp Lys Glu Ile Pro Gln Glu Asn Val Asn Asn Ser Lys Ala Lys Phe
    50                  55                  60

Tyr Lys Leu Leu Ile Val Asp Met Lys Ser Glu Lys Leu Leu Ser Ser
65                  70                  75                  80

Ser Asn Lys Asn Ser Val Thr Leu Val Leu Asn Asn Ile Tyr Glu Ala
                85                  90                  95

Ser Asp Lys Ser Leu Cys Met Gly Ile Asn Asp Arg Tyr Tyr Lys Ile

```
                  100              105              110
Leu Pro Glu Ser Asp Lys Gly Ala Val Lys Ala Leu Arg Leu Gln Asn
            115                120                125

Phe Asp Val Thr Ser Asp Ile Ser Asp Asn Phe Val Ile Asp Lys
        130                135                140

Asn Asp Ser Arg Lys Ile Asp Tyr Met Gly Asn Ile Tyr Ser Ile Ser
145                150                155                160

Asp Ser Thr Val Ser Asp Glu Glu Leu Gly Glu Tyr Gln Asp Val Leu
                165                170                175

Ala Glu Val Arg Val Phe Asp Ser Val Ser Gly Lys Ser Ile Pro Arg
            180                185                190

Ser Glu Trp Gly Arg Ile Asp Lys Asp Gly Ser Asn Ser Lys Gln Ser
        195                200                205

Arg Thr Glu Trp Asp Tyr Gly Glu Ile His Ser Ile Arg Gly Lys Ser
        210                215                220

Leu Thr Glu Ala Phe Ala Val Glu Ile Asn Asp Asp Phe Lys Leu Ala
225                230                235                240

Thr Lys Val Gly Asn
                245

<210> SEQ ID NO 26
<211> LENGTH: 225
<212> TYPE: PRT
<213> ORGANISM: Lactococcus lactis

<400> SEQUENCE: 26

Met Gln Val Lys Ile Gln Asn Leu Ser Lys Thr Tyr Lys Glu Lys Gln
1               5                   10                  15

Val Leu Gln Asp Ile Ser Phe Asp Ile Lys Ser Gly Thr Val Cys Gly
            20                  25                  30

Leu Leu Gly Val Asn Gly Ala Gly Lys Ser Thr Leu Met Lys Ile Leu
        35                  40                  45

Phe Gly Leu Ile Ser Ala Asp Thr Gly Lys Ile Phe Phe Asp Gly Gln
    50                  55                  60

Glu Lys Thr Asn Asn Gln Leu Gly Ala Leu Ile Glu Ala Pro Ala Ile
65                  70                  75                  80

Tyr Met Asn Leu Ser Ala Phe Asp Asn Leu Lys Thr Lys Ala Leu Leu
                85                  90                  95

Phe Gly Ile Ser Asp Lys Arg Ile His Glu Thr Leu Glu Val Ile Gly
            100                 105                 110

Leu Ala Glu Thr Gly Lys Lys Arg Ala Gly Lys Phe Ser Leu Gly Met
        115                 120                 125

Lys Gln Arg Leu Gly Ile Gly Met Ala Ile Leu Thr Glu Pro Gln Phe
    130                 135                 140

Leu Ile Leu Asp Glu Pro Thr Asn Gly Leu Asp Pro Asp Gly Ile Ala
145                 150                 155                 160

Glu Leu Leu Asn Leu Ile Leu Lys Leu Lys Ala Lys Gly Val Thr Ile
                165                 170                 175

Leu Ile Ser Ser His Gln Leu His Glu Ile Ser Lys Val Ala Ser Gln
            180                 185                 190

Ile Ile Ile Leu Asn Lys Gly Lys Ile Arg Tyr Asn His Ala Asn Asn
        195                 200                 205

Lys Glu Asp Asp Ile Glu Gln Leu Phe Phe Lys Ile Val His Gly Gly
    210                 215                 220
```

Met
225

<210> SEQ ID NO 27
<211> LENGTH: 242
<212> TYPE: PRT
<213> ORGANISM: Lactococcus lactis

<400> SEQUENCE: 27

Met Lys Arg Ile Ile Ala Ser Glu Ala Ile Lys Leu Lys Lys Ser Gly
1               5                   10                  15

Thr Leu Arg Leu Val Leu Ile Ile Pro Phe Val Thr Leu Phe Ile Ala
            20                  25                  30

Phe Leu Met Gly Gly Ile Gln Ile Phe Ser Val Phe Ser Ile Tyr Trp
        35                  40                  45

Trp Glu Thr Gly Phe Leu Phe Leu Leu Met Ser Leu Leu Phe Leu Tyr
    50                  55                  60

Asp Ile Lys Ser Glu Glu Gln Ala Gly Asn Phe Gln Asn Val Lys Trp
65                  70                  75                  80

Lys Lys Leu Ser Trp Lys Ile His Leu Ala Lys Met Leu Leu Ile Trp
                85                  90                  95

Leu Arg Gly Ile Leu Ala Ser Ile Val Leu Ile Ile Leu Leu Tyr Leu
            100                 105                 110

Val Ala Phe Val Phe Gln Gly Ile Val Val Asp Phe Met Lys Val
        115                 120                 125

Ser Val Ala Leu Ile Ala Ile Leu Leu Ala Ala Ser Trp Asn Leu Pro
    130                 135                 140

Phe Ile Tyr Leu Ile Phe Lys Trp Ile Asn Thr Tyr Val Leu Leu Ala
145                 150                 155                 160

Ala Asn Thr Leu Ile Cys Leu Ile Val Ala Pro Phe Val Ala Gln Thr
                165                 170                 175

Pro Val Trp Phe Leu Leu Pro Tyr Thr Tyr His Tyr Lys Val Thr Glu
            180                 185                 190

Ser Leu Leu Asn Ile Lys Pro Ser Gly Asp Leu Leu Thr Gly Lys Ile
        195                 200                 205

Asn Phe Ser Ile Trp Glu Val Leu Leu Pro Phe Gly Leu Ser Ile Val
    210                 215                 220

Val Thr Ile Gly Val Ser Tyr Leu Leu Lys Gly Val Ile Glu His Asp
225                 230                 235                 240

Lys Lys

<210> SEQ ID NO 28
<211> LENGTH: 214
<212> TYPE: PRT
<213> ORGANISM: Lactococcus lactis

<400> SEQUENCE: 28

Met Ile Arg Ser Glu Cys Leu Lys Leu Lys Asn Ser Leu Gly Phe Tyr
1               5                   10                  15

Leu Val Phe Leu Phe Thr Leu Leu Glu Leu Leu Thr Val Pro Ile Tyr
            20                  25                  30

Leu Ala Phe Gly Arg Ser His Val Ser Met Thr Asp Ser Ser Leu Met
        35                  40                  45

Ile Phe Leu Phe Phe Pro Leu Leu Val Thr Ile Leu Ser Ile Leu Ile
    50                  55                  60

Phe Glu Gln Glu Ser Leu Ala Asn His Phe Gln Glu Ile Asn Val Asn

```
                65                  70                  75                  80
Lys Lys Ser Ser Arg Ile Trp Leu Ser Lys Leu Ile Val Val Asp Phe
                    85                  90                  95

Leu Leu Phe Phe Pro Ser Ala Met Ile Trp Ile Ile Thr Gly Val Ser
                100                 105                 110

Gln Ala Val Gly Gln Gly Met Met Ile Ala Thr Ala Ser Trp Leu
                115                 120                 125

Met Ala Ile Phe Leu Asn His Phe His Leu Leu Thr Phe Ile Ile
            130                 135                 140

Asn Arg Gly Gly Ser Met Ile Ile Ala Ile Ile Glu Ile Leu Leu Ile
145                 150                 155                 160

Ile Phe Ala Ser Asn Lys Val Leu Leu Ala Ala Tyr Trp Cys Pro Ile
                165                 170                 175

Ala Leu Pro Val Asn Phe Met Ile Thr Gly Arg Cys Ala Tyr Leu Ile
            180                 185                 190

Ala Ala Val Gly Trp Ile Val Leu Ser Thr Ile Ile Leu Val Ala Leu
                195                 200                 205

Ser Lys Lys Lys Ile Arg
            210

<210> SEQ ID NO 29
<211> LENGTH: 91
<212> TYPE: PRT
<213> ORGANISM: Lactobacillus gasseri

<400> SEQUENCE: 29

Met Val Thr Lys Tyr Gly Arg Asn Leu Gly Leu Asn Lys Val Glu Leu
1               5                   10                  15

Phe Ala Ile Trp Ala Val Leu Val Val Ala Leu Leu Leu Thr Thr Ala
                20                  25                  30

Asn Ile Tyr Trp Ile Ala Asp Gln Phe Gly Ile His Leu Ala Thr Gly
            35                  40                  45

Thr Ala Arg Lys Leu Leu Asp Ala Met Ala Ser Gly Ala Ser Leu Gly
        50                  55                  60

Thr Ala Phe Ala Ala Ile Leu Gly Val Thr Leu Pro Ala Trp Ala Leu
65                  70                  75                  80

Ala Ala Ala Gly Ala Leu Gly Ala Thr Ala Ala
                85                  90

<210> SEQ ID NO 30
<211> LENGTH: 58
<212> TYPE: PRT
<213> ORGANISM: Lactobacillus gasseri

<400> SEQUENCE: 30

Ile Tyr Trp Ile Ala Asp Gln Phe Gly Ile His Leu Ala Thr Gly Thr
1               5                   10                  15

Ala Arg Lys Leu Leu Asp Ala Met Ala Ser Gly Ala Ser Leu Gly Thr
                20                  25                  30

Ala Phe Ala Ala Ile Leu Gly Val Thr Leu Pro Ala Trp Ala Leu Ala
            35                  40                  45

Ala Ala Gly Ala Leu Gly Ala Thr Ala Ala
        50                  55

<210> SEQ ID NO 31
<211> LENGTH: 53
<212> TYPE: PRT
```

<213> ORGANISM: Lactobacillus gasseri

<400> SEQUENCE: 31

Met Gln Lys Leu Leu Arg Ile Ile Ala Leu Ile Ser Leu Ile Ala Ala
1               5                   10                  15

Ile Ile Ser Phe Phe Ile Phe Lys Ile Asn Tyr Ile Thr Tyr Ile Leu
            20                  25                  30

Ile Gly Ile Phe Ile Gly Ser Gly Phe Ile Tyr Gln Ile Arg Ala Gln
        35                  40                  45

Gly Arg Asn Arg Lys
        50

<210> SEQ ID NO 32
<211> LENGTH: 226
<212> TYPE: PRT
<213> ORGANISM: Lactobacillus gasseri

<400> SEQUENCE: 32

Met Thr Arg Asn Met Phe Val Asp Ile Lys Asn Val Ser Lys Asn Leu
1               5                   10                  15

Thr Asp Phe Ser Leu Glu Asn Leu Asn Ile Ser Phe Glu Lys Gly Glu
            20                  25                  30

Ile Ile Gly Leu Val Gly Glu Asn Gly Ala Gly Lys Thr Thr Leu Leu
        35                  40                  45

Asn Leu Ile Ser Gly Ile Leu Lys Pro Asp Lys Gly Gln Ile Leu Leu
    50                  55                  60

Ser Ser Asn Asn Ile Gly Tyr Cys Phe Asp Ala Leu Pro Glu Pro Glu
65                  70                  75                  80

Asn Leu Thr Ile Glu Gln Leu Asn Thr Ile Phe Thr Gly Leu Leu Ala
                85                  90                  95

Val Trp Asp Ser Asp Thr Tyr Phe Ser Phe Val Asp Glu Phe Lys Leu
            100                 105                 110

Pro Lys Gly Lys Pro Ile Gly Val Phe Ser Lys Gly Met Lys Met Gln
        115                 120                 125

Leu Asn Val Ser Ile Thr Leu Ser His Asn Pro Thr Leu Leu Leu Leu
    130                 135                 140

Asp Glu Val Thr Ala Gly Leu Asp Pro Ile Val Arg Arg Thr Val Leu
145                 150                 155                 160

Asn Thr Ile Lys Glu Tyr Ala Ile Ser Ser Glu Cys Ile Val Ile Met
                165                 170                 175

Thr Thr His Asn Leu Glu Asp Ile Ser Asp Ile Cys Asn Arg Leu Ile
            180                 185                 190

Leu Leu Asn Asn Gly Ser Ile Leu Leu Asp Asp Asn Phe Glu Asp Lys
        195                 200                 205

Ser Ser Lys Glu Ile Glu Leu Ile Phe Arg Lys Thr Leu Gly Tyr Gly
    210                 215                 220

Asp Met
225

<210> SEQ ID NO 33
<211> LENGTH: 212
<212> TYPE: PRT
<213> ORGANISM: Lactobacillus gasseri

<400> SEQUENCE: 33

Met Lys Gly Leu Val Gln Lys Asp Ile Tyr Gln Leu Thr Ser Ser Trp
1               5                   10                  15

```
Phe Arg Pro Val Arg Ile Phe Val Ile Ala Val Leu Ala Ala Gly
            20                  25                  30

Met Ile Phe Leu Lys Gln Asp Ser Ile Ile Leu Val Leu Leu Leu
            35                  40                  45

Leu Leu Met Val Asn Asn Ile Gln Ser Leu Phe Ile Lys Asp Ser Thr
 50                  55                  60

Asn Arg Trp Leu Ser Leu Leu Lys Ser Leu Lys Ile Ser Thr Phe Ala
65                   70                  75                  80

Val Ile Gly Ser Arg Tyr Ile Thr Leu Val Val Ile Cys Val Cys Gly
                 85                  90                  95

Ala Ile Leu Asn Phe Val Tyr Met Leu Phe Gly Met Leu Leu Phe Asn
            100                 105                 110

Thr Ser Thr Gly Ile Asp Val Leu Val Ile Ser Ser Ile Cys Leu Trp
            115                 120                 125

Val Ser Leu Ile Tyr Gly Leu Val Ile Ile Pro Phe Leu Tyr Ala Phe
130                 135                 140

Lys Gln Asn Gly Leu Thr Leu Ala Ile Ile Ile Met Phe Ser Cys Val
145                 150                 155                 160

Ala Leu Leu Ile Lys Phe Ser Ser Ala Ile Thr Lys Leu Ala Tyr Ile
                165                 170                 175

Ile His Ser Tyr Ser Tyr Val Gln Leu Ile Leu Ile Ala Ile Val Ala
            180                 185                 190

Leu Ile Gly Ile Gly Ile Ile Ser Met Val Val Ser Tyr Leu Ile Val
            195                 200                 205

Glu Lys Glu Lys
    210

<210> SEQ ID NO 34
<211> LENGTH: 868
<212> TYPE: PRT
<213> ORGANISM: Lactobacillus paracasei

<400> SEQUENCE: 34

Met Leu Lys Asn Thr Ala Lys Ala Ala Thr Glu Val Asp Val Lys Ser
1               5                   10                  15

Met Val Asp Glu Leu Val Ala Asn Ala His Ala Ala Leu Lys Ile Met
            20                  25                  30

Lys Thr Phe Asp Gln Glu Lys Ile Asp His Ile Val His Arg Met Ala
            35                  40                  45

Ile Ala Gly Leu Asp His His Met Glu Leu Ala Lys Leu Ala Val Asp
 50                  55                  60

Glu Thr Gly Arg Gly Val Trp Glu Asp Lys Ala Ile Lys Asn Met Phe
65                   70                  75                  80

Ala Thr Glu Glu Ile Trp His Ser Ile Lys Asn Asn Lys Thr Val Gly
                 85                  90                  95

Val Ile Asn Glu Asp Lys Gln Arg Gly Leu Val Ser Ile Ala Glu Pro
            100                 105                 110

Ile Gly Val Ile Ala Gly Val Thr Pro Val Thr Asn Pro Thr Ser Thr
            115                 120                 125

Thr Met Phe Lys Ser Glu Ile Ala Ile Lys Thr Arg Asn Pro Ile Ile
            130                 135                 140

Phe Ala Phe His Pro Gly Ala Gln Lys Ser Ser Ala Arg Ala Leu Glu
145                 150                 155                 160

Val Ile Arg Asp Glu Ala Glu Lys Ala Gly Leu Pro Lys Gly Ala Leu
```

```
                165                 170                 175
Gln Tyr Ile Pro Val Pro Ser Met Asp Ala Thr Lys Ala Leu Met Asp
            180                 185                 190

His Pro Gly Ile Ala Thr Ile Leu Ala Thr Gly Gly Pro Gly Met Val
        195                 200                 205

Lys Ser Ala Tyr Ser Ser Gly Lys Pro Ala Leu Gly Val Gly Ala Gly
    210                 215                 220

Asn Ala Pro Ala Tyr Ile Glu Ala Ser Ala Asn Ile Lys Gln Ala Val
225                 230                 235                 240

Asn Asp Leu Val Leu Ser Lys Ser Phe Asp Asn Gly Met Ile Cys Ala
                245                 250                 255

Ser Glu Gln Gly Val Ile Ile Asp Ser Ser Ile Tyr Asp Asp Val Lys
            260                 265                 270

Lys Glu Phe Glu Ala Gln Gly Ala Tyr Phe Val Lys Gln Lys Asp Met
        275                 280                 285

Lys Lys Phe Glu Ser Thr Val Ile Asn Leu Glu Lys Gln Ser Val Asn
    290                 295                 300

Pro Arg Ile Val Gly Gln Ser Pro Lys Gln Ile Ala Glu Trp Ala Gly
305                 310                 315                 320

Ile Thr Ile Pro Asp Asn Thr Thr Ile Leu Ile Ala Glu Leu Lys Gly
                325                 330                 335

Val Gly Glu Lys Tyr Pro Leu Ser Arg Glu Lys Leu Ser Pro Val Leu
            340                 345                 350

Ala Met Val Lys Ala Asp Gly His Glu Asp Ala Phe Lys Lys Cys Glu
        355                 360                 365

Thr Met Leu Asp Ile Gly Gly Leu Gly His Thr Ala Val Ile His Thr
    370                 375                 380

Ala Asp Asp Glu Leu Ala Leu Lys Tyr Ala Asp Ala Met Gln Ala Cys
385                 390                 395                 400

Arg Ile Leu Ile Asn Thr Pro Ser Ser Val Gly Gly Ile Gly Asp Leu
                405                 410                 415

Tyr Asn Glu Met Ile Pro Ser Leu Thr Leu Gly Cys Gly Ser Tyr Gly
            420                 425                 430

Gly Asn Ser Ile Ser His Asn Val Gly Thr Val Asp Leu Leu Asn Ile
        435                 440                 445

Lys Thr Met Ala Lys Arg Arg Asn Asn Met Gln Trp Met Lys Leu Pro
    450                 455                 460

Pro Lys Ile Tyr Phe Glu Lys Asn Ser Val Arg Tyr Leu Glu His Met
465                 470                 475                 480

Glu Gly Ile Lys Arg Ala Phe Ile Val Ala Asp Arg Ser Met Glu Lys
                485                 490                 495

Leu Gly Phe Val Lys Ile Val Glu Asp Val Leu Ala Arg Arg Glu Asn
            500                 505                 510

Pro Val Gln Val Gln Thr Phe Val Asp Val Glu Pro Asp Pro Ser Thr
        515                 520                 525

Asp Thr Val Phe Lys Gly Thr Asp Ile Met Arg Ser Phe Gly Pro Asp
    530                 535                 540

Thr Val Ile Ala Ile Gly Gly Gly Ser Val Met Asp Ala Ala Lys Gly
545                 550                 555                 560

Met Cys Leu Phe Asn Asp Ala Gly Asp Ala Asp Phe Phe Gly Ala Lys
                565                 570                 575

Gln Lys Phe Leu Asp Ile Arg Lys Arg Thr Tyr Thr Phe Pro Asn Leu
            580                 585                 590
```

-continued

```
Asn Lys Thr Lys Leu Val Cys Ile Pro Thr Thr Ser Gly Thr Gly Ser
    595                 600                 605

Glu Val Thr Pro Phe Ala Val Ile Thr Asp Ser Lys Ala Gly Ile Lys
    610                 615                 620

Tyr Pro Leu Ala Asp Tyr Ala Leu Thr Pro Asp Ile Ala Ile Val Asp
625                 630                 635                 640

Ser Gln Phe Ile Glu Ser Val Pro Pro Val Val Val Ala Asp Ser Gly
                645                 650                 655

Leu Asp Val Leu Cys His Ala Thr Glu Ser Tyr Val Ser Thr Met Ala
                660                 665                 670

Thr His Tyr Thr Lys Gly Leu Ser Leu Glu Ala Ile Lys Leu Val Phe
        675                 680                 685

Glu Asn Leu Glu Lys Ser Tyr His Gly Asp Val Glu Ala Lys Ser Lys
    690                 695                 700

Met His Asp Ala Ser Thr Ile Ala Gly Met Ala Phe Ala Asn Ala Leu
705                 710                 715                 720

Leu Gly Ile Asn His Ser Ile Ala His Lys Ile Gly Gln Ala Phe His
                725                 730                 735

Leu Pro His Gly Arg Cys Ile Ala Ile Thr Met Pro His Val Ile Arg
                740                 745                 750

Phe Asn Ala Ser Gln Pro Lys Lys Arg Ala Ile Trp Ala Lys Tyr Ser
        755                 760                 765

Tyr Phe Arg Ala Asn Glu Asp Tyr Ala Glu Ile Ala Arg Tyr Leu Gly
    770                 775                 780

Leu Pro Gly Lys Thr Thr Asp Glu Leu Val Glu Ser Tyr Val Gln Ala
785                 790                 795                 800

Phe Ile Lys Leu Ala His Ser Val Gly Val Lys Leu Ser Leu Lys Glu
                805                 810                 815

Gln Gly Val Lys Lys Ala Asp Leu Asp Lys Gln Val Asp Arg Leu Ala
                820                 825                 830

Glu Leu Ala Tyr Glu Asp Asn Cys Thr Val Thr Asn Pro Gln Glu Pro
        835                 840                 845

Leu Ile Gly Asp Leu Lys His Ile Ile Leu Asp Glu Tyr Glu Gly Thr
    850                 855                 860

Glu Ser Thr Phe
865
```